US012767403B2

(12) United States Patent
Furuya et al.

(10) Patent No.: US 12,767,403 B2
(45) Date of Patent: Oct. 20, 2026

(54) BARRIER LAMINATE, LID MATERIAL, AND PACKAGING CONTAINER

(71) Applicant: DAI NIPPON PRINTING CO., LTD., Tokyo (JP)

(72) Inventors: Shunsuke Furuya, Tokyo (JP); Shinichiro Kono, Tokyo (JP); Aya Suzuki, Tokyo (JP); Toru Suda, Tokyo (JP); Yohei Yamato, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 335 days.

(21) Appl. No.: 18/681,358

(22) PCT Filed: Aug. 5, 2022

(86) PCT No.: PCT/JP2022/030114

§ 371 (c)(1),
(2) Date: May 6, 2024

(87) PCT Pub. No.: WO2023/013768

PCT Pub. Date: Feb. 9, 2023

(65) Prior Publication Data

US 2024/0343458 A1 Oct. 17, 2024

(30) Foreign Application Priority Data

Aug. 5, 2021 (JP) ................................ 2021-129332
Aug. 5, 2021 (JP) ................................ 2021-129339

(Continued)

(51) Int. Cl.

*B65D 65/40* (2006.01)
*B32B 7/027* (2019.01)

(Continued)

(52) U.S. Cl.

CPC .............. *B65D 65/40* (2013.01); *B32B 7/027* (2019.01); *B32B 7/12* (2013.01); *B32B 27/08* (2013.01);

(Continued)

(58) Field of Classification Search

CPC ........ B65D 65/40; B65D 75/008; B32B 7/12; B32B 7/08; B32B 27/32; B32B 27/30;

(Continued)

(56) References Cited

U.S. PATENT DOCUMENTS 4,769,261 A * 9/1988 Hazelton ................. B32B 15/06 428/458
4,892,911 A * 1/1990 Genske ................... C08L 23/22 525/197

(Continued)

FOREIGN PATENT DOCUMENTS

JP 2004-168040 6/2004
JP 2005-053223 3/2005

(Continued)

OTHER PUBLICATIONS

International Search Report, issued in the corresponding PCT Application No. PCT/JP2022/030114, dated Oct. 4, 2022, 11 pages (with machine translation).

(Continued)

*Primary Examiner* — Ernesto A Grano
(74) *Attorney, Agent, or Firm* — HSML P.C.

(57) ABSTRACT

In one aspect, the present disclosure relates to a barrier laminate including a substrate and a sealant layer in this order in a thickness direction, wherein the substrate is a barrier substrate including a polypropylene resin layer and an evaporated film, the polypropylene resin layer is a layer subjected to a stretching process, the evaporated film is composed of an inorganic oxide, the barrier laminate after (Continued)

heat treatment at 120° C. for 15 minutes has a thermal shrinkage ratio (MD1) of 2.00% or less in an MD direction and a thermal shrinkage ratio (TD1) of 2.00% or less in a TD direction.

16 Claims, 8 Drawing Sheets

(30) Foreign Application Priority Data

| | | |
|---|---|---|
| Aug. 5, 2021 | (JP) | 2021-129340 |
| Aug. 5, 2021 | (JP) | 2021-129345 |
| Sep. 30, 2021 | (JP) | 2021-162352 |
| Dec. 28, 2021 | (JP) | 2021-214658 |
| Jan. 31, 2022 | (JP) | 2022-013760 |
| Jan. 31, 2022 | (JP) | 2022-013764 |

(51) Int. Cl.
*B32B 7/12* (2006.01)
*B32B 27/08* (2006.01)
*B32B 27/32* (2006.01)
*B65D 75/00* (2006.01)

(52) U.S. Cl.
CPC ............ *B32B 27/32* (2013.01); *B65D 75/008* (2013.01); *B32B 2250/02* (2013.01); *B32B 2250/03* (2013.01); *B32B 2250/242* (2013.01); *B32B 2255/10* (2013.01); *B32B 2255/20* (2013.01); *B32B 2255/26* (2013.01); *B32B 2255/28* (2013.01); *B32B 2307/308* (2013.01); *B32B 2307/7244* (2013.01); *B32B 2307/7246* (2013.01); *B32B 2439/70* (2013.01)

(58) Field of Classification Search
CPC ....... B32B 27/306; B32B 27/34; B32B 27/36; B32B 27/40; B32B 2250/24; B32B 2307/30; B32B 2307/31; B32B 2439/06; B32B 2439/46
See application file for complete search history.

(56) References Cited

U.S. PATENT DOCUMENTS

| | | | | |
|---|---|---|---|---|
| 4,910,085 | A * | 3/1990 | Raniere | C09J 123/10 428/476.3 |
| 4,938,683 | A * | 7/1990 | Boice | B32B 27/08 428/521 |
| 4,966,795 | A * | 10/1990 | Genske | C08L 23/12 428/518 |
| 5,002,811 | A * | 3/1991 | Bauer | C08L 53/025 428/522 |
| 5,011,719 | A * | 4/1991 | Gehrke | C08L 23/142 428/521 |
| 5,071,686 | A * | 12/1991 | Genske | C08L 23/142 525/240 |
| 5,091,241 | A * | 2/1992 | Lang | B32B 27/08 428/347 |
| 5,093,164 | A * | 3/1992 | Bauer | B29C 48/185 428/476.3 |
| 5,098,794 | A * | 3/1992 | Schaefer | B32B 27/16 428/457 |
| 5,137,763 | A * | 8/1992 | Bauer | C08L 23/10 428/522 |
| 5,165,988 | A * | 11/1992 | Schaefer | B32B 15/08 428/34.7 |
| 5,268,209 | A * | 12/1993 | Hunt | B32B 27/06 428/354 |
| 5,273,797 | A * | 12/1993 | Hazelton | B32B 25/08 428/494 |
| 5,577,369 | A * | 11/1996 | Becker | A61J 1/2093 53/449 |
| 5,663,002 | A * | 9/1997 | Schirmer | C08J 5/18 428/476.3 |
| 5,882,749 | A * | 3/1999 | Jones | B65D 77/2096 428/34.8 |
| 6,333,084 | B1 * | 12/2001 | Woodard | C23C 14/205 428/458 |
| 6,867,539 | B1 * | 3/2005 | McCormick | H10K 50/844 313/506 |
| 8,642,144 | B2 * | 2/2014 | Curie | B32B 27/32 428/34.8 |
| 9,156,972 | B2 * | 10/2015 | Duguid | C08L 23/12 |
| 10,040,613 | B2 * | 8/2018 | Radosta | B65D 25/16 |
| 10,099,453 | B2 * | 10/2018 | Mazzola | B32B 7/12 |
| 10,149,398 | B2 * | 12/2018 | Lin | H05K 5/03 |
| 10,865,028 | B2 * | 12/2020 | Chew | B32B 27/10 |
| 12,397,534 | B2 * | 8/2025 | Utz | C09J 7/29 |
| 2024/0343458 | A1 * | 10/2024 | Furuya | B65D 65/40 |
| 2025/0296303 | A1 * | 9/2025 | Imai | B32B 27/16 |

FOREIGN PATENT DOCUMENTS

| | | |
|---|---|---|
| JP | 2009-202519 | 9/2009 |
| JP | 2011-214089 | 10/2011 |
| JP | 2012-0076292 | 4/2012 |
| JP | 2017-024377 | 2/2017 |
| JP | 2018-053180 | 4/2018 |
| JP | 2019-000991 | 1/2019 |
| JP | 2019-006462 | 1/2019 |
| JP | 2019-217763 | 12/2019 |
| JP | 2021-020391 | 2/2021 |
| JP | 2021-024266 | 2/2021 |
| JP | 2021-054077 | 4/2021 |
| JP | 2021-054078 | 4/2021 |
| JP | 2021-066839 | 4/2021 |
| JP | 2021-079704 | 5/2021 |
| JP | 2022-093021 | 6/2022 |
| WO | 2009/084518 | 7/2009 |
| WO | 2017/221781 | 12/2017 |
| WO | 2019/087960 | 5/2019 |
| WO | 2019/189490 | 10/2019 |
| WO | 2020/031712 A1 | 2/2020 |
| WO | 2020/045629 | 3/2020 |
| WO | 2021/020400 | 2/2021 |
| WO | 2021/065890 | 4/2021 |

OTHER PUBLICATIONS

International Preliminary Report on Patentability, issued in the corresponding PCT Application No. PCT/JP2022/030114, dated Feb. 6, 2024, 13 pages (with machine translation).
Japanese Notice of Submission of Publications, issued in the corresponding Japanese patent application No. 2021-129332, dated Nov. 22, 2024, 11 pages with the machine translation.
Japanese Office Action, issued in the corresponding Japanese patent application No. 2021-162352, dated Jul. 11, 2025, 11 pages with the machine translation.
Japanese Office Action, issued in the corresponding Japanese patent application No. 2021-129340, dated May 9, 2025, 11 pages with the machine translation.
Japanese Office Action, issued in the corresponding Japanese patent application No. 2021-129345, dated May 9, 2025, 11 pages with the machine translation.
Extended European Search Report, issued in the corresponding European patent application No. 22853186.9, dated May 14, 2025, 9 pages.
Japanese Office Action, issued in the corresponding Japanese patent application No. 2021-129332, dated Sep. 9, 2025, 9 pages with the machine translation.
Japanese Office Action, issued in the corresponding Japanese patent application No. 2021-129340, dated Sep. 9, 2025, 10 pages with the machine translation.
Japanese Office Action, issued in the corresponding Japanese patent application No. 2021-129345, dated Sep. 9, 2025, 12 pages with the machine translation.

(56) References Cited

OTHER PUBLICATIONS

Notice of Termination of Reconsideration by Examiners before Appeal Proceedings, issued in the corresponding Japanese Patent application no. 2021-129332, dated Jul. 17, 2026, 2 pages with machine translation.
Notice of Termination of Reconsideration by Examiners before Appeal Proceedings, issued in the corresponding Japanese Patent application no. 2021-129340, dated Jul. 17, 2026, 2 pages with machine translation.
Japanese Reconsideration Report by Examiners before Appeal, issued in corresponding Japanese Patent application no. 2021-129332, Jul. 14, 2026, 8 pages with machine translation.
Japanese Reconsideration Report by Examiner before Appeal, issued in the corresponding Japanese Patent application no. 2021-129340, dated Jul. 14, 2026, 9 pages with translation.

* cited by examiner

BARRIER LAMINATE, LID MATERIAL, AND PACKAGING CONTAINER

CROSS-REFERENCE TO RELATED APPLICATIONS

The present application claims priority from Japanese Patent Application No. 2021-129332 filed on Aug. 5, 2021, Japanese Patent Application No. 2021-129339 filed on Aug. 5, 2021, Japanese Patent Application No. 2021-129340 filed on Aug. 5, 2021, Japanese Patent Application No. 2021-129345 filed on Aug. 5, 2021, Japanese Patent Application No. 2021-162352 filed on Sep. 30, 2021, Japanese Patent Application No. 2021-214658 filed on Dec. 28, 2021, Japanese Patent Application No. 2022-013764 filed on Jan. 31, 2022, and Japanese Patent Application No. 2022-013760 filed on Jan. 31, 2022, the entire disclosures of which are incorporated herein by reference.

TECHNICAL FIELD

The present disclosure relates to a barrier laminate, a lid material, and a packaging container.

BACKGROUND ART

Films formed of polyesters, such as poly(ethylene terephthalate), (hereinafter also referred to as "polyester films") have good mechanical characteristics, chemical stability, heat resistance, and transparency, and are inexpensive. Thus, polyester films have been used as substrates constituting laminates used to produce packaging containers.

Depending on the contents to be filled in a packaging container, the packaging container is required to have gas barrier properties, such as oxygen barrier properties and water vapor barrier properties. To satisfy these requirements, an evaporated film containing alumina, silica, or the like is formed on the surface of a polyester film (see, for example, Patent Literature 1). In recent years, alternative substrates to polyester films have been sought. Polyolefin films, in particular polypropylene films, have been investigated for use as the substrates.

CITATION LIST

Patent Literature

PTL 1: Japanese Unexamined Patent Application Publication No. 2005-053223

SUMMARY OF INVENTION

Technical Problem

The present inventors have studied the use of a stretched film of polypropylene (hereinafter also referred to as a "stretched polypropylene film") instead of known polyester films. On the basis of study results, the present inventors have found that a laminate with two elements, that is, a barrier substrate including an evaporated film formed on a stretched polypropylene film and a sealant layer, may have insufficient gas barrier properties.

One of the problems to be solved by the present disclosure is to improve the gas barrier properties of a laminate that includes a barrier substrate including an evaporated film formed on a stretched polypropylene film and a sealant layer.

Solution to Problem

A barrier laminate according to a first aspect of the present disclosure includes a substrate and a sealant layer in this order in a thickness direction, wherein the substrate is a barrier substrate including a polypropylene resin layer and an evaporated film, the polypropylene resin layer is a layer subjected to a stretching process, the evaporated film is composed of an inorganic oxide, and the barrier laminate after heat treatment at 120° C. for 15 minutes has a thermal shrinkage ratio (MD1) of 2.00% or less in an MD direction and a thermal shrinkage ratio (TD1) of 2.00% or less in a TD direction.

Advantageous Effects of Invention

The present disclosure can improve the gas barrier properties of a laminate that includes a barrier substrate including an evaporated film formed on a stretched polypropylene film and a sealant layer.

DESCRIPTION OF EMBODIMENTS

Figure 1:
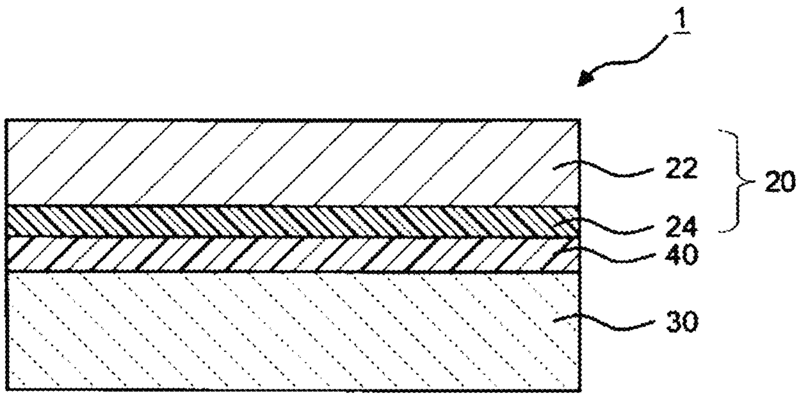
FIG. 1 is a schematic cross-sectional view of an embodiment of a barrier laminate.

In the present description, when a plurality of upper limit candidates and a plurality of lower limit candidates are described for a certain parameter, the numerical range of the parameter may be configured by combining any one of the upper limit candidates and any one of the lower limit candidates. For example, an explanation is given to the phrase "The parameter B is preferably A1 or more, more preferably A2 or more, still more preferably A3 or more, and preferably A4 or less, more preferably A5 or less, still more preferably A6 or less." In this example, the numerical range of the parameter B may be A1 or more and A4 or less, A1 or more and A5 or less, A1 or more and A6 or less, A2 or more and A4 or less, A2 or more and A5 or less, A2 or more and A6 or less, A3 or more and A4 or less, A3 or more and A5 or less, or A3 or more and A6 or less.

Embodiments of the present disclosure are described in detail below. The present disclosure can be implemented in many different forms and is not to be construed as limited to the description of the following embodiments. In the drawings, for the sake of clarity, the width, thickness, shape, and the like of each layer may be more schematic than those in the embodiments, and the drawings are only examples and do not limit the interpretation of the present disclosure. In the present description and drawings, the same reference numerals are given to the same elements as those already described with reference to the previous drawings, and detailed description thereof may be appropriately omitted.

Components in the following description may be used alone or in combination. These components are, for example, a polyolefin, such as polypropylene or polyethylene, an α-olefin, a resin material, an additive agent, an adhesive resin, an inorganic oxide, a gas barrier resin, a propylene-ethylene block copolymer, and a thermoplastic elastomer.

A barrier laminate according to a first aspect of the present disclosure includes a substrate and a sealant layer in this order in a thickness direction, wherein the substrate is a barrier substrate including a polypropylene resin layer and an evaporated film, the polypropylene resin layer is a layer subjected to a stretching process, the evaporated film is composed of an inorganic oxide, and the barrier laminate after heat treatment at 120° C. for 15 minutes has a thermal shrinkage ratio (MD1) of 2.00% or less in an MD direction and a thermal shrinkage ratio (TD1) of 2.00% or less in a TD direction.

A barrier laminate according to a second aspect of the present disclosure includes a first substrate, a second substrate, and a sealant layer in this order in a thickness direction, wherein one of the first substrate and the second substrate is a barrier substrate including a polypropylene resin layer and an evaporated film, the other of the first substrate and the second substrate is a polypropylene resin substrate, the polypropylene resin layer is a layer subjected to a stretching process, the evaporated film is composed of an inorganic oxide, and the polypropylene resin substrate is a substrate subjected to a stretching process.

The present inventors have studied the use of a stretched polypropylene film instead of a known polyester film. On the basis of study results, the present inventors have found that a laminate with two elements, that is, a barrier substrate including an evaporated film formed on a stretched polypropylene film and a sealant layer, may have insufficient gas barrier properties. The first aspect and the second aspect can improve the gas barrier properties of a laminate that includes a barrier substrate including an evaporated film formed on a stretched polypropylene film and a sealant layer.

A barrier laminate according to a third aspect of the present disclosure includes a substrate, an adhesive layer, and a sealant layer in this order in a thickness direction, wherein the substrate is a barrier substrate including a polyolefin resin layer and an evaporated film, the polyolefin resin layer is a layer subjected to a stretching process, the evaporated film is composed of an inorganic oxide, and the adhesive layer is a layer with a thickness of 2 μm or less.

The present inventors have studied the use of a stretched film of a polyolefin (hereinafter also referred to as a "stretched polyolefin film") instead of known polyester films. A packaging container is usually opened by tearing a portion of the packaging container when used. Thus, it is desired to improve the tearability of a laminate constituting a packaging container. The third aspect can improve the tearability of a laminate that includes a barrier substrate including an evaporated film formed on a stretched polyolefin film and a sealant layer.

A barrier laminate according to a fourth aspect of the present disclosure includes a substrate, an adhesive layer, and a sealant layer in this order in a thickness direction, wherein the substrate is a barrier substrate including a polypropylene resin layer and an evaporated film, the polypropylene resin layer is a layer subjected to a stretching process, the evaporated film is composed of an inorganic oxide, the adhesive layer is a layer with a thickness of 2 μm or less, and an amount of residual solvent in the barrier laminate is 10 $mg/m^2$ or less.

The present inventors have studied the use of a stretched polypropylene film instead of a known polyester film. When a laminate including a stretched polypropylene film and a sealant film is produced, an adhesive layer is typically provided between the films. When the laminate is produced, the temperature at the time of drying an adhesive agent should be decreased to prevent degradation or thermal shrinkage of the stretched polypropylene film as compared with a laminate including a polyester film. In this case, a solvent in the adhesive agent may be insufficiently removed by volatilization and remains in the laminate, and a malodor due to the residual solvent may remain. The fourth aspect can reduce the amount of residual solvent in a laminate that includes a barrier substrate including an evaporated film formed on a stretched polypropylene film and a sealant layer.

A packaging bag according to a fifth aspect of the present disclosure includes a barrier laminate including a first substrate, a first adhesive layer, a second substrate, a second adhesive layer, and a sealant layer in this order in a thickness direction, wherein the first substrate is a polypropylene resin substrate subjected to a stretching process, the second substrate is a barrier substrate including a polypropylene resin layer subjected to a stretching process and an evaporated film composed of an inorganic oxide, the second substrate is disposed such that the evaporated film faces the first substrate and the polypropylene resin layer faces the sealant layer, the sealant layer is a polypropylene resin layer, the first adhesive layer has a thickness of 10 μm or less, and the second adhesive layer has a thickness of 10 μm or less.

A packaging bag according to a sixth aspect of the present disclosure includes a barrier laminate including a first substrate, a first adhesive layer, a second substrate, a second adhesive layer, and a sealant layer in this order in a thickness direction, wherein the first substrate is a polypropylene resin substrate subjected to a stretching process, the second substrate is a barrier substrate including a polypropylene resin layer subjected to a stretching process and an evaporated film composed of an inorganic oxide, the second substrate is disposed such that the evaporated film faces the first substrate and the polypropylene resin layer faces the sealant layer, the sealant layer is a polypropylene resin layer, the first adhesive layer has a thickness of 2 μm or less, and the second adhesive layer has a thickness of 2 μm or less.

The present inventors have studied the use of a stretched polypropylene film instead of a known polyester film. On the basis of study results, the present inventors have found that a laminate with two elements, that is, a barrier substrate including an evaporated film formed on a stretched polypropylene film and a sealant layer, may have insufficient gas barrier properties. The fifth aspect and the sixth aspect can improve the gas barrier properties of a packaging bag including a laminate that includes a barrier substrate including an evaporated film formed on a stretched polypropylene film and a sealant layer. In particular, it is possible to provide a packaging bag with good gas barrier properties even after a retort process.

A laminate according to a seventh aspect of the present disclosure includes a substrate and a sealant layer, wherein the substrate includes a polypropylene resin layer subjected to a stretching process, the sealant layer contains a propylene-ethylene block copolymer as a main component, a thermoplastic elastomer, and polyethylene, the sealant layer has a melting peak temperature observed in the range of 100° C. or more and less than 120° C., and the laminate is for a packaging material. In the laminate according to the seventh aspect, in one embodiment, the substrate is a barrier substrate including a polypropylene resin layer subjected to a stretching process and an evaporated film. The barrier substrate may further include a layer described later.

In the laminate according to the seventh aspect, in one embodiment, the substrate is composed of a polypropylene resin layer subjected to a stretching process. In other words, in one embodiment, the substrate is a polypropylene resin substrate subjected to a stretching process.

A resin film has been used as a packaging material. For example, a resin film composed of a polyolefin is widely used as a sealant film due to its flexibility, transparency, and high heat sealability. In general, an unstretched resin film composed of a polyolefin cannot be used as a substrate from the perspective of strength and heat resistance and is used by being bonded to a polyester film or a nylon film. Thus, an ordinary packaging container is composed of a laminated film in which a substrate and a sealant film are made of different resin materials (see, for example, Japanese Unexamined Patent Application Publication No. 2009-202519).

In recent years, with an increase in demand for construction of recycling-oriented society, packaging containers with high recyclability have been demanded. However, known packaging containers are composed of different resin materials, are difficult to separate the resin materials from each other, and therefore have not been recycled.

The present inventors have studied the use of polypropylene as a single material from the perspective of the use of a single material (monomaterial) that is easy to recycle. More specifically, the present inventors have studied the use of a polypropylene-containing stretched substrate instead of a polyester film or a nylon film as a substrate in combination with a polypropylene-containing sealant film. With such a structure, both the substrate and the sealant film are composed of polypropylene, and the packaging container can have improved recyclability.

It is desirable that a packaging container, such as a retort pouch, have heat resistance to withstand heat treatment and drop impact resistance to withstand an impact when the pouch is dropped. For example, a nylon film has high drop impact resistance and is therefore suitable as a substrate for a packaging container requiring drop impact resistance. However, the present inventors have found that a packaging container composed of a laminate including a polypropylene-containing stretched substrate and a polypropylene-containing sealant layer does not have sufficient drop impact resistance. The seventh aspect can increase the drop impact resistance of a laminate for a packaging material including a polypropylene-containing stretched substrate and a polypropylene-containing sealant layer.

A laminate according to an eighth aspect of the present disclosure includes a first substrate and a sealant layer. The first substrate includes a stretched resin layer containing polypropylene as a main component, and the sealant layer is a resin layer containing polypropylene as a main component. The term "stretched resin layer", as used herein, refers to a resin layer subjected to a stretching process. In one embodiment, the polypropylene contained in the stretched resin layer has an extrapolated initial melting temperature (Tim) at first heating obtained by differential scanning calorimetry (DSC) according to JIS K 7121: 2012 higher than Tim of the polypropylene contained in the sealant layer at the first heating obtained by the DSC. In one embodiment, when the laminate is heat-sealed under heat-sealing conditions of a pressure of 0.1 MPa and a time of 1 second, a heat-sealing temperature range in which seal strength by T-type peeling at a test speed of 300 mm/min is 23 N/15 mm or more and the laminate has a shrinkage ratio of 0% or more and 1.0% or less in a TD direction is 5° C. or more in the range of 130° C. or more and 190° C. or less. The laminate is for a packaging material.

The substrate is usually required to have heat resistance enough to withstand heat applied during printing or heat sealing. Thus, it is desirable that the substrate have heat resistance even when made of a single material. As compared with a polyester film and a nylon film, however, a polypropylene-containing stretched substrate tends to have insufficient heat resistance. Thus, when a laminate including a polypropylene-containing stretched substrate and a polypropylene-containing sealant layer is used, the temperature range in which heat sealing can be appropriately performed may be narrowed, for example, due to large thermal shrinkage during heat sealing. The eighth aspect can provide a laminate that includes a polypropylene-containing stretched substrate and a polypropylene-containing sealant layer and has a wide temperature range for high heat sealability and can provide, for example, a laminate with high seal strength and smaller thermal shrinkage during heat sealing.

In the following description, the barrier laminates according to the first to fourth aspects, the barrier laminates used in the fifth and sixth aspects, and the laminates according to the seventh and eighth laminates are also collectively referred to simply as a "laminate". A laminate and a packaging container, such as a packaging bag, according to the present disclosure are described in detail below. In the following description, matters common to the first to eighth aspects are collectively described.

[Laminate]

A laminate according to the present disclosure includes a substrate and a sealant layer in this order in the thickness direction. A laminate according to the present disclosure preferably includes a substrate, an adhesive layer, and a sealant layer in this order in the thickness direction. In one embodiment, the substrate is a barrier substrate including a polyolefin resin layer and an evaporated film.

A laminate according to the present disclosure may include two or more substrates. A laminate according to the present disclosure preferably includes a first substrate, a second substrate, and a sealant layer in this order in the thickness direction. A laminate according to the present disclosure more preferably includes a first substrate, a first adhesive layer, a second substrate, a second adhesive layer, and a sealant layer in this order in the thickness direction.

In one embodiment, the first substrate and the second substrate are each independently a barrier substrate or a polyolefin resin substrate. In one embodiment, one of the first substrate and the second substrate is a barrier substrate including a polyolefin resin layer and an evaporated film. In one embodiment, the other of the first substrate and the second substrate is a polyolefin resin substrate subjected to a stretching process. Although a barrier substrate is used as one of the first substrate and the second substrate and a polyolefin resin substrate is used as the other of the first substrate and the second substrate in one embodiment, both the first substrate and the second substrate may be barrier substrates or polyolefin resin substrates in another embodiment.

The polyolefin resin layer is subjected to a stretching process.

In one embodiment, the polyolefin resin layer is a polypropylene resin layer, and the polyolefin resin substrate is a polypropylene resin substrate.

The evaporated film is composed of an inorganic oxide.

FIGS. 1 to 9 are schematic cross-sectional views of an embodiment of a laminate.

A laminate 1 illustrated in FIG. 1 includes a barrier substrate 20 as a substrate, an adhesive layer 40, and a sealant layer 30 in this order in the thickness direction. The barrier substrate 20 includes a polyolefin resin layer 22 and an evaporated film 24. In this example, the polyolefin resin layer 22 constitutes the outermost layer of the laminate 1, and the evaporated film 24 is in contact with the adhesive layer 40.

Figure 2:
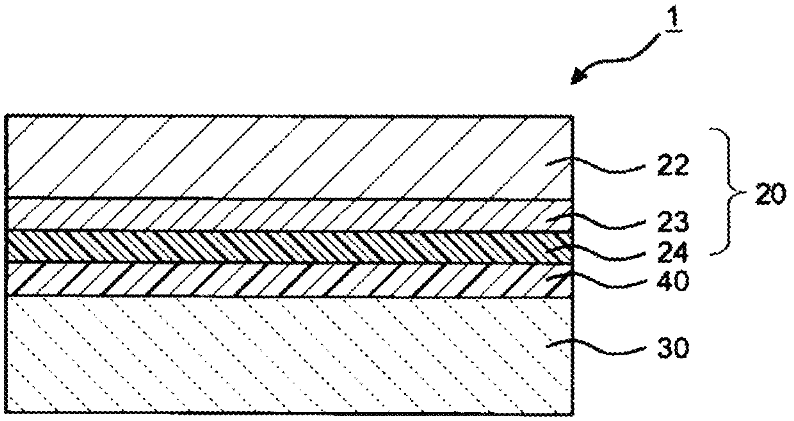
FIG. 2 is a schematic cross-sectional view of an embodiment of a barrier laminate.

FIG. 2 is the same as FIG. 1 except that the barrier substrate 20 includes a surface coating layer or a surface resin layer 23 between the polyolefin resin layer 22 and the evaporated film 24.

Figure 3:
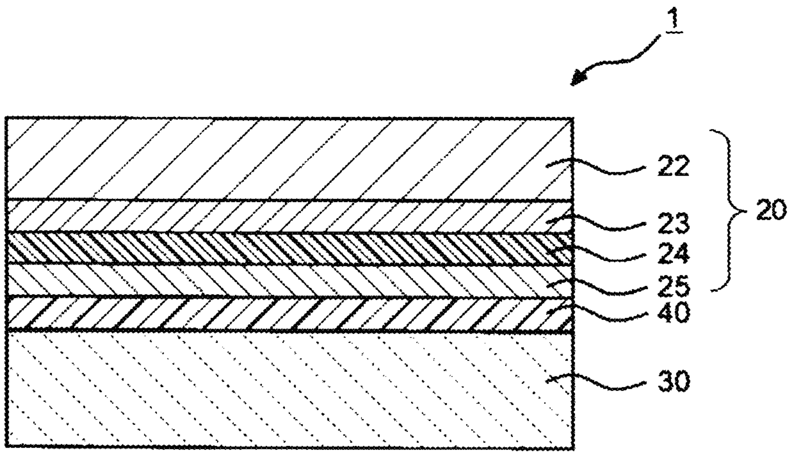
FIG. 3 is a schematic cross-sectional view of an embodiment of a barrier laminate.

FIG. 3 is the same as FIG. 1 except that the barrier substrate 20 includes the polyolefin resin layer 22, the surface coating layer or the surface resin layer 23, the evaporated film 24, and a barrier coating layer 25 in this order in the thickness direction. In this example, the barrier coating layer 25 is in contact with the adhesive layer 40.

Figure 4:
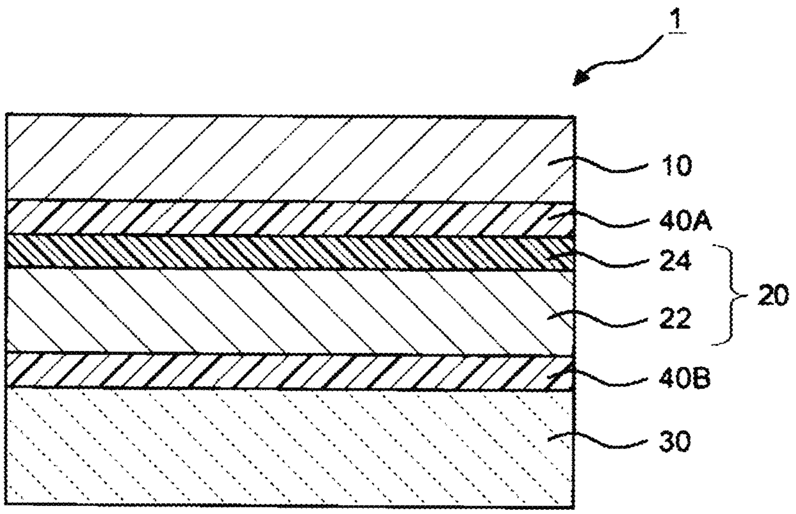
FIG. 4 is a schematic cross-sectional view of an embodiment of a barrier laminate.

The laminate 1 illustrated in FIG. 4 includes a polyolefin resin substrate 10 as a first substrate, a first adhesive layer 40A, the barrier substrate 20 as a second substrate, a second adhesive layer 40B, and the sealant layer 30 in this order in the thickness direction. The barrier substrate 20 includes a polyolefin resin layer 22 and an evaporated film 24. In this example, the polyolefin resin layer 22 is in contact with the second adhesive layer 40B, and the evaporated film 24 is in contact with the first adhesive layer 40A.

Figure 5:
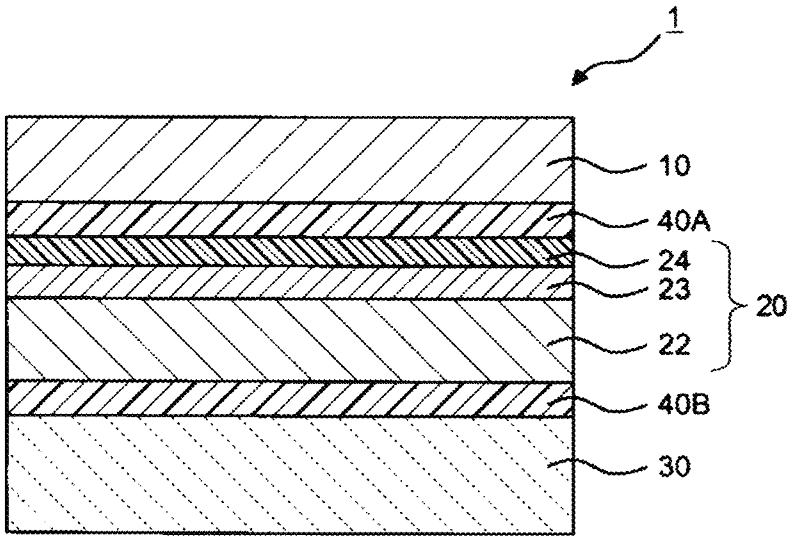
FIG. 5 is a schematic cross-sectional view of an embodiment of a barrier laminate.

FIG. 5 is the same as FIG. 4 except that the barrier substrate 20 includes the surface coating layer or the surface resin layer 23 between the polyolefin resin layer 22 and the evaporated film 24.

Figure 6:
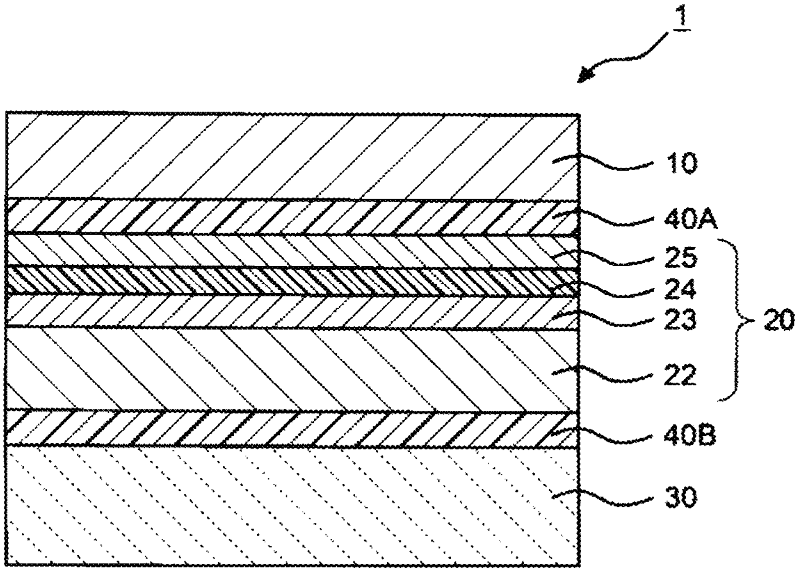
FIG. 6 is a schematic cross-sectional view of an embodiment of a barrier laminate.

FIG. 6 is the same as FIG. 4 except that the barrier substrate 20 includes the polyolefin resin layer 22, the surface coating layer or the surface resin layer 23, the evaporated film 24, and the barrier coating layer 25 in this order in the thickness direction. In this example, the barrier coating layer 25 is in contact with the first adhesive layer 40A.

Figure 7:
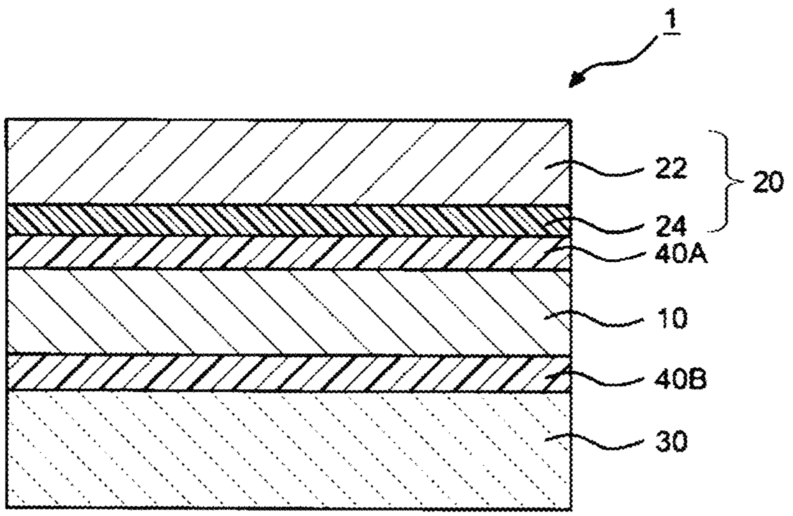
FIG. 7 is a schematic cross-sectional view of an embodiment of a barrier laminate.

A laminate 1 illustrated in FIG. 7 includes the barrier substrate 20 as a first substrate, the first adhesive layer 40A, the polyolefin resin substrate 10 as a second substrate, the second adhesive layer 40B, and the sealant layer 30 in this order in the thickness direction. The barrier substrate 20 includes the polyolefin resin layer 22 and the evaporated film 24. In this example, the polyolefin resin layer 22 constitutes the outermost layer of the laminate 1, and the evaporated film 24 is in contact with the first adhesive layer 40A.

Figure 8:
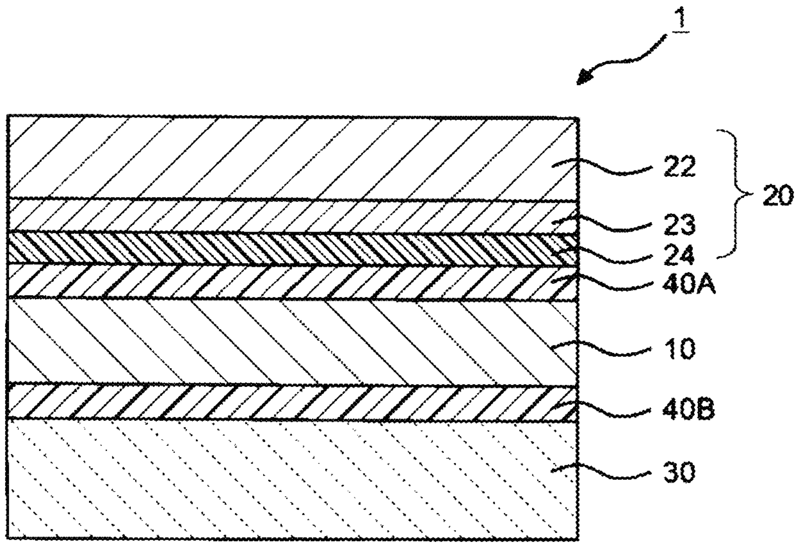
FIG. 8 is a schematic cross-sectional view of an embodiment of a barrier laminate.

FIG. 8 is the same as FIG. 7 except that the barrier substrate 20 includes the surface coating layer or the surface resin layer 23 between the polyolefin resin layer 22 and the evaporated film 24.

Figure 9:
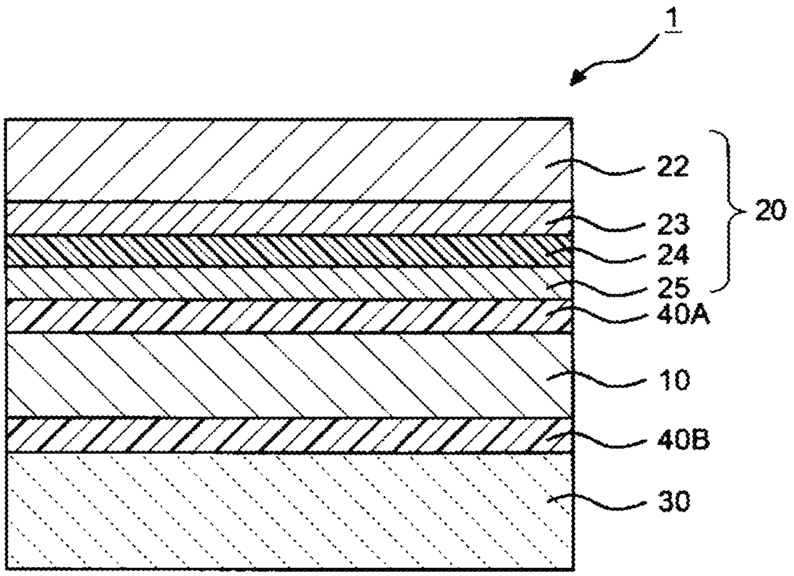
FIG. 9 is a schematic cross-sectional view of an embodiment of a barrier laminate.

FIG. 9 is the same as FIG. 7 except that the barrier substrate 20 includes the polyolefin resin layer 22, the surface coating layer or the surface resin layer 23, the evaporated film 24, and the barrier coating layer 25 in this order in the thickness direction. In this example, the barrier coating layer 25 is in contact with the first adhesive layer 40A.

In FIGS. 1 to 9, the polyolefin resin layer 22 may be a polypropylene resin layer, and the polyolefin resin substrate 10 may be a polypropylene resin substrate.

Specific examples of the layered structure of a laminate according to the present disclosure, particularly the laminates according to the seventh aspect and the eighth aspect, are described below. "/" represents a boundary between layers. An "OPP film" refers to a polypropylene resin substrate subjected to a stretching process.

(1) OPP film/print layer/adhesive layer/sealant layer
(2) Barrier substrate/print layer/adhesive layer/sealant layer
(3) OPP film/print layer/adhesive layer/barrier substrate/adhesive layer/sealant layer
(4) Barrier substrate/print layer/adhesive layer/OPP film/adhesive layer/sealant layer
(5) Barrier substrate/print layer/adhesive layer/barrier substrate/adhesive layer/sealant layer
(6) OPP film/print layer/adhesive layer/OPP film/adhesive layer/sealant layer In one embodiment, a barrier laminate according to the present disclosure includes at least three elements: a polyolefin resin substrate, a barrier substrate, and a sealant layer. This can further improve gas barrier properties (in particular, oxygen barrier properties and water vapor barrier properties) as compared with a laminate including two elements of a barrier substrate and a sealant layer. This point appears more clearly in a barrier laminate after heat treatment and/or after a Gelbo Flex test. A barrier laminate according to the present disclosure has a small thermal shrinkage ratio when subjected to heat treatment and therefore has high bag-making suitability.

When the first substrate is a barrier substrate, in one embodiment, the first substrate is disposed such that the evaporated film faces the sealant layer and the polyolefin resin layer faces the side opposite the sealant layer.

When the second substrate is a barrier substrate, in one embodiment, the second substrate is disposed such that the evaporated film faces the first substrate and the polyolefin resin layer faces the sealant layer, or the second substrate is disposed such that the evaporated film faces the sealant layer and the polyolefin resin layer faces the first substrate. Among these, from the perspective of further reducing the degradation or the like of the evaporated film, when the second substrate is a barrier substrate, the second substrate is preferably disposed such that the evaporated film faces the first substrate and the polyolefin resin layer faces the sealant layer.

In one embodiment, in a barrier laminate according to the present disclosure, the first substrate is a polyolefin resin substrate, and the second substrate is a barrier substrate (see FIGS. 4 to 6). In this embodiment, the barrier laminate includes a polyolefin resin substrate, a barrier substrate, and a sealant layer in this order in the thickness direction. The barrier laminate with such a structure appropriately protects the evaporated film when subjected to heat treatment or the like and has higher gas barrier properties (in particular, oxygen barrier properties and water vapor barrier properties) than a laminate including two elements of the barrier substrate and the sealant layer, and has much higher gas barrier properties (in particular, oxygen barrier properties) than a laminate including three elements of the barrier substrate, the polyolefin resin substrate, and the sealant layer in this order in the thickness direction. For example, the barrier laminate according to the present embodiment also has higher gas barrier properties after a boiling process or after a retort process. The barrier laminate according to the present embodiment appropriately protects the evaporated film when subjected to heat treatment or the like, has high gas barrier properties, has a smaller thermal shrinkage ratio when subjected to heat treatment, and therefore has much higher bag-making suitability.

In the above description, in one embodiment, the polyolefin resin layer is a polypropylene resin layer, and the polyolefin resin substrate is a polypropylene resin substrate.

The phrase "AAA composed of a polyolefin", as used herein, means that a main component of AAA is a polyolefin and is not limited to AAA composed only of a polyolefin. AAA may contain a component other than the polyolefin. More specifically, the polyolefin content of AAA is typically more than 50% by mass, preferably 70% by mass or more, more preferably 80% by mass or more, still more preferably 90% by mass or more, still more preferably 95% by mass or more. In one embodiment, the polyolefin can be read as polypropylene.

<Barrier Substrate>

A barrier laminate according to the present disclosure includes a barrier substrate as a substrate.

The barrier substrate includes a polyolefin resin layer and an evaporated film. In one embodiment, the barrier substrate includes a polyolefin resin layer and an evaporated film provided on one surface of the resin layer. The barrier substrate may include a surface coating layer or a surface resin layer between the polyolefin resin layer and the evaporated film. The barrier substrate may include a barrier coating layer on the evaporated film.

A barrier laminate according to the present disclosure preferably includes a first substrate, a second substrate, and a sealant layer in this order in the thickness direction. A barrier laminate according to the present disclosure more preferably includes a first substrate, a first adhesive layer, a second substrate, a second adhesive layer, and a sealant layer in this order in the thickness direction. The barrier substrate constitutes the first substrate or the second substrate. When the polyolefin resin substrate is the first substrate, the barrier substrate is the second substrate. When the polyolefin resin substrate is the second substrate, the barrier substrate is the first substrate. Although a barrier substrate is used as one of the first substrate and the second substrate and a polyolefin resin substrate is used as the other of the first substrate and the second substrate in the present embodiment, both the first substrate and the second substrate may be barrier substrates in another embodiment.

In one embodiment, the polyolefin resin layer is a polypropylene resin layer, and the polyolefin resin substrate is a polypropylene resin substrate.

(Polyolefin Resin Layer)

The polyolefin resin substrate is composed of a polyolefin. The polyolefin is, for example, polyethylene, polypropylene, or polymethylpentene. Among the polyolefins, polyethylene and polypropylene are preferred. Thus, the polyolefin resin layer is preferably a polyethylene resin layer or a polypropylene resin layer.

In one embodiment, the polyolefin resin layer is a polyethylene resin substrate composed of polyethylene. The polyethylene is, for example, a high-density polyethylene, a medium-density polyethylene, a low-density polyethylene, a linear low-density polyethylene, or a very-low-density polyethylene. Among these, a high-density polyethylene and a medium-density polyethylene are preferred from the perspective of the strength and heat resistance of the substrate, and a medium-density polyethylene is more preferred from the perspective of stretchability.

In the present disclosure, a high-density polyethylene preferably has a density of more than 0.945 g/cm$^3$. The upper limit of the density of a high-density polyethylene is 0.965 g/cm$^3$, for example. A medium-density polyethylene preferably has a density of more than 0.925 g/cm$^3$ and 0.945 g/cm$^3$ or less. A low-density polyethylene preferably has a density of more than 0.900 g/cm$^3$ and 0.925 g/cm$^3$ or less. A linear low-density polyethylene preferably has a density of more than 0.900 g/cm$^3$ and 0.925 g/cm$^3$ or less. A very-low-density polyethylene preferably has a density of 0.900 g/cm$^3$ or less. The lower limit of the density of a very-low-density polyethylene is 0.860 g/cm$^3$, for example. The density of the polyethylene is measured in accordance with JIS K 7112: 1999, particularly by a D method (a density-gradient tube method, 23° C.).

From the perspective of film formability and processability, in one embodiment, the polyethylene preferably has a melt flow rate (MFR) of 0.1 g/10 min or more, more preferably 0.3 g/10 min or more, and preferably 50 g/10 min or less, more preferably 30 g/10 min or less. In the present disclosure, the MFR of the polyethylene is measured under conditions of a temperature of 190° C. and a load of 2.16 kg in accordance with JIS K 7210-1: 2014, method A.

In one embodiment, the polyolefin resin layer is a polypropylene resin layer composed of polypropylene. A barrier substrate with a layer composed of polypropylene can improve, for example, the oil resistance of a packaging container produced using the barrier substrate.

The polypropylene may be any of a homopolymer, a random copolymer, and a block copolymer, or may be a mixture of two or more selected from these.

The propylene homopolymer is a polymer of propylene alone. The propylene random copolymer is a random copolymer of propylene and an α-olefin or the like other than propylene. The propylene block copolymer is a copolymer with a polymer block composed of propylene and a polymer block composed of at least an α-olefin or the like other than propylene. The polymer block composed of at least an α-olefin or the like other than propylene may be a polymer block composed of propylene and an α-olefin other than propylene.

The α-olefin is, for example, an α-olefin with 2 or more and 20 or less carbon atoms, more specifically, ethylene, 1-butene, 1-pentene, 1-hexene, 1-octene, 1-decene, 1-dodecene, 1-tetradecene, 1-hexadecene, 1-octadecene, 1-eicosene, 3-methyl-1-butene, 4-methyl-1-pentene, or 6-methyl-1-heptene.

Among these polypropylenes, a random copolymer is preferably used from the perspective of transparency. When the rigidity and heat resistance of a packaging container are regarded as important, a homopolymer is preferably used. When the drop impact resistance of a packaging container is regarded as important, a block copolymer is preferably used.

From the perspective of film formability and processability, in one embodiment, the polypropylene preferably has a melt flow rate (MFR) of 0.1 g/10 min or more, more preferably 0.3 g/10 min or more, and preferably 50 g/10 min or less, more preferably 30 g/10 min or less. The MFR of the polypropylene is measured under conditions of a temperature of 230° C. and a load of 2.16 kg in accordance with JIS K 7210-1: 2014, method A.

The polyolefin may be a biomass-derived polyolefin or a mechanically recycled or chemically recycled polyolefin. The polypropylene may be a biomass-derived polypropylene or a mechanically recycled or chemically recycled polypropylene.

The polyolefin resin layer preferably has a polyolefin content, particularly a polyethylene or polypropylene content, of 70% by mass or more, more preferably 80% by mass or more, still more preferably 90% by mass or more, still more preferably 95% by mass or more.

The polyolefin resin layer may contain a resin material other than polyolefin. The resin material is, for example, a (meth)acrylic resin, a vinyl resin, a cellulose resin, a polyamide, a polyester, or an ionomer resin. For a polypropylene resin layer, in addition to these resin materials, for example, a polyolefin other than polypropylene, such as polyethylene, may be mentioned.

The polyolefin resin layer may contain an additive agent. The additive agent is, for example, a cross-linker, an antioxidant, an anti-blocking agent, a lubricant (slip) agent, an ultraviolet absorber, a light stabilizer, a filler, a reinforcing agent, an antistatic agent, a pigment, or a modifying resin.

The polyolefin resin layer is a layer subjected to a stretching process. This can improve, for example, the heat resistance, drop impact resistance, water resistance, and dimensional stability of a barrier laminate. A barrier laminate including such a resin layer is suitable, for example, as a packaging material constituting a packaging container to be subjected to a boiling process or a retort process.

The stretching process may be uniaxial stretching or biaxial stretching.

The stretch ratio of stretching in the machine direction (the flow direction of the substrate, the MD direction) is preferably 2 or more, more preferably 5 or more, and preferably 15 or less, more preferably 13 or less. The stretch ratio of stretching in the transverse direction (the direction perpendicular to the MD direction, the TD direction) is preferably 2 or more, more preferably 5 or more, and preferably 15 or less, more preferably 13 or less. The polyolefin resin layer with a stretch ratio of 2 or more can have further improved strength and heat resistance and improved printability. From the perspective of the fracture limit of the polyolefin resin layer, the stretch ratio is preferably 15 or less.

In one embodiment, the polyolefin resin layer may be subjected to surface treatment. This can improve, for example, the adhesion between the polyolefin resin layer and another layer. A surface treatment method is, for example, physical treatment, such as corona discharge treatment, ozone treatment, low-temperature plasma treatment using oxygen gas and/or nitrogen gas, or glow discharge treatment, or chemical treatment, such as oxidation treatment with a chemical.

An easily adherable layer may be provided on the surface of the polyolefin resin layer.

The polyolefin resin layer may have a monolayer structure or a multilayer structure.

The polyolefin resin layer preferably has a thickness of 10 μm or more and preferably 100 μm or less, more preferably 50 μm or less. At a thickness of not less than the lower limit, for example, the barrier laminate can have further improved strength and heat resistance. At a thickness of not more than the upper limit, for example, the barrier laminate can have further improved processability.

(Surface Coating Layer)

In one embodiment, the barrier substrate includes a surface coating layer containing a resin material with a polar group between the polyolefin resin layer and the evaporated film. The surface coating layer containing a resin material with a polar group can improve the adhesiveness and gas barrier properties of the evaporated film formed on the surface coating layer.

In this embodiment, the barrier substrate includes a resin substrate including a polyolefin resin layer and a surface coating layer, and an evaporated film provided on the surface coating layer. The barrier substrate includes the polyolefin resin layer, the surface coating layer, and the evaporated film in this order in the thickness direction.

The polar group refers to a group with at least one heteroatom, for example, an ester group, an epoxy group, a hydroxy group, an amino group, an amide group, a urethane group, a carboxy group, a carbonyl group, a carboxylic anhydride group, a sulfo group, a thiol group, or a halogen group. Among these, from the perspective of the laminating properties of a packaging container, a carboxy group, a carbonyl group, an ester group, a hydroxy group, an amino group, an amide group, and a urethane group are preferred, and a carboxy group, a hydroxy group, an amide group, and a urethane group are more preferred.

The resin material with a polar group is, for example, an ethylene-vinyl alcohol copolymer (EVOH), poly(vinyl alcohol) (PVA), a polyester, poly(ethylene imine), a (meth)acrylic resin with a hydroxy group, a polyamide, such as nylon 6, nylon 6,6, MXD nylon, or amorphous nylon, or a polyurethane. Among these, an ethylene-vinyl alcohol copolymer, poly(vinyl alcohol), a (meth)acrylic resin with a hydroxy group, a polyamide, and a polyurethane are more preferred.

The surface coating layer can be formed, for example, using an aqueous emulsion or a solvent emulsion. The aqueous emulsion is, for example, a polyamide emulsion, a polyethylene emulsion, or a polyurethane emulsion. The solvent emulsion is, for example, a (meth)acrylic resin emulsion or a polyester emulsion.

The amount of the resin material with a polar group in the surface coating layer is preferably 70% by mass or more, more preferably 80% by mass or more, still more preferably 90% by mass or more.

The surface coating layer may contain a resin material other than the resin material with a polar group.

The surface coating layer may contain the additive agent described above.

The ratio of the thickness of the surface coating layer to the total thickness of the resin substrate including the polyolefin resin layer and the surface coating layer is preferably 0.08% or more, more preferably 0.2% or more, still more preferably 1% or more, and preferably 20% or less, more preferably 15% or less, still more preferably 10% or less, still more preferably 5% or less. At a ratio of not less than the lower limit, for example, the evaporated film can have further improved adhesiveness and gas barrier properties, and the packaging container can have further improved laminate strength. At a ratio of not more than the upper limit, for example, the resin substrate can have further improved processability, and the packaging container can have further improved recyclability.

The surface coating layer preferably has a thickness of 0.02 μm or more, more preferably 0.05 μm or more, still more preferably 0.1 μm or more, still more preferably 0.2 μm or more, and preferably 10 μm or less, more preferably 5 μm or less. At a thickness of not less than the lower limit, for example, the evaporated film can have further improved adhesiveness and gas barrier properties, and the packaging container can have further improved laminate strength. At a thickness of not more than the upper limit, for example, the resin substrate can have further improved processability, and the packaging container can have further improved recyclability.

For example, the resin substrate including the polyolefin resin layer and the surface coating layer can be produced by forming a polyolefin or a resin composition containing a polyolefin into a resin film using a T-die method, an inflation method, or the like, stretching the resin film, applying a coating liquid for forming a surface coating layer to the stretched resin film, and drying the coating liquid.

(Surface Resin Layer)

In one embodiment, the barrier substrate includes a surface resin layer containing a resin material with a melting point of 180° C. or more (hereinafter also referred to as a "high-melting-point resin material") between the polyolefin resin layer and the evaporated film. The surface resin layer containing the high-melting-point resin material can improve the adhesiveness and gas barrier properties of the evaporated film formed on the surface resin layer.

In this embodiment, the barrier substrate includes a resin substrate including a polyolefin resin layer and a surface resin layer, and an evaporated film provided on the surface resin layer. The barrier substrate includes the polyolefin resin layer, the surface resin layer, and the evaporated film in this order in the thickness direction.

The high-melting-point resin material preferably has a melting point of 185° C. or more, more preferably 190° C. or more, still more preferably 205° C. or more. At a melting point of not less than the lower limit, for example, the evaporated film can have further improved adhesiveness and gas barrier properties, and the packaging container can have further improved laminate strength.

The high-melting-point resin material preferably has a melting point of 265° C. or less, more preferably 260° C. or less, still more preferably 250° C. or less. This can improve, for example, the film formability of the resin substrate.

In the present description, the melting point of a high-melting-point resin material or the like can be measured in accordance with JIS K 7121: 2012 (Testing methods for transition temperatures of plastics). More specifically, a melting peak temperature as a melting point can be determined by measuring a DSC curve at a heating rate of 10° C./min using a differential scanning calorimetry (DSC) apparatus.

In one embodiment, the difference between the melting point of the high-melting-point resin material contained in the surface resin layer and the melting point of the polypropylene contained in the polypropylene resin layer is preferably 20° C. or more and preferably 80° C. or less, more preferably 60° C. or less. At a difference of the lower limit, for example, the evaporated film can have further improved adhesiveness and gas barrier properties, and the packaging container can have further improved laminate strength. At a difference of not more than the upper limit, for example, the resin substrate can have further improved film formability.

The high-melting-point resin material preferably has a polar group. The polar group refers to a group with at least one heteroatom, for example, an ester group, an epoxy group, a hydroxy group, an amino group, an amide group, a urethane group, a carboxy group, a carbonyl group, a carboxylic anhydride group, a sulfo group, a thiol group, or a halogen group. Among these, from the perspective of the gas barrier properties and laminate strength of a packaging container, a hydroxy group, an ester group, an amino group, an amide group, a carboxy group, and a carbonyl group are preferred, and an amide group is more preferred.

The high-melting-point resin material only needs to have a melting point of 180° C. or more and is, for example, a polyolefin, a vinyl resin, a (meth)acrylic resin, a polyamide, a polyimide, a polyester, a cellulose resin, or an ionomer resin. For example, a resin material with a melting point of 180° C. or more and with a polar group is preferred, and an ethylene-vinyl alcohol copolymer, poly(vinyl alcohol), a polyester, or a polyamide, such as nylon 6, nylon 6,6, or MXD nylon, is more preferred.

The surface resin layer preferably has a high-melting-point resin material content of 70% by mass or more, more preferably 80% by mass or more, still more preferably 90% by mass or more.

The surface resin layer may contain a resin material other than the high-melting-point resin material.

The surface resin layer may contain the additive agent described above.

The surface resin layer may be subjected to the surface treatment.

The ratio of the thickness of the surface resin layer to the total thickness of the resin substrate including the polyolefin resin layer and the surface resin layer is preferably 1% or more and preferably 10% or less, more preferably 5% or less. At a ratio of not less than the lower limit, for example, the evaporated film can have further improved adhesiveness and gas barrier properties, and the packaging container can have further improved laminate strength. At a ratio of not more than the upper limit, for example, the resin substrate can have further improved film formability and processability, and the packaging container can have further improved recyclability.

The surface resin layer preferably has a thickness of 0.1 μm or more and preferably 5 μm or less, more preferably 4 μm or less. At a thickness of not less than the lower limit, for example, the evaporated film can have further improved adhesiveness and gas barrier properties, and the packaging container can have further improved laminate strength. At a thickness of not more than the upper limit, for example, the resin substrate can have further improved film formability and processability, and the packaging container can have further improved recyclability.

In one embodiment, the resin substrate may include an adhesive resin layer between the polyolefin resin layer and the surface resin layer. This can improve the adhesion between these layers.

The adhesive resin layer can be formed of an adhesive resin, for example. The adhesive resin is, for example, a polyether, a polyester, a polyurethane, a silicone resin, an epoxy resin, a vinyl resin, a phenolic resin, a polyolefin, or an acid-modified product of a polyolefin. Among these, from the perspective of the recyclability of a packaging container, a polyolefin and an acid-modified product thereof are preferred, and polyethylene and an acid-modified product thereof and polypropylene and an acid-modified product thereof are more preferred.

The adhesive resin layer has a thickness of, for example, 1 μm or more and 15 μm or less. A thickness of 1 μm or more can result in, for example, further improved adhesion between the polyolefin resin layer and the surface resin layer. A thickness of 15 μm or less can result in, for example, a resin substrate with further improved processability.

In one embodiment, a resin substrate including a polyolefin resin layer, an optional adhesive resin layer, and a surface resin layer is a coextruded stretched resin film. The coextruded stretched resin film can be produced, for example, by forming a laminated film using a T-die method, an inflation method, or the like and then stretching the laminated film. Stretching of the laminated film may be simultaneously performed with the formation of a film by the inflation method.

The stretching process may be uniaxial stretching or biaxial stretching.

The stretch ratio of stretching in the MD direction is preferably 2 or more, more preferably 5 or more, and preferably 15 or less, more preferably 13 or less. The stretch ratio of stretching in the TD direction is preferably 2 or more, more preferably 5 or more, and preferably 15 or less, more preferably 13 or less.

(Evaporated Film)

In one embodiment, the barrier substrate includes an evaporated film composed of an inorganic oxide. In one embodiment, the barrier substrate includes an evaporated film on a surface coating layer. In one embodiment, the barrier substrate includes an evaporated film on a surface resin layer. In the laminates according to the seventh and eighth aspects, in one embodiment, the first substrate is a barrier substrate including a stretched resin layer (polypropylene resin layer) and an evaporated film composed of an inorganic oxide. In one embodiment, the barrier substrate includes a stretched resin layer and an evaporated film provided on one surface of the resin layer. This can improve the gas barrier properties, more specifically, oxygen barrier properties and water vapor barrier properties, of the barrier laminate. A packaging container produced using the barrier laminate can reduce the mass loss of the contents of the packaging container.

The inorganic oxide is, for example, aluminum oxide (alumina), silicon oxide (silica), magnesium oxide, calcium oxide, zirconium oxide, titanium oxide, boron oxide, hafnium oxide, barium oxide, or silicon oxycarbide (carbon-containing silicon oxide). Among these, silica, silicon oxycarbide, and alumina are preferred.

In one embodiment, the inorganic oxide is more preferably silica because aging after the evaporated film is formed is not necessary. In one embodiment, the inorganic oxide is more preferably carbon-containing silicon oxide because even bending the barrier laminate causes a smaller decrease in gas barrier properties.

The evaporated film preferably has a thickness of 1 nm or more, more preferably 5 nm or more, still more preferably 10 nm or more, and preferably 150 nm or less, more preferably 60 nm or less, still more preferably 40 nm or less. At a thickness of not less than the lower limit, for example, the barrier laminate can have further improved oxygen barrier properties and water vapor barrier properties. At a thickness of not more than the upper limit, for example, the evaporated film is less likely to have a crack, and the packaging container can have improved recyclability.

The surface of the evaporated film is preferably subjected to the surface treatment. This can improve the adhesion between the evaporated film and an adjacent layer.

The evaporated film is formed, for example, by a physical vapor deposition method (PVD method), such as a vacuum deposition method, a sputtering method, or an ion plating method; or a chemical vapor deposition method (CVD method), such as a plasma chemical vapor deposition method, a thermal chemical vapor deposition method, or a photochemical vapor deposition method.

The evaporated film may be a single layer formed by a single evaporation process or multiple layers formed by a plurality of evaporation processes. When the evaporated film has multiple layers, each layer may be composed of the same inorganic oxide or different inorganic oxides. Each layer may be formed by the same method or by different methods.

A plasma-assisted vacuum film-forming apparatus can be used as an apparatus used for a method of forming an evaporated film by a PVD method. An embodiment of a method of forming an evaporated film using a plasma-assisted vacuum film-forming apparatus is described below.

Figure 10:
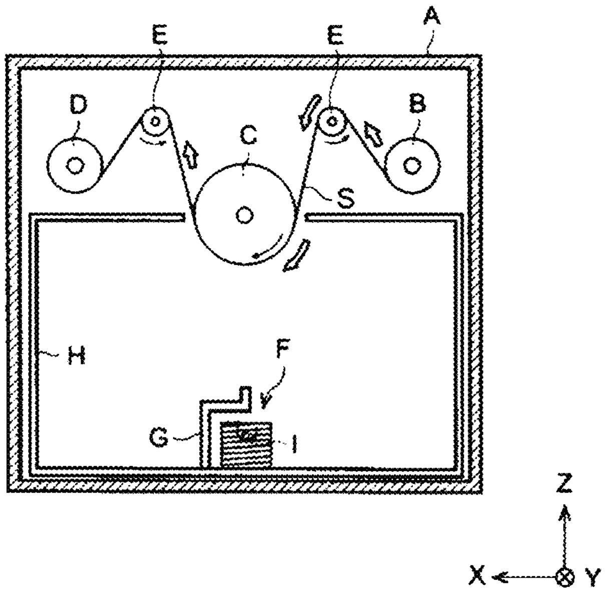
FIG. 10 is a schematic cross-sectional view of an embodiment of a deposition apparatus.
Figure 11:
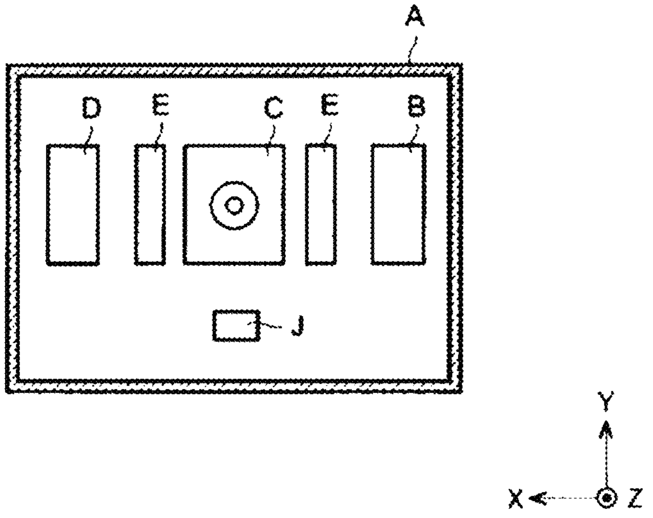
FIG. 11 is a schematic cross-sectional view of an embodiment of a deposition apparatus.

In one embodiment, as illustrated in FIGS. 10 and 11, a vacuum film-forming apparatus includes a vacuum chamber A, an unwinder B, a film-forming drum C, a winder D, a feed roller E, an evaporation source F, a reactant gas supply portion G, an anti-deposition box H, a deposition material I, and a plasma gun J. FIG. 10 is a schematic cross-sectional view of the vacuum film-forming apparatus in the XZ plane direction. FIG. 11 is a schematic cross-sectional view of the vacuum film-forming apparatus in the XY plane direction.

As illustrated in FIG. 10, a substrate S wound by the film-forming drum C method is located in an upper portion of the vacuum chamber A such that a surface of the substrate S on which an evaporated film is to be formed faces downward, and the anti-deposition box H electrically grounded is located below the film-forming drum C in the vacuum chamber A. The evaporation source F is located at the bottom of the anti-deposition box H. The film-forming drum C is located in the vacuum chamber A such that the substrate S wound by the film-forming drum C is located at a position facing the upper surface of the evaporation source F with a predetermined distance therebetween. The feed roller E is located between the unwinder B and the film-forming drum C and between the film-forming drum C and the winder D. The vacuum chamber A is coupled to a vacuum pump (not shown). The evaporation source F holds the deposition material I and has a heater (not shown). The reactant gas supply portion G is a portion for supplying a reactant gas (oxygen, nitrogen, helium, argon, a gas mixture thereof, or the like) that reacts with the evaporated deposition material I.

The deposition material I heated and evaporated from the evaporation source F is diffused toward the substrate S, and simultaneously the substrate S is irradiated with plasma from the plasma gun J to form an evaporated film on the substrate S.

Details of the film-forming method are disclosed in Japanese Unexamined Patent Application Publication No. 2011-214089.

A high-frequency plasma generator, a pulse wave plasma generator, a microwave plasma generator, or the like can be used as a plasma generator for use in the plasma chemical vapor deposition method. An apparatus with two or more film-forming chambers may be used. Such an apparatus preferably has a vacuum pump to maintain a vacuum in each film-forming chamber.

The degree of vacuum in each film-forming chamber preferably ranges from $1\times10$ to $1\times10^{-6}$ Pa.

An embodiment of a method of forming an evaporated film using a plasma generator is described below.

A substrate is sent to a film-forming chamber and is transported via an auxiliary roller onto the peripheral surface of a cooling/electrode drum at a predetermined speed. Subsequently, a gas mixture composition that contains a film-forming monomer gas containing an inorganic oxide, oxygen gas, an inert gas, and the like is supplied from a gas supply unit into the film-forming chamber, plasma is generated by glow discharge on the substrate, and the substrate is irradiated with the plasma to form an evaporated film containing the inorganic oxide on the substrate.

Details of the film-forming method are disclosed in Japanese Unexamined Patent Application Publication No. 2012-076292.

Figure 12:
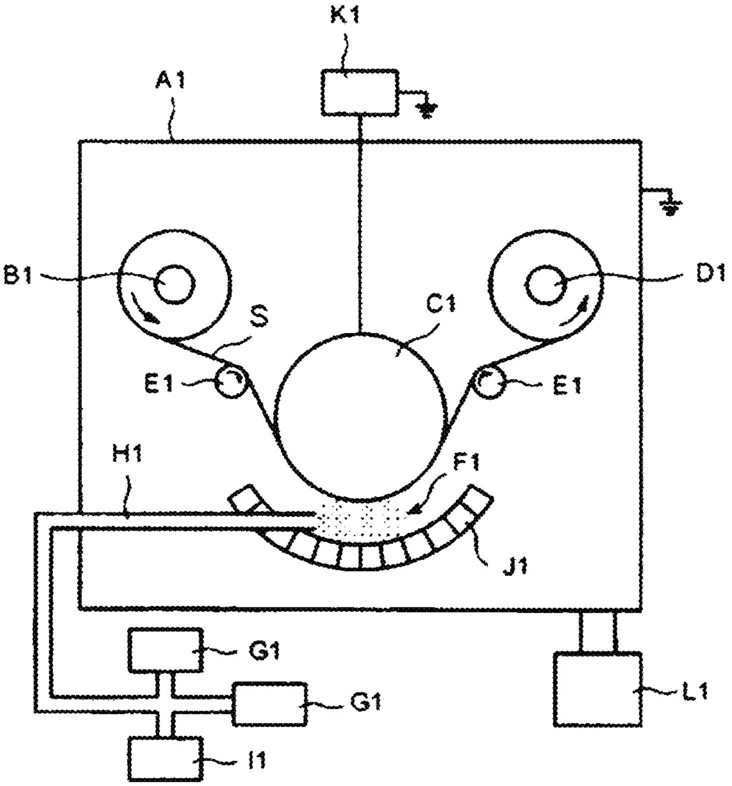
FIG. 12 is a schematic cross-sectional view of another embodiment of a deposition apparatus.

FIG. 12 is a schematic view of a plasma chemical vapor deposition apparatus for use in a CVD method.

In one embodiment, as illustrated in FIG. 12, the plasma chemical vapor deposition apparatus feeds a substrate S from an unwinder B1 located in a vacuum chamber A1 and transports the substrate S via a feed roller E1 onto the peripheral surface of a cooling/electrode drum C1 at a predetermined speed. Oxygen, nitrogen, helium, argon, and a gas mixture thereof are supplied from a reactant gas supply portion G1, and a film-forming monomer gas and the like are supplied from a raw material gas supply portion I1 to prepare a deposition gas mixture composition composed thereof, which is introduced into the vacuum chamber A1 through a raw material supply nozzle H1. The substrate S transported onto the peripheral surface of the cooling/electrode drum C1 is irradiated with plasma generated by glow discharge plasma F1 to form an evaporated film on the substrate S. At that time, predetermined electric power from a power supply K1 located outside the vacuum chamber A1 is applied to the cooling/electrode drum C1, and a magnet J1 located near the cooling/electrode drum C1 promotes the generation of plasma. Next, after the evaporated film is formed, the substrate S is wound by a winder D1 via the feed roller E1 at a predetermined winding speed. In FIG. 12, L1 denotes a vacuum pump.

A continuous evaporated-film-forming apparatus including a plasma pretreatment chamber and a film-forming chamber can be used as an apparatus for use in a method of forming an evaporated film. An embodiment of a method of forming an evaporated film using the apparatus is described below.

In the plasma pretreatment chamber, the substrate is irradiated with plasma from a plasma supply nozzle. In the film-forming chamber, an evaporated film is then formed on the plasma-treated substrate.

Details of the film-forming method are disclosed in International Publication No. WO 2019/087960.

The evaporated film in the barrier substrate is preferably an evaporated film formed by a CVD method, more preferably a carbon-containing silicon oxide evaporated film formed by a CVD method. This can reduce the decrease in gas barrier properties even when the barrier laminate is bent.

The carbon-containing silicon oxide evaporated film contains silicon, oxygen, and carbon.

In one embodiment of the carbon-containing silicon oxide evaporated film, the carbon content C is preferably 3% or more, more preferably 5% or more, still more preferably 10% or more, and preferably 50% or less, more preferably 40% or less, still more preferably 35% or less, with respect to the total (100%) of the three elements of silicon, oxygen, and carbon. A carbon content C in such a range can result in, for example, a barrier laminate with a smaller decrease in gas barrier properties even when bent.

In the present description, each element content is on a molar basis.

In one embodiment of the carbon-containing silicon oxide evaporated film, the silicon content Si is preferably 1% or more, more preferably 3% or more, still more preferably 8% or more, and preferably 45% or less, more preferably 38% or less, still more preferably 33% or less, with respect to the total (100%) of the three elements of silicon, oxygen, and carbon. The oxygen content O is preferably 10% or more, more preferably 20% or more, still more preferably 25% or more, and preferably 70% or less, more preferably 65% or less, still more preferably 60% or less, with respect to the total (100%) of the three elements of silicon, oxygen, and carbon. A silicon content Si and an oxygen content O in such a range can result in, for example, a barrier laminate with a much smaller decrease in gas barrier properties even when bent.

In one embodiment of the carbon-containing silicon oxide evaporated film, the oxygen content O is preferably higher than the carbon content C, and the silicon content Si is preferably lower than the carbon content C. The oxygen content O is preferably higher than the silicon content Si. Thus, the contents preferably decrease in the order of the O content, the C content, and the Si content. This can further reduce, for example, the decrease in gas barrier properties even when the barrier laminate is bent.

The C content, the Si content, and the O content of the carbon-containing silicon oxide evaporated film can be measured by X-ray photoelectron spectroscopy (XPS) and narrow scan analysis under the following measurement conditions.

(Measurement Conditions)

Equipment used: "ESCA-3400" (manufactured by Kratos)

[1] Spectrum Sampling Conditions

Incident X-rays: MgKα (monochromatic X-rays, hν=1253.6 eV)

X-ray output: 150 W (10 kV, 15 mA)

X-ray scan area (measurement region): approximately 6 mmϕ

Photoelectron acceptance angle: 90 degrees

[2] Ion Sputtering Conditions

Ionic species: $Ar^+$

Accelerating voltage: 0.2 (kV)

Emission current: 20 (mA)

Etching range: 10 mmϕ

Ion sputtering time: 30 seconds to take a spectrum (Barrier Coating Layer)

In one embodiment, the barrier substrate may further include a barrier coating layer on the evaporated film. More specifically, the barrier substrate may further include a barrier coating layer on the surface of the evaporated film opposite the surface on the polyolefin resin layer side. This can improve, for example, the oxygen barrier properties and water vapor barrier properties of the barrier laminate.

In one embodiment, the barrier coating layer contains a gas barrier resin. The gas barrier resin is, for example, an ethylene-vinyl alcohol copolymer, poly(vinyl alcohol), polyacrylonitrile, a polyester, a polyamide, such as nylon 6, nylon 6,6, or poly(m-xylylene adipamide), a polyurethane, or a (meth)acrylic resin.

The barrier coating layer preferably has a gas barrier resin content of 50% by mass or more, more preferably 60% by mass or more, still more preferably 70% by mass or more. With such a structure, for example, the barrier coating layer can have improved gas barrier properties.

The barrier coating layer may contain the additive agent described above.

The barrier coating layer containing the gas barrier resin preferably has a thickness of 0.01 μm or more, more preferably 0.1 μm or more, and preferably 10 μm or less, more preferably 5 μm or less. The barrier coating layer with a thickness of 0.01 μm or more can further improve, for example, the gas barrier properties. The barrier coating layer with a thickness of 10 μm or less can improve, for example, the processability of the barrier laminate and the recyclability of the packaging container.

The barrier coating layer can be formed, for example, applying and drying a coating liquid prepared by dissolving or dispersing a material, such as a gas barrier resin, in water or an appropriate organic solvent.

In another embodiment, the barrier coating layer is a gas barrier coating film formed by mixing a metal alkoxide, a water-soluble polymer, and an optional silane coupling agent and, if necessary, adding water, an organic solvent, and a sol-gel method catalyst to prepare a gas barrier composition, and by applying the gas barrier composition to the evaporated film and drying the gas barrier composition. The gas barrier coating film contains a hydrolytic polycondensate produced by hydrolysis and polycondensation of the metal alkoxide or the like by a sol-gel method. Such a barrier coating layer on the evaporated film can effectively reduce the occurrence of cracks in the evaporated film.

The metal alkoxide is represented, for example, by the formula (1):

$$R^1_nM(OR^2)_m \tag{1}$$

In the formula (1), $R^1$ and $R^2$ each independently denote an organic group with 1 or more and 8 or less carbon atoms, M denotes a metal atom, n denotes an integer of 0 or more, m denotes an integer of 1 or more, and n+m denotes the valence of M.

The organic group in $R^1$ and $R^2$ is, for example, an alkyl group with 1 or more and 8 or less carbon atoms, such as a methyl group, an ethyl group, a n-propyl group, an isopropyl group, a n-butyl group, an isobutyl group, a sec-butyl group, a t-butyl group, a n-hexyl group, or a n-octyl group.

The metal atom M is, for example, silicon, zirconium, titanium, or aluminum.

The metal alkoxide is, for example, an alkoxysilane, such as tetramethoxysilane, tetraethoxysilane, tetrapropoxysilane, or tetrabutoxysilane.

The water-soluble polymer is, for example, a polymer with a hydroxy group, such as poly(vinyl alcohol) or an ethylene-vinyl alcohol copolymer. Depending on desired physical properties, such as oxygen barrier properties, water vapor barrier properties, water resistance, and weatherability, either or both of poly(vinyl alcohol) and an ethylene-vinyl alcohol copolymer may be used, or a gas barrier coating film produced using poly(vinyl alcohol) and a gas barrier coating film produced using an ethylene-vinyl alcohol copolymer may be stacked. The amount of the water-soluble polymer to be used is preferably 3 parts by mass or more, more preferably 5 parts by mass or more, and preferably 500 parts by mass or less, per 100 parts by mass of the metal alkoxide.

The ratio of silicon atoms to carbon atoms (Si/C) on the surface of the gas barrier coating film measured by X-ray photoelectron spectroscopy (XPS) is preferably 0.50 or more, more preferably 0.90 or more, and preferably 1.60 or less, more preferably 1.35 or less. At a ratio of not more than the upper limit, for example, even bending the barrier laminate causes a smaller decrease in gas barrier properties. At a ratio of not less than the lower limit, for example, even heating, such as heat sealing, causes a smaller decrease in gas barrier properties when the barrier laminate is used to produce a packaging container.

A ratio of silicon atoms to carbon atoms in such a range can be achieved by appropriately adjusting the amount of the metal alkoxide used relative to the water-soluble polymer. In the present description, the ratio of silicon atoms to carbon atoms is on a molar basis.

The ratio of silicon atoms to carbon atoms by X-ray photoelectron spectroscopy (XPS) can be measured by narrow scan analysis under the following measurement conditions.

(Measurement Conditions)

Equipment used: "ESCA-3400" (manufactured by Kratos)

[1] Spectrum Sampling Conditions

Incident X-rays: MgKα (monochromatic X-rays, hν=1253.6 eV)

X-ray output: 150 W (10 kV, 15 mA)

X-ray scan area (measurement region): approximately 6 mmϕ

Photoelectron acceptance angle: 90 degrees

[2] Ion Sputtering Conditions

Ionic species: $Ar^+$

Accelerating voltage: 0.2 (kV)

Emission current: 20 (mA)

Etching range: 10 mmϕ

Ion sputtering time: 30 seconds+30 seconds+60 seconds (120 seconds in total) to take a spectrum The silane coupling agent can be a known organoalkoxysilane with an organic reactive group, preferably an organoalkoxysilane with an epoxy group, for example, γ-glycidoxypropyltrimethoxysilane, γ-glycidoxypropylmethyldiethoxysilane, or β-(3,4-epoxycyclohexyl)ethyltrimethoxysilane. The amount of the silane coupling agent to be used is preferably 1 part by mass or more and 20 parts by mass or less per 100 parts by mass of the metal alkoxide.

The gas barrier composition may preferably contain 0.1 mol or more, more preferably 0.5 mol or more, and preferably 100 mol or less, more preferably 60 mol or less, of water per mole of the metal alkoxide. At a water content of not less than the lower limit, for example, the barrier laminate can have improved oxygen barrier properties and water vapor barrier properties. A water content of not more than the upper limit can result in, for example, a rapid hydrolysis reaction.

The gas barrier composition may contain an organic solvent. The organic solvent is, for example, methyl alcohol, ethyl alcohol, n-propyl alcohol, isopropyl alcohol, or n-butyl alcohol.

The sol-gel method catalyst is preferably an acid or an amine compound.

The acid is, for example, a mineral acid, such as sulfuric acid, hydrochloric acid, or nitric acid, or an organic acid, such as acetic acid or tartaric acid. The amount of the acid to be used is preferably 0.001 mol or more and 0.05 mol or less per mole of the metal alkoxide and the alkoxide moiety (for example, the silicate moiety) of the silane coupling agent in total.

The amine compound is preferably a tertiary amine that is substantially insoluble in water and that is soluble in an organic solvent, for example, N,N-dimethylbenzylamine, tripropylamine, tributylamine, or tripentylamine. The amount of the amine compound to be used is preferably 0.01 parts by mass or more, more preferably 0.03 parts by mass or more, and preferably 1.0 part by mass or less, more preferably 0.3 parts by mass or less, per 100 parts by mass of the metal alkoxide and the silane coupling agent in total.

A method of applying the gas barrier composition is, for example, an application means, such as roll coating using a gravure roll coater or the like, spray coating, spin coating, dipping, brushing, bar coating, or an applicator.

An embodiment of a method of forming a gas barrier coating film is described below.

A metal alkoxide, a water-soluble polymer, a sol-gel method catalyst, water, an organic solvent, an optional silane coupling agent, and the like are mixed to prepare a gas barrier composition. A polycondensation reaction proceeds gradually in the composition. The composition is applied to an evaporated film and is dried in the usual manner. The drying further promotes the polycondensation of the metal alkoxide and the water-soluble polymer (and the silane coupling agent when the composition contains the silane coupling agent), thus forming a layer of a composite polymer. This operation may be repeated to stack a plurality of composite polymer layers. For example, the applied composition is heated at a temperature of preferably 20° C. or more, more preferably 50° C. or more, still more preferably 70° C. or more, and preferably 150° C. or less, more preferably 120° C. or less, still more preferably 100° C. or less, for 1 second or more and 10 minutes or less. Thus, a gas barrier coating film can be formed.

The gas barrier coating film preferably has a thickness of 0.01 μm or more, more preferably 0.1 μm or more, and preferably 100 μm or less, more preferably 50 μm or less, still more preferably 5 μm or less. This can, for example, improve the gas barrier properties, reduce the occurrence of cracks in the evaporated film, and improve the recyclability of the packaging container.

<Polyolefin Resin Substrate>

A barrier laminate according to the present disclosure preferably includes a first substrate, a second substrate, and a sealant layer in this order in the thickness direction. A barrier laminate according to the present disclosure more preferably includes a first substrate, a first adhesive layer, a second substrate, a second adhesive layer, and a sealant layer in this order in the thickness direction. A polyolefin resin substrate constitutes the first substrate or the second substrate. In one embodiment, the polyolefin resin substrate is a polypropylene resin substrate.

The polyolefin resin substrate is composed of a polyolefin. The polyolefin is, for example, polyethylene, polypropylene, or polymethylpentene. Among the polyolefins, polyethylene and polypropylene are preferred. Thus, the polyolefin resin substrate is preferably a polyethylene resin substrate or a polypropylene resin substrate.

In one embodiment, the polyolefin resin substrate is a polyethylene resin substrate composed of polyethylene. The polyethylene is, for example, a high-density polyethylene, a medium-density polyethylene, a low-density polyethylene, a linear low-density polyethylene, or a very-low-density polyethylene. Among these, a high-density polyethylene and a medium-density polyethylene are preferred from the perspective of the strength and heat resistance of the substrate, and a medium-density polyethylene is more preferred from the perspective of stretchability.

From the perspective of film formability and processability, in one embodiment, the polyethylene preferably has a MFR of 0.1 g/10 min or more, more preferably 0.3 g/10 min or more, and preferably 50 g/10 min or less, more preferably 30 g/10 min or less. In the present disclosure, the MFR of the polyethylene is measured under conditions of a temperature of 190° C. and a load of 2.16 kg in accordance with JIS K 7210-1: 2014, method A.

In one embodiment, the polyolefin resin substrate is a polypropylene resin substrate composed of polypropylene. A barrier laminate with a substrate composed of polypropylene can improve, for example, the oil resistance of a packaging container produced using the barrier laminate.

The polypropylene may be any of a homopolymer, a random copolymer, and a block copolymer, or may be a mixture of two or more selected from these. These are described in detail above.

Among the polypropylenes, a random copolymer is preferably used from the perspective of transparency. When the rigidity and heat resistance of a packaging container are regarded as important, a homopolymer is preferably used. When the impact resistance of a packaging container is regarded as important, a block copolymer is preferably used.

From the perspective of film formability and processability, in one embodiment, the polypropylene preferably has a MFR of 0.1 g/10 min or more, more preferably 0.3 g/10 min or more, and preferably 50 g/10 min or less, more preferably 30 g/10 min or less.

The polyolefin may be a biomass-derived polyolefin or a mechanically recycled or chemically recycled polyolefin. The polypropylene may be a biomass-derived polypropylene or a mechanically recycled or chemically recycled polypropylene.

The polyolefin resin substrate preferably has a polyolefin content, particularly a polyethylene or polypropylene content, of 70% by mass or more, more preferably 80% by mass or more, still more preferably 90% by mass or more, still more preferably 95% by mass or more.

The polyolefin resin substrate may contain a resin material other than polyolefin. The resin material is, for example, a (meth)acrylic resin, a vinyl resin, a cellulose resin, a polyamide, a polyester, or an ionomer resin. For a polypropylene resin substrate, in addition to these resin materials, for example, a polyolefin other than polypropylene, such as polyethylene, may be mentioned.

The polyolefin resin substrate may contain the additive agent described above.

The polyolefin resin substrate is a substrate subjected to a stretching process. This can improve, for example, the heat resistance, impact resistance, water resistance, and dimensional stability of a barrier laminate. A barrier laminate including such a substrate is suitable, for example, as a packaging material constituting a packaging container to be subjected to a boiling process or a retort process.

The stretching process may be uniaxial stretching or biaxial stretching.

The stretch ratio of stretching in the MD direction is preferably 2 or more, more preferably 5 or more, and preferably 15 or less, more preferably 13 or less. The stretch ratio of stretching in the TD direction is preferably 2 or more, more preferably 5 or more, and preferably 15 or less, more preferably 13 or less. The polyolefin resin substrate with a stretch ratio of 2 or more can have further improved strength and heat resistance and improved printability. From the perspective of the fracture limit of the polyolefin resin substrate, the stretch ratio is preferably 15 or less.

In one embodiment, the polyolefin resin substrate may be subjected to the surface treatment. This can improve, for example, the adhesion between the polyolefin resin substrate and another layer.

An easily adherable layer may be provided on the surface of the polyolefin resin substrate.

The polyolefin resin substrate may have a monolayer structure or a multilayer structure.

The polyolefin resin substrate preferably has a thickness of 10 μm or more and preferably 100 μm or less, more preferably 50 μm or less. At a thickness of not less than the lower limit, for example, the barrier laminate can have further improved strength and heat resistance. At a thickness of not more than the upper limit, for example, the barrier laminate can have further improved processability.

<First Substrate (Eighth Aspect)>

In one embodiment, the first substrate in the laminate according to the eighth aspect is a polypropylene resin substrate composed of a stretched resin layer containing polypropylene as a main component (polypropylene resin layer), that is, a polypropylene resin substrate subjected to a stretching process. In one embodiment, the first substrate is a barrier substrate including a stretched resin layer containing polypropylene as a main component (polypropylene resin layer) and an evaporated film composed of an inorganic oxide. The barrier substrate can include the layers described above in the section <Barrier Substrate>.

The stretched resin layer in the first substrate contains polypropylene as a main component, that is, contains more than 50% by mass of polypropylene. The first substrate including the stretched resin layer can improve, for example, the oil resistance of a packaging container produced using the first substrate.

The polypropylene may be any of a homopolymer, a random copolymer, and a block copolymer, or may be a mixture of two or more selected from these. These are described in detail above.

Among the polypropylenes, a random copolymer is preferably used from the perspective of transparency. When the rigidity and heat resistance of a packaging container are regarded as important, a homopolymer is preferably used. When the drop impact resistance of a packaging container is regarded as important, a block copolymer is preferably used. In the laminate according to the eighth aspect, the stretched resin layer in the first substrate is preferably a homopolymer from the perspective of heat resistance.

In the present disclosure, the extrapolated initial melting temperature (Tim) of polypropylene at first heating obtained by differential scanning calorimetry (DSC) according to JIS K 7121: 2012 (Testing methods for transition temperatures of plastics) is also referred to as "Tim1", and the extrapolated initial melting temperature (Tim) at second heating is also referred to as "Tim2".

In the eighth aspect, in one embodiment, the Tim1 of the polypropylene contained in the stretched resin layer in the first substrate is higher than the Tim1 of the polypropylene contained in the sealant layer. The difference between the Tim1 of the polypropylene contained in the stretched resin layer in the first substrate and the Tim1 of the polypropylene contained in the sealant layer is preferably 2° C. or more, more preferably 5° C. or more, still more preferably 8° C. or more, still more preferably 12° C. or more, particularly preferably 15° C. or more, 18° C. or more, or 20° C. or more. The laminate satisfying such requirements is, for example, a laminate made of a single material (monomaterial) and has high sealability, such as bag-making suitability or filling suitability. In other words, the laminate has a wide heat-sealable temperature range and high seal strength.

In the eighth aspect, in one embodiment, the Tim2 of the polypropylene contained in the stretched resin layer in the first substrate is higher than the Tim2 of the polypropylene contained in the sealant layer. The difference between the Tim2 of the polypropylene contained in the stretched resin layer in the first substrate and the Tim2 of the polypropylene contained in the sealant layer is preferably 2° C. or more, more preferably 5° C. or more, still more preferably 8° C. or more, particularly preferably 10° C. or more. The laminate satisfying such requirements is, for example, a laminate made of a single material (monomaterial) and has high sealability, such as bag-making suitability or filling suitability. In other words, the laminate has a wide heat-sealable temperature range and high seal strength.

The upper limit of the difference between the Tim1 of the polypropylene contained in the stretched resin layer in the first substrate and the Tim1 of the polypropylene contained in the sealant layer may be, for example, 40° C. The upper limit of the difference between the Tim2 of the polypropylene contained in the stretched resin layer in the first substrate and the Tim2 of the polypropylene contained in the sealant layer may be, for example, 30° C.

Tim is measured with a differential scanning calorimeter (product name: DSC7000X, manufactured by Hitachi High-Tech Science Corporation) in accordance with JIS K 7121: 2012 (Testing methods for transition temperatures of plastics). At this time, a measurement sample is held at 20° C. for 1 minute, is then heated from 20° C. to 200° C. at a heating rate of 10° C./min, is held at 200° C. for 5 minutes, is then cooled from 200° C. to 20° C. at a cooling rate of 10° C./min, and is held at 20° C. for 5 minutes. The temperature is then increased again from 20° C. to 200° C. at a heating rate of 10° C./min. In DSC curves in the first and second heating processes, an extrapolated initial melting temperature (Tim) is obtained, which is a temperature at an intersection point between a straight line obtained by extending the baseline on the low temperature side to the high temperature side and a tangent line with the maximum slope to a curve of a melting peak on the low temperature side. When there are two or more Tims, the Tim of the melting peak with the highest peak intensity is used.

In one embodiment, the laminate according to the eighth aspect is characterized in that a heat-sealing temperature range satisfying the following requirements is 5° C. or more in the range of 130° C. or more and 190° C. or less. More specifically, in one embodiment, when the laminate is heat-sealed under heat-sealing conditions of a temperature of 130° C. or more and 190° C. or less, a pressure of 0.1 MPa, and a time of 1 second, a heat-sealing temperature range (temperature width) in which the seal strength is 23 N/15 mm or more and the shrinkage ratio of the laminate in the TD direction is 0% or more and 1.0% or less is 5° C. or more in the range of 130° C. or more and 190° C. or less. Such a laminate has high heat resistance and, for example, can provide a packaging container with a good appearance when heat-sealed.

In one embodiment, a heat-sealing temperature range (temperature width) satisfying the requirements may be 5° C. or more in the range of 140° C. or more and 185° C. or less, 5° C. or more in the range of 145° C. or more and 180° C. or less, 5° C. or more in the range of 150° C. or more and 180° C. or less, or 5° C. or more in the range of 160° C. or more and 175° C. or less. In addition, the temperature width of a heat-sealing temperature satisfying the requirements may be in the range of 5° C. or more and 30° C. or less, in the range of 5° C. or more and 20° C. or less, in the range of 5° C. or more and 15° C. or less, or in the range of 5° C. or more and 10° C. or less.

The seal strength is preferably 25 N/15 mm or more, more preferably 28 N/15 mm or more. Such a laminate can be used, for example, to produce a packaging container with high seal strength. The seal strength required for a seal portion of a packaging material for retort-sterilized cooked food is defined as 23 N/15 mm or more by quality standards of the Food Sanitation Act.

The shrinkage ratio and the seal strength of a laminate are measured as described below. First, two laminates prepared are cut into a size of 100 mm×100 mm, are stacked with the surfaces on the sealant layer side facing each other, and are heat-sealed in the TD direction using a one-sided heating flat heat-sealing bar with a width of 10 mm. The heat-sealing conditions are a temperature of 130° C. or more and 190° C. or less, a pressure of 0.1 MPa, and a time of 1 second. The length of the heat seal portion of the sealed sample in the TD direction is measured with a 150-mm ruler, and the shrinkage ratio (%) is calculated using (the length before sealing (100 mm)−the length after sealing (mm))/the length before sealing (100 mm)×100. The sealed sample is cut into a width of 15 mm in the MD direction to prepare a test specimen with a width of 15 mm and a length of 100 mm. The test specimen is used to measure seal strength with a tensile tester by T-type peeling at a test speed of 300 mm/min.

For example, a laminate satisfying the requirements for Tim, shrinkage ratio, and seal strength can be produced when a polypropylene stretched resin layer with high heat resistance is used as the first substrate and a polypropylene unstretched resin layer with high low-temperature sealability is used as the sealant layer.

The laminate according to the eighth aspect is suitable for a packaging material application.

In one embodiment, the laminate according to the eighth aspect further includes a second substrate including a stretched resin layer containing polypropylene as a main component (an intermediate substrate) between the first substrate and the sealant layer. Thus, in one embodiment, the laminate according to the eighth aspect includes the first substrate, the second substrate, and the sealant layer in this order in the thickness direction.

In one embodiment, the second substrate is a barrier substrate including a stretched resin layer containing polypropylene as a main component and an evaporated film composed of an inorganic oxide. In one embodiment, the second substrate is a polypropylene resin substrate composed of a stretched resin layer containing polypropylene as a main component, that is, a polypropylene resin substrate subjected to a stretching process.

In the laminate according to the eighth aspect, the first substrate and the second substrate are each independently a barrier substrate or a polypropylene resin substrate. In one embodiment, one of the first substrate and the second substrate is a barrier substrate, and the other of the first substrate and the second substrate is a polypropylene resin substrate. In another embodiment, both the first substrate and the second substrate may be barrier substrates, or both the first substrate and the second substrate may be polypropylene resin substrates.

The polypropylene as a main component of the stretched resin layer in the first substrate preferably has a Tim1 of 146° C. or more, more preferably 146.5° C. or more, still more preferably 147° C. or more, particularly preferably 147.5° C. or more. This, for example, allows a packaging material with higher heat resistance to be produced and can reduce thermal shrinkage during heat sealing. The upper limit of the Tim1 of the polypropylene as a main component of the stretched resin layer may be, for example, but is not limited to, 170° C., 165° C., 160° C., or 155° C.

The polypropylene as a main component of the stretched resin layer in the first substrate preferably has a Tim2 of 150° C. or more, more preferably 150.5° C. or more, still more preferably 151° C. or more, particularly preferably 151.5° C. or more. This, for example, allows a packaging material with higher heat resistance to be produced and can reduce thermal shrinkage during heat sealing. The upper limit of the Tim2 of the polypropylene as a main component of the stretched resin layer may be, for example, but is not limited to, 170° C., 165° C., 160° C., or 155° C.

The Tim of polypropylene can be increased, for example, by reducing the amount of constitutional unit derived from a copolymerizable monomer in the polypropylene or reducing the amount to 0% by mass, by increasing the mesopentad fraction of the polypropylene, by increasing the amount of a low-molecular-weight component, or by setting the stretching temperature at the time of producing a substrate to a high temperature. The amount of constitutional unit derived from a copolymerizable monomer in the polypropylene may be, for example, 0.1% by mole or less, 0.05% by mole or less, or 0.01% by mole or less.

The mesopentad fraction of the polypropylene contained in the stretched resin layer in the first substrate may be, for example, 96% or more or 97% or more. A mesopentad fraction in such a range can result in improved crystallinity and a lower thermal shrinkage ratio at high temperatures. The mesopentad fraction may be, for example, 99.5% or less or 99% or less.

The mesopentad fraction (isotactic mesopentad fraction) can be measured by $^{13}C$-NMR. The mesopentad fraction is calculated by a method described in "Zambelli et al., Macromolecules, vol. 6, p. 925 (1973)". The $^{13}C$-NMR measurement is performed at 110° C. using "AVANCE 500" manufactured by BRUKER by dissolving 200 mg of a sample in a liquid mixture of o-dichlorobenzene and deuterated benzene in a ratio of 8:2 (volume ratio) at 135° C.

The polypropylene contained in the stretched resin layer in the first substrate preferably has a weight-average molecular weight (Mw) of, for example, 250,000 or more, more preferably 260,000 or more, and preferably 500,000 or less, more preferably 450,000 or less. The polydispersity represented by weight-average molecular weight (Mw)/number-average molecular weight (Mn) of the polypropylene is, for example, preferably 5.5 or more, more preferably 6.5 or more, and preferably 30 or less, more preferably 25 or less.

When a gel permeation chromatography (GPC) integral curve of the polypropylene contained in the stretched resin layer in the first substrate is measured, the lower limit of the amount of component with a molecular weight of 10,000 or less may be, for example, 2% by mass or 3% by mass. The upper limit of the amount of component with a molecular weight of 10,000 or less in the GPC integral curve may be, for example, 20% by mass or 15% by mass.

When a GPC integral curve of the polypropylene contained in the stretched resin layer in the first substrate is measured, the lower limit of the amount of component with a molecular weight of 100,000 or less may be, for example, 35% by mass or 40% by mass. The upper limit of the amount of component with a molecular weight of 100,000 or less in the GPC integral curve may be, for example, 65% by mass or 60% by mass.

The molecular weight and polydispersity of polypropylene are determined by GPC using monodisperse polystyrene standards. Measurement conditions for GPC measurement, such as a column and a solvent to be used, are described below.

Solvent: 1,2,4-trichlorobenzene
Column: TSKgel $GMH_{HR}$-H(20)HT×3
Flow rate: 1.0 ml/min
Detector: RI
Measurement temperature: 140° C.

Polypropylene is produced, for example, by polymerizing propylene as a raw material using a Ziegler-Natta catalyst, a metallocene catalyst, or the like. It is preferable to use a catalyst capable of highly regular polymerization, such as a Ziegler-Natta catalyst. Propylene is produced, for example, by a method of polymerizing propylene in an inert solvent, such as hexane, heptane, toluene, or xylene, a method of performing polymerization in liquid propylene or ethylene, a method of adding a catalyst to gaseous propylene or ethylene and perform polymerization in a gas phase state, or a combination thereof.

For example, polypropylene may be produced by separately producing and then mixing a high-molecular-weight component and a low-molecular-weight component or by multistage polymerization in a plant with a multistage reactor. In particular, a plant with a multistage reactor may be used to first produce a high-molecular-weight component and then produce a low-molecular-weight component in the presence of the high-molecular-weight component. The molecular weight can be controlled by the amount of hydrogen mixed in the system during the polymerization.

From the perspective of film formability and processability, in one embodiment, the polypropylene preferably has a melt flow rate (MFR) of 0.1 g/10 min or more, more preferably 0.3 g/10 min or more, and preferably 50 g/10 min or less, more preferably 30 g/10 min or less. The MFR of the polypropylene is measured under conditions of a temperature of 230° C. and a load of 2.16 kg in accordance with JIS K 7210-1: 2014, method A.

From the perspective of environmental load reduction, the polypropylene may be a biomass-derived polypropylene or a mechanically recycled or chemically recycled polypropylene.

The stretched resin layer in the first substrate preferably has a polypropylene content of 70% by mass or more, more preferably 80% by mass or more, still more preferably 90% by mass or more, still more preferably 95% by mass or more.

The stretched resin layer in the first substrate may contain a resin material other than polypropylene. The resin material is, for example, a polyolefin, such as polyethylene, a (meth) acrylic resin, a vinyl resin, a cellulose resin, a polyamide, a polyester, or an ionomer resin.

The stretched resin layer in the first substrate may contain the additive agent described above.

The stretched resin layer in the first substrate is a layer subjected to a stretching process. This can improve, for example, the heat resistance, drop impact resistance, water resistance, and dimensional stability of the laminate. A laminate including such a resin layer is suitable, for example, as a packaging material constituting a packaging container to be subjected to a boiling process or a retort process.

The stretching process may be uniaxial stretching or biaxial stretching.

The stretching process is described in detail above.

In one embodiment, the stretched resin layer in the first substrate may be subjected to the surface treatment. This can improve, for example, the adhesion between the stretched resin layer and another layer.

An easily adherable layer may be provided on the surface of the stretched resin layer in the first substrate.

The stretched resin layer in the first substrate may have a monolayer structure or a multilayer structure.

The stretched resin layer in the first substrate preferably has a thickness of 10 μm or more and preferably 100 μm or less, more preferably 50 μm or less. At a thickness of not less than the lower limit, for example, the laminate can have further improved strength and heat resistance. At a thickness of not more than the upper limit, for example, the laminate can have further improved processability.

In one embodiment, the stretched resin layer in the first substrate may be any polypropylene stretched resin layer with high heat resistance, for example, a commercially available stretched polypropylene film, such as a biaxially stretched polypropylene film (P2171 manufactured by Toyobo Co., Ltd.).

<Second Substrate (Eighth Aspect)>

The second substrate includes a stretched resin layer containing polypropylene as a main component.

The stretched resin layer in the second substrate contains polypropylene as a main component, that is, contains more than 50% by mass of polypropylene. The second substrate including the stretched resin layer can improve, for example, the oil resistance of a packaging container produced using the second substrate.

The polypropylene may be any of a homopolymer, a random copolymer, and a block copolymer, or may be a mixture of two or more selected from these. These are described in detail above.

Among these polypropylenes, a random copolymer is preferably used from the perspective of transparency. When the rigidity and heat resistance of a packaging container are regarded as important, a homopolymer is preferably used. When the drop impact resistance of a packaging container is regarded as important, a block copolymer is preferably used.

From the perspective of film formability and processability, in one embodiment, the polypropylene preferably has a melt flow rate (MFR) of 0.1 g/10 min or more, more preferably 0.3 g/10 min or more, and preferably 50 g/10 min or less, more preferably 30 g/10 min or less. The MFR of the polypropylene is measured under conditions of a temperature of 230° C. and a load of 2.16 kg in accordance with JIS K 7210-1: 2014, method A.

From the perspective of environmental load reduction, the polypropylene may be a biomass-derived polypropylene or a mechanically recycled or chemically recycled polypropylene.

The stretched resin layer in the second substrate preferably has a polypropylene content of 70% by mass or more, more preferably 80% by mass or more, still more preferably 90% by mass or more, still more preferably 95% by mass or more.

The stretched resin layer in the second substrate may contain a resin material other than polypropylene. The resin material is, for example, a polyolefin, such as polyethylene, a (meth)acrylic resin, a vinyl resin, a cellulose resin, a polyamide, a polyester, or an ionomer resin.

The stretched resin layer in the second substrate may contain the additive agent described above.

The stretched resin layer in the second substrate is a layer subjected to a stretching process. This can improve, for example, the heat resistance, drop impact resistance, water resistance, and dimensional stability of the laminate. A laminate including such a resin layer is suitable, for example, as a packaging material constituting a packaging container to be subjected to a boiling process or a retort process.

The stretching process may be uniaxial stretching or biaxial stretching.

The stretching process is described in detail above.

In one embodiment, the stretched resin layer in the second substrate may be subjected to the surface treatment. This can improve, for example, the adhesion between the stretched resin layer and another layer.

An easily adherable layer may be provided on the surface of the stretched resin layer in the second substrate.

The stretched resin layer in the second substrate may have a monolayer structure or a multilayer structure.

The stretched resin layer in the second substrate preferably has a thickness of 10 μm or more and preferably 100 μm or less, more preferably 50 μm or less. At a thickness of not less than the lower limit, for example, the laminate can have further improved strength and heat resistance. At a thickness of not more than the upper limit, for example, the laminate can have further improved processability.

In one embodiment, the second substrate is a barrier substrate including a stretched resin layer and an evaporated film composed of an inorganic oxide. The details of the barrier substrate are described above in the section <Barrier Substrate> and are omitted in this section. In one embodiment, the second substrate is a polypropylene resin substrate composed of a stretched resin layer.

<Sealant Layer (First to Sixth Aspects)>

A barrier laminate according to the present disclosure includes a sealant layer.

In one embodiment, the sealant layer contains a resin material that can be fused together by heat. The resin material that can be fused together by heat is, for example, a polyolefin, more specifically, a polyethylene, such as a low-density polyethylene, a linear low-density polyethylene, or a medium-density polyethylene, polypropylene, polybutene, a methylpentene polymer, or a cyclic olefin copolymer.

The resin material that can be fused together by heat is also, for example, an ethylene-vinyl acetate copolymer, an ethylene-(meth)acrylic acid copolymer, an ethylene-methyl (meth)acrylate copolymer, an ethylene-ethyl (meth)acrylate copolymer, an ethylene-vinyl alcohol copolymer, an ionomer resin, an acid-modified polyolefin produced by modifying a polyolefin with an unsaturated carboxylic acid, such as (meth)acrylic acid, maleic acid, maleic anhydride, fumaric acid, or itaconic acid, a polyester, such as poly (ethylene terephthalate), poly(vinyl acetate), poly(vinyl chloride), or a (meth)acrylic resin.

In one embodiment, the sealant layer is composed of a polyolefin, such as polyethylene or polypropylene. In this embodiment, the sealant layer is composed of the same type of resin material as the polyolefin resin layer and the polyolefin resin substrate, that is, a polyolefin. For example, the sealant layer is composed of the same type of resin material as the polyethylene resin layer and the polyethylene resin substrate, that is, polyethylene. For example, the sealant layer is composed of the same type of resin material as the polypropylene resin layer and the polypropylene resin substrate, that is, polypropylene. Thus, the packaging container can be made of a single material. After used packaging containers are collected, it is not necessary to separate the substrate and the sealant layer, and the packaging containers can have improved recyclability. The sealant layer composed of polypropylene can also improve the oil resistance of a packaging container produced using the barrier laminate.

The sealant layer preferably has a polyolefin content, particularly the polyethylene or polypropylene content, of 70% by mass or more, more preferably 80% by mass or more, still more preferably 90% by mass or more, still more preferably 95% by mass or more. This can improve, for example, the recyclability of the packaging container.

When the sealant layer is composed of a polyolefin, particularly polyethylene or polypropylene, the polyolefin content, particularly the polyethylene or polypropylene content, based on the total amount of resin materials contained in the barrier laminate is preferably 80% by mass or more, more preferably 85% by mass or more, still more preferably 88% by mass or more, particularly preferably 90% by mass or more. This, for example, allows the barrier laminate to be used to produce a packaging container made of a single material and can improve the recyclability of the packaging container.

The polyethylene is, for example, a high-density polyethylene, a medium-density polyethylene, a low-density polyethylene, a linear low-density polyethylene, or a very-low-density polyethylene, preferably, from the perspective of heat sealability, a low-density polyethylene, a linear low-density polyethylene, or a very-low-density polyethylene. From the perspective of environmental load reduction, a biomass-derived polyethylene and/or a recycled polyethylene may be used.

The polypropylene is, for example, a propylene homopolymer, a propylene random copolymer, such as a propylene-α-olefin random copolymer, or a propylene block copolymer, such as a propylene-α-olefin block copolymer. The α-olefin is described in detail above. From the perspective of heat sealability, the polypropylene has a density of, for example, 0.88 g/cm$^3$ or more and 0.92 g/cm$^3$ or less. The density is measured in accordance with JIS K 7112: 1999, particularly by a D method (a density-gradient tube method, 23° C.). From the perspective of environmental load reduction, a biomass-derived polypropylene and/or a recycled polypropylene may be used.

The sealant layer may contain the additive agent described above.

The sealant layer may have a monolayer structure or a multilayer structure.

The sealant layer preferably has a thickness of 10 μm or more, more preferably 20 μm or more, and preferably 200 μm or less, more preferably 150 μm or less. At a thickness of not less than the lower limit, for example, the packaging container including the barrier laminate can have further improved laminate strength. At a thickness of not more than the upper limit, for example, the barrier laminate can have further improved processability. When a pouch (in particular, a retort pouch) is produced from the barrier laminate, the sealant layer still more preferably has a thickness of 30 μm or more and still more preferably 100 μm or less.

From the perspective of heat sealability, the sealant layer is preferably an unstretched resin film, more preferably an unstretched polypropylene resin film. The resin film can be produced, for example, by a casting method, a T-die method, or an inflation method.

For example, an unstretched resin film corresponding to the sealant layer may be stacked on the second substrate via an adhesive layer as required, or the sealant layer may be formed by melt-extruding a resin material that can be fused together by heat onto the second substrate. The adhesive layer is, for example, an adhesive layer described later.

<Sealant Layer (Seventh Aspect)>

The laminate according to the seventh aspect includes a sealant layer.

The sealant layer in the laminate according to the seventh aspect contains a propylene-ethylene block copolymer as a main component, a thermoplastic elastomer, and polyethylene. This can improve, for example, the drop impact resistance of the laminate.

The sealant layer in the laminate according to the seventh aspect contains a propylene-ethylene block copolymer as a main component, that is, contains more than 50% by mass of a propylene-ethylene block copolymer.

A propylene-ethylene block copolymer can be used, for example, to enhance the drop impact resistance of the sealant layer and accordingly of the laminate. This can reduce damage to a packaging container produced using the laminate caused by drop impact.

When the sealant layer contains the propylene-ethylene block copolymer as a main component, for example, the packaging container can be made of a single material. The propylene-ethylene block copolymer corresponds to polypropylene in the calculation of the monomaterial ratio. Thus, after used packaging containers are collected, it is not necessary to separate the substrate and the sealant layer, and the packaging containers can have improved recyclability.

In one embodiment, the propylene-ethylene block copolymer includes a polymer moiety (a) composed of a propylene polymer and a polymer moiety (b) composed of polyethylene and an ethylene-propylene copolymer rubber component. In one embodiment, the propylene-ethylene block copolymer contains a sea component composed of a propylene polymer and an island component composed of polyethylene and an ethylene-propylene copolymer rubber component. The polymer moiety (a) and the sea component can contribute to enhancing the blocking resistance, heat resistance, rigidity, and seal strength of the propylene-ethylene block copolymer. The polymer moiety (b) and the island component can contribute to enhancing the impact resistance of the propylene-ethylene block copolymer. Thus, the mechanical characteristics of the sealant layer containing the propylene-ethylene block copolymer can be adjusted by adjusting the ratio of the polymer moiety (a) to the polymer moiety (b) or the ratio of the sea component to the island component.

In one embodiment, the propylene polymer of the polymer moiety (a) is a propylene homopolymer with a melting point of 160° C. or more. The propylene polymer may be a copolymer with a melting point of 160° C. or more composed of propylene and a small amount (for example, 5% by mole or less) of α-olefin. The α-olefin is, for example, ethylene, 1-butene, 1-hexene, or 1-octene.

In the polymer moiety (b), for example, the amount of constitutional unit derived from ethylene may be 20% by mass or more and 50% by mass or less in the polyethylene and the ethylene-propylene copolymer rubber component. This can further improve, for example, the drop impact resistance. In the present disclosure, the constitutional unit content can be measured by NMR.

In the propylene-ethylene block copolymer, the mass ratio of the polymer moiety (a) composed of the propylene polymer or the sea component is preferably higher than the mass ratio of the polymer moiety (b) composed of the polyethylene and the ethylene-propylene copolymer rubber component or the island component.

In the propylene-ethylene block copolymer, the mass ratio of the polymer moiety (a) composed of the propylene polymer or the sea component is preferably 51% by mass or more, more preferably 60% by mass or more, still more preferably 70% by mass or more. The upper limit of the mass ratio of the polymer moiety (a) composed of the propylene polymer or the sea component is, for example, 90% by mass.

In the propylene-ethylene block copolymer, the mass ratio of the polymer moiety (b) composed of the polyethylene and the ethylene-propylene copolymer rubber component or the island component is preferably 49% by mass or less, more preferably 40% by mass or less, still more preferably 30% by mass or less. The lower limit of the mass ratio of the polymer moiety (b) composed of the polyethylene and the ethylene-propylene copolymer rubber component or the island component is, for example, 10% by mass.

The propylene-ethylene block copolymer preferably has a melt flow rate (MFR) of 0.5 g/10 min or more, more preferably 1 g/10 min or more, and preferably 10 g/10 min or less, more preferably 5 g/10 min or less. The MFR of the propylene-ethylene block copolymer is measured under conditions of a temperature of 230° C. and a load of 2.16 kg in accordance with JIS K 7210-1: 2014, method A.

The propylene-ethylene block copolymer is produced, for example, by a method of polymerizing propylene, ethylene, and the like as raw materials using a catalyst. The catalyst is, for example, a Ziegler-Natta catalyst or a metallocene catalyst.

The sealant layer in the laminate according to the seventh aspect further contains a thermoplastic elastomer. The thermoplastic elastomer can be used, for example, to further enhance the drop impact resistance of the laminate.

The thermoplastic elastomer is, for example, a hydrogenated styrene thermoplastic elastomer or an ethylene-α-olefin elastomer, preferably a hydrogenated styrene thermoplastic elastomer.

The hydrogenated styrene thermoplastic elastomer has a polymer block A composed mainly of a constitutional unit derived from a vinyl aromatic compound and a polymer block B composed mainly of a constitutional unit derived from a conjugated diene compound and hydrogenated. The hydrogenated styrene thermoplastic elastomer has at least one polymer block A and at least one polymer block B. The block structure is, for example, AB-A, B-A-B-A, or B-A-B-A-B. In one embodiment, the hydrogenated styrene thermoplastic elastomer may have 10% by mass or more and 40% by mass or less of a constitutional unit derived from a vinyl aromatic compound.

The vinyl aromatic compound constituting the polymer block A is, for example, styrene or α-methylstyrene, preferably styrene. The conjugated diene compound constituting the polymer block B is, for example, butadiene, isoprene, or 1,3-pentadiene, preferably butadiene or isoprene.

The polymer block B is a hydrogenated polymer block composed mainly of a constitutional unit derived from a conjugated diene compound and is an olefin compound polymer block in one embodiment. In the hydrogenated styrene thermoplastic elastomer, preferably 80% by mole or more, more preferably 90% by mole or more, of an aliphatic double bond derived from the conjugated diene compound is hydrogenated.

The hydrogenated styrene thermoplastic elastomer is, for example, a styrene-ethylene/butylene-styrene block copolymer (SEBS) or a styrene-ethylene/propylene-styrene block copolymer (SEPS), preferably SEBS. SEBS is produced, for example, by adding hydrogen to an aliphatic double bond of a styrene-butadiene-styrene block copolymer. SEPS is produced, for example, by adding hydrogen to an aliphatic double bond of a styrene-isoprene-styrene block copolymer.

The ethylene-α-olefin elastomer is a low-crystallinity or amorphous copolymer elastomer and is a random copolymer of 50% by mass or more and 90% by mass or less of an ethylene unit as a main component and an α-olefin unit as a copolymerizable monomer. The ethylene-α-olefin elastomer is preferably an elastomer produced using a metallocene catalyst.

The α-olefin is, for example, an α-olefin with 3 or more and 10 or less carbon atoms, more specifically, propylene, 1-butene, 1-hexene, or 1-octene. The ethylene-α-olefin elastomer is, for example, an ethylene-propylene random copolymer, an ethylene-1-butene random copolymer, or an ethylene-1-octene random copolymer.

The thermoplastic elastomer preferably has a MFR of 0.1 g/10 min or more, more preferably 0.2 g/10 min or more, and preferably 10 g/10 min or less, more preferably 5 g/10 min or less. The MFR of the thermoplastic elastomer is measured under conditions of a temperature of 230° C. or 190° C. and a load of 2.16 kg in accordance with JIS K 7210-1: 2014, method A.

The sealant layer in the laminate according to the seventh aspect further contains polyethylene. The polyethylene can be used, for example, to further enhance the drop impact resistance of the laminate. The polyethylene is, for example, a polyethylene with a density of 925 kg/$m^3$ or less, preferably a polyethylene with a density of 900 kg/$m^3$ or more and 925 kg/$m^3$ or less. The density is measured in accordance with JIS K 7112: 1999, particularly by a D method (a density-gradient tube method, 23° C.).

The polyethylene may be, for example, a linear low-density polyethylene or a low-density polyethylene. The polyethylene is preferably a linear low-density polyethylene. The linear low-density polyethylene has high adhesiveness to the polymer moiety (a) of the propylene-ethylene block copolymer or the propylene polymer as the sea component. Thus, when the polyethylene is a linear low-density polyethylene, it is possible to reduce the occurrence of separation between resins of the sealant layer. The polyethylene can contribute to enhancing the impact resistance of the sealant layer.

The linear low-density polyethylene preferably has a density of 900 kg/$m^3$ or more, more preferably 915 kg/$m^3$ or more, and preferably 925 kg/$m^3$ or less. The linear low-density polyethylene is produced, for example, by copolymerizing ethylene and an α-olefin at a medium pressure or a low pressure to introduce a short-chain branch derived from the α-olefin. The α-olefin is, for example, an α-olefin with 4 or more and 10 or less carbon atoms, such as 1-butene, 1-hexene, 4-methyl-1-pentene, or 1-octene.

The low-density polyethylene preferably has a density of 900 kg/$m^3$ or more, more preferably 910 kg/$m^3$ or more, and preferably 925 kg/$m^3$ or less. The low-density polyethylene is produced, for example, by polymerizing ethylene at a high pressure of 1,000 atm or more and less than 2000 atm. The low-density polyethylene is also referred to as a high-pressure low-density polyethylene.

From the perspective of environmental load reduction, the polyethylene may be a biomass-derived polyethylene or a mechanically recycled or chemically recycled polyethylene.

The polyethylene preferably has a melting point Tm of 100° C. or more, more preferably 105° C. or more, and preferably 120° C. or less. The Tm of the polyethylene is determined by differential scanning calorimetry (DSC) in accordance with JIS K 7121: 2012.

The polyethylene preferably has a MFR of 1 g/10 min or more, more preferably 2 g/10 min or more, and preferably 20 g/10 min or less, more preferably 10 g/10 min or less. The MFR of the polyethylene is measured under conditions of a temperature of 190° C. and a load of 2.16 kg in accordance with JIS K 7210-1: 2014, method A.

In the sealant layer in the laminate according to the seventh aspect, it is preferable that the polyethylene content is higher than the thermoplastic elastomer content and the propylene-ethylene block copolymer content is higher than the polyethylene content on a mass basis. This can further improve, for example, the drop impact resistance.

In the sealant layer in the laminate according to the seventh aspect, the propylene-ethylene block copolymer content is preferably 51% by mass or more, more preferably 60% by mass or more, still more preferably 70% by mass or more. In the sealant layer, the propylene-ethylene block copolymer content is, for example, 94% by mass or less.

In the sealant layer in the laminate according to the seventh aspect, the polyethylene content is preferably 5% by mass or more, more preferably 10% by mass or more. In the sealant layer, the polyethylene content is, for example, 30% by mass or less. A polyethylene content of not less than the lower limit can result in, for example, further improved drop impact resistance. A polyethylene content of not more than the upper limit can result in, for example, further improved blocking resistance.

In the sealant layer in the laminate according to the seventh aspect, the thermoplastic elastomer content is preferably 1% by mass or more, more preferably 3% by mass or more. In the sealant layer, the thermoplastic elastomer content is, for example, 15% by mass or less.

The sealant layer may contain the additive agent described above.

The sealant layer may have a monolayer structure or a multilayer structure.

The sealant layer preferably has a thickness of 10 μm or more, more preferably 20 μm or more, and preferably 200 μm or less, more preferably 150 μm or less. At a thickness of not less than the lower limit, for example, the packaging container including the laminate can have further improved laminate strength. At a thickness of not more than the upper limit, for example, the laminate can have further improved processability. When a pouch (in particular, a retort pouch) is produced from the laminate, the sealant layer preferably has a thickness of 30 μm or more, more preferably 40 μm or more, still more preferably 60 μm or more, and preferably 100 μm or less.

The sealant layer in the laminate according to the seventh aspect has a melting peak temperature observed in the range of 100° C. or more and less than 120° C. (hereinafter also referred to as a "first melting peak temperature P1"). The sealant layer may further have a melting peak temperature observed in the range of 120° C. or more and less than 135° C. (hereinafter also referred to as a "second melting peak temperature P2"). The sealant layer may further have a melting peak temperature observed in the range of 160° C. or more (hereinafter also referred to as a "third melting peak temperature P3").

In the sealant layer in the laminate according to the seventh aspect, when the P1 is observed in the range of 100° C. or more and less than 120° C., and the P2 is preferably observed in the range of 120° C. or more and less than 135° C., a packaging container produced using the laminate can have improved drop impact resistance. When P3 is observed in the range of 160° C. or more in the sealant layer, a packaging container produced using the laminate can have improved heat resistance.

Figure 15:
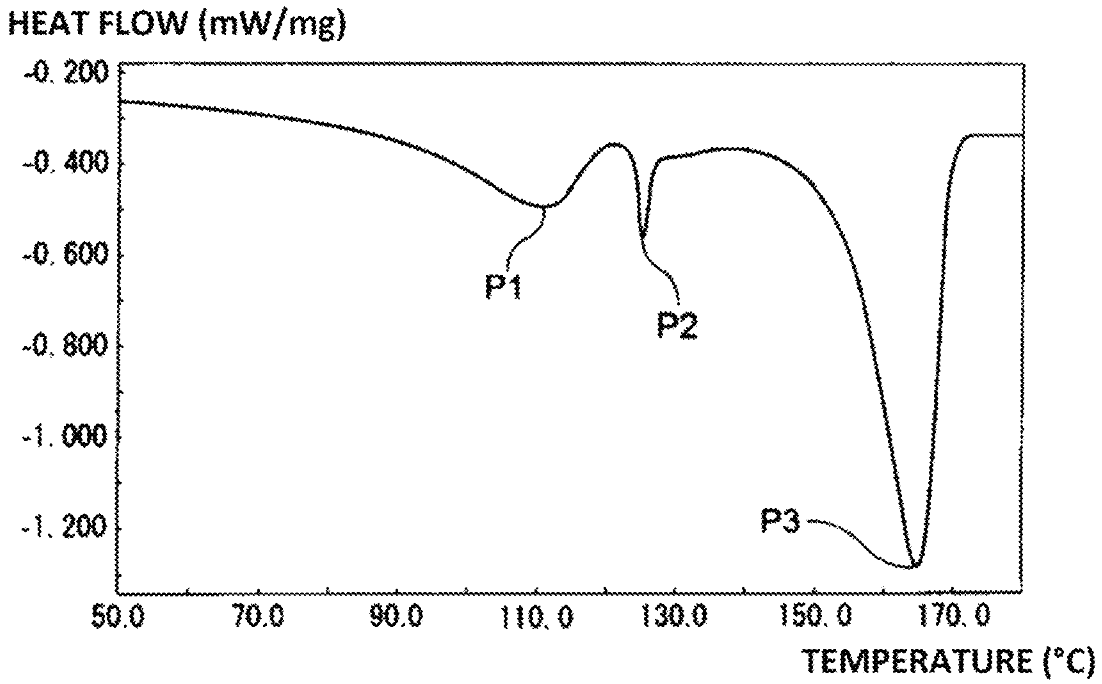
FIG. 15 is a graph for explaining the melting peak temperature of a sealant film.

Each melting peak temperature of the sealant layer in the laminate according to the seventh aspect is determined by differential scanning calorimetry (DSC). In the present disclosure, a melting peak temperature of the sealant layer is measured under the following conditions. First, a standing pouch is prepared from the laminate and is filled with water from an opening. After the opening is sealed by heat sealing, the sealed pouch is subjected to a retort process of a hot water type at a retort temperature of 121° C. for a retort time of 30 minutes. A sealant film corresponding to a sealant layer in a non-heat-seal portion is separated as a test specimen from the standing pouch after the retort process. In accordance with JIS K 7121: 2012, the separated sealant film is held at 20° C. for 1 minute and is then heated from 20° C. to 200° C. at a heating rate of 10° C./min to measure a melting peak temperature. At this time, the nitrogen gas flow rate is 20 ml/min. Details of these conditions are described in Examples. The term "melting peak temperature", as used herein, refers to a peak top temperature of a melting peak in a DSC curve. FIG. 15 shows an example of DSC measurement results of a sealant layer with P1, P2, and P3.

The sealant film can be produced, for example, by a known method. The sealant film can be produced by mixing the materials described above by a common method and forming the resulting mixture into a film by a common method. The sealant film is preferably a film produced by extrusion. The extrusion is preferably performed by a T-die method or an inflation method. More specifically, the sealant film can be formed by drying materials constituting the sealant film as required, then supplying the materials to a melt extruder heated to a temperature equal to or higher than the melting points of the materials to melt the materials, extruding the materials into a film, for example, from a die, such as a T-die, and rapidly cooling and solidifying the extruded film with a rotating cooling drum or the like.

The melt extruder can be a single-screw extruder, a twin-screw extruder, a vent extruder, a tandem extruder, or the like, depending on the purpose. The temperature of molten polymer extruded from the melt extruder is, for example, preferably 200° C. or more, more preferably 220° C. or more, and preferably 300° C. or less, more preferably 270° C. or less.

The sealant layer is preferably an unstretched resin film from the perspective of heat sealability. The resin film can be produced, for example, by a casting method, a T-die method, or an inflation method.

The sealant layer may be subjected to the surface treatment.

<Sealant Layer (Eighth Aspect)>

The laminate according to the eighth aspect includes a sealant layer.

The sealant layer in the laminate according to the eighth aspect contains polypropylene as a main component. Thus, the sealant layer is composed of the same type of resin material as the stretched resin layer, that is, polypropylene. Thus, the packaging container can be made of a single material. After used packaging containers are collected, it is not necessary to separate the substrate and the sealant layer, and the packaging containers can have improved recyclability. The sealant layer composed of polypropylene can also improve the oil resistance of a packaging container produced using the laminate.

The sealant layer preferably has a polypropylene content of preferably 70% by mass or more, more preferably 80% by mass or more, still more preferably 90% by mass or more, still more preferably 95% by mass or more. This can improve, for example, the recyclability of the packaging container.

The polypropylene is, for example, a propylene homopolymer, a propylene random copolymer, such as a propylene-α-olefin random copolymer, or a propylene block copolymer, such as a propylene-α-olefin block copolymer. The α-olefin is described in detail above. From the perspective of heat sealability, the polypropylene has a density of, for example, 0.88 g/cm$^3$ or more and 0.92 g/cm$^3$ or less. The density is measured in accordance with JIS K 7112: 1999, particularly by a D method (a density-gradient tube method, 23° C.). From the perspective of environmental load reduction, a biomass-derived polypropylene and/or a recycled polypropylene may be used.

The sealant layer may contain the additive agent described above.

In the laminate according to the eighth aspect, a polypropylene with Tim1 and/or Tim2 described below is preferably used as a main component of the sealant layer. This allows, for example, a sealant layer with high low-temperature sealability to be formed.

The polypropylene as a main component in the sealant layer preferably has a Tim1 of 145° C. or less, more preferably 140° C. or less, still more preferably 135° C. or less, particularly preferably 130° C. or less. This allows, for example, a packaging material with a wide heat-sealable temperature range and high seal strength to be composed. The lower limit of the Tim1 of the polypropylene as a main component in the sealant layer may be, for example, but is not limited to, 50° C., 60° C., 70° C., 80° C., or 90° C.

The polypropylene as a main component in the sealant layer preferably has a Tim2 of 150° C. or less, more preferably 148° C. or less, still more preferably 145° C. or less, particularly preferably 143° C. or less. This allows, for example, a packaging material with a wide heat-sealable temperature range and high seal strength to be composed. The lower limit of the Tim2 of the polypropylene as a main component in the sealant layer may be, for example, but is not limited to, 60° C., 70° C., 80° C., 90° C., or 100° C.

The sealant layer may have a monolayer structure or a multilayer structure.

The sealant layer preferably has a thickness of 10 μm or more, more preferably 20 μm or more, and preferably 200 μm or less, more preferably 150 μm or less. At a thickness of not less than the lower limit, for example, the packaging container including the laminate can have further improved laminate strength. At a thickness of not more than the upper limit, for example, the laminate can have further improved processability. When a pouch (in particular, a retort pouch) is produced from the laminate, the sealant layer preferably has a thickness of 30 μm or more, more preferably 40 μm or more, still more preferably 60 μm or more, and preferably 100 μm or less.

The sealant film can be produced, for example, by a known method. The sealant film can be produced by mixing the materials described above by a common method and forming the resulting mixture into a film by a common method. The sealant film is preferably a film produced by extrusion. The extrusion is preferably performed by a T-die method or an inflation method. More specifically, the sealant film can be formed by drying materials constituting the sealant film as required, then supplying the materials to a melt extruder heated to a temperature equal to or higher than the melting points of the materials to melt the materials, extruding the materials into a film, for example, from a die, such as a T-die, and rapidly cooling and solidifying the extruded film with a rotating cooling drum or the like.

The melt extruder can be a single-screw extruder, a twin-screw extruder, a vent extruder, a tandem extruder, or the like, depending on the purpose. The temperature of molten polymer extruded from the melt extruder is, for example, preferably 200° C. or more, more preferably 220° C. or more, and preferably 300° C. or less, more preferably 270° C. or less.

The sealant layer is preferably an unstretched resin film from the perspective of heat sealability. The resin film can be produced, for example, by a casting method, a T-die method, or an inflation method.

The sealant layer may be subjected to the surface treatment.

In one embodiment, the sealant layer may be any polypropylene unstretched resin layer with high low-temperature sealability, for example, a commercially available unstretched polypropylene film, such as an unstretched polypropylene film (ET-20 manufactured by Okamoto Industries, Inc.).

For example, an unstretched resin film corresponding to the sealant layer may be stacked on the first substrate or the second substrate via an adhesive layer as required, or the sealant layer may be formed by melt-extruding polypropylene or a resin composition thereof onto the first substrate or the second substrate. The adhesive layer is, for example, an adhesive layer described later.

<Print Layer>

A laminate according to the present disclosure may have a print layer on the surface of a substrate, such as a barrier substrate or a polyolefin resin substrate. A laminate according to the present disclosure may have a print layer on the surface of a substrate, such as a first substrate or a second substrate. The barrier substrate may have a print layer on the surface of a polyolefin resin layer. Any image, such as a letter, a pattern, a symbol, or a combination thereof, may be formed on the print layer. The print layer may be formed using a biomass-derived ink. This can further reduce the environmental load.

A method of forming a print layer is, for example, a known printing method, such as a gravure printing method, an offset printing method, or a flexographic printing method. Among these, the flexographic printing method is preferred from the perspective of environmental load reduction.

The print layer has a thickness of, for example, 0.5 μm or more and 3 μm or less.

<Adhesive Layer>

In one embodiment, a laminate according to the present disclosure includes an adhesive layer between a substrate and a sealant layer. In one embodiment, a laminate according to the present disclosure includes a first adhesive layer between a first substrate and a second substrate. In one embodiment, a laminate according to the present disclosure includes a second adhesive layer between a second substrate and a sealant layer. This can improve adhesion between the substrate and the sealant layer, adhesion between the first substrate and the second substrate, and/or adhesion between the second substrate and the sealant layer.

In one embodiment, a laminate according to the present disclosure includes an adhesive layer with a thickness of 2 μm or less between a substrate and a sealant layer. In one embodiment, a laminate according to the present disclosure includes a first adhesive layer with a thickness of 2 μm or less between a first substrate and a second substrate and includes a second adhesive layer with a thickness of 2 μm or less between the second substrate and a sealant layer. In one embodiment, a laminate according to the present disclosure includes a first adhesive layer with a thickness of 10 μm or less between a first substrate and a second substrate and includes a second adhesive layer with a thickness of 10 μm or less between the second substrate and a sealant layer.

An adhesive layer, such as a first adhesive layer or a second adhesive layer, is composed of an adhesive agent. The adhesive agent may be any of a one-component curing adhesive agent, a two-component curing adhesive agent, or a non-curable adhesive agent. The adhesive agent may be a solvent-free adhesive agent or a solvent-based adhesive agent. In one embodiment, a barrier laminate according to the present disclosure includes at least three elements: a polyolefin resin substrate, such as a polypropylene resin substrate, a barrier substrate, and a sealant layer. As a result, when a laminate is produced using the adhesive agent, the laminate can be produced without directly applying the adhesive agent onto an evaporated film, which can reduce degradation of the evaporated film.

The adhesive agent may be a solvent-free adhesive agent or a solvent-based adhesive agent and is preferably a solvent-free adhesive agent from the perspective of improving tearability and reducing the amount of residual solvent in the laminate.

The solvent-free adhesive agent, that is, a non-solvent lamination adhesive agent is, for example, a polyether adhesive agent, a polyester adhesive agent, a silicone adhesive agent, an epoxy adhesive agent, or a urethane adhesive agent. Among these, a urethane adhesive agent is preferred, and a two-component curing urethane adhesive agent is more preferred.

In one embodiment, the solvent-free adhesive agent is a two-component curing adhesive agent including a main agent and a curing agent. A polymer component contained in the main agent preferably has a weight-average molecular weight (Mw) of 800 or more, more preferably 1,200 or more, and preferably 10,000 or less, more preferably 4,000 or less, from the perspective of coatability. The polymer component contained in the main agent preferably has a polydispersity (Mw/Mn) of 2.8 or less, more preferably 2.7 or less, still more preferably 2.6 or less, particularly preferably 2.5 or less, and preferably 1.2 or more, more preferably 1.5 or more, still more preferably 2.0 or more. Mn denotes the number-average molecular weight of the polymer component contained in the main agent. The average molecular weight is measured in terms of polystyrene by gel permeation chromatography (GPC) according to JIS K 7252-1: 2016.

The solvent-based adhesive agent is, for example, a rubber adhesive agent, a vinyl adhesive agent, an olefin adhesive agent, a silicone adhesive agent, an epoxy adhesive agent, a phenolic adhesive agent, or a urethane adhesive agent. Among these, a urethane adhesive agent is preferred, and a two-component curing urethane adhesive agent is more preferred.

In one embodiment, forming an adhesive layer using a solvent-free adhesive agent can further reduce, for example, the amount of residual solvent, more specifically the amount of residual organic solvent, in the laminate. A laminate according to the present disclosure includes a polyolefin resin layer, such as a polypropylene resin layer. In one embodiment, a laminate according to the present disclosure includes a polyolefin resin layer and a polyolefin resin substrate. In one embodiment, a laminate according to the present disclosure includes a polypropylene resin layer and a polypropylene resin substrate. Thus, when a laminate according to the present disclosure is produced using a solvent-based adhesive agent, the drying temperature should be lower than the drying temperature for a polyester laminate to prevent degradation or thermal shrinkage of the laminate. In this case, a solvent in the adhesive agent may be insufficiently removed by volatilization and remains in the laminate, and a malodor due to the residual solvent may remain. A solvent-free adhesive agent can be used to further reduce the amount of residual solvent.

The organic solvent is, for example, a hydrocarbon solvent, such as toluene, xylene, n-hexane, or methylcyclohexane; an ester solvent, such as ethyl acetate, n-propyl acetate, n-butyl acetate, or isobutyl acetate; an alcohol solvent, such as methanol, ethanol, isopropyl alcohol, n-butyl alcohol, or isobutyl alcohol; or a ketone solvent, such as acetone, methyl ethyl ketone, methyl isobutyl ketone, or cyclohexanone.

In one embodiment, the use of a solvent-free adhesive agent can reduce the thickness of, for example, the adhesive layer as compared with the use of a solvent-based adhesive agent. This can further improve the polyolefin (for example, polypropylene) content of the entire laminate. Such a laminate is suitable for producing a packaging container made of a single material.

In one embodiment, the use of a solvent-free adhesive agent can further improve the tearability of a laminate, particularly in the TD direction, as compared with the use of a solvent-based adhesive agent, as described later. The tearability can be improved by using a solvent-free adhesive agent to reduce the thickness and increase the hardness of an adhesive layer.

The adhesive layer, such as a first adhesive layer or a second adhesive layer, preferably has a thickness of 0.1 μm or more, more preferably 0.2 μm or more, still more preferably 0.5 μm or more, and preferably 10 μm or less, more preferably 8 μm or less, still more preferably 6 μm or less. The adhesive layer may have a thickness of 2 μm or less. The adhesive layer may have a thickness of more than 2 μm.

In one embodiment, the adhesive layer, such as a first adhesive layer or a second adhesive layer, has a thickness of 2 μm or less, preferably 0.1 μm or more, more preferably 0.2 μm or more, still more preferably 0.5 μm or more, and preferably 2 μm or less. For example, this can improve the tearability of the laminate and reduce the amount of residual solvent in the laminate.

An adhesive agent for forming a first adhesive layer and an adhesive agent for forming a second adhesive layer may be the same or different.

A laminate according to the present disclosure can be produced by any method including a known method, such as a dry lamination method, a melt-extrusion lamination method, or a sandwich lamination method. In one embodiment, a laminate according to the present disclosure may be produced by bonding a substrate and a resin film (sealant film) corresponding to a sealant layer by a non-solvent lamination method using a solvent-free adhesive agent or a dry lamination method using a solvent-based adhesive agent. In one embodiment, a laminate according to the present disclosure may be produced by bonding a first substrate, a second substrate, and a resin film (sealant film) corresponding to a sealant layer by a non-solvent lamination method using a solvent-free adhesive agent or a dry lamination method using a solvent-based adhesive agent.

In one embodiment, a laminate according to the present disclosure includes a first substrate, a first adhesive layer composed of a solvent-free adhesive agent, a second substrate, a second adhesive layer composed of a solvent-free adhesive agent, and a sealant layer.

A two-component curing urethane adhesive agent is described below. The urethane adhesive agent is preferably, for example, an adhesive agent that includes a main agent containing a polyol compound, such as a polyester polyol, and a curing agent containing an isocyanate compound.

The polyol compound is, for example, a polyester polyol, a polyether polyol, a polycarbonate polyol, or a (meth) acrylic polyol. Among these, a polyester polyol is preferred.

A polyester polyol has two or more hydroxy groups per molecule. The polyester polyol has, for example, a polyester structure or a polyester polyurethane structure as a main backbone. The polyester polyol is produced, for example, by a dehydration condensation reaction, transesterification, or a ring-opening reaction of a polyhydric alcohol component and a polycarboxylic acid component.

The polyhydric alcohol component is, for example, a diol, such as ethylene glycol, propylene glycol, diethylene glycol, dipropylene glycol, 1,4-butanediol, 1,5-pentanediol, 3-methyl-1,5-pentanediol, 1,6-hexanediol, neopentyl glycol, or cyclohexanedimethanol; or a trifunctional or higher functional polyol, such as glycerin, triethylolpropane, trimethylolpropane, pentaerythritol, or sorbitol.

The polycarboxylic acid component is, for example, an aliphatic polycarboxylic acid, an alicyclic polycarboxylic acid, an aromatic polycarboxylic acid, or an ester derivative or an acid anhydride thereof. The aliphatic polycarboxylic acid is, for example, an aliphatic dicarboxylic acid, such as succinic acid, adipic acid, azelaic acid, sebacic acid, dodecane dicarboxylic acid, maleic acid, fumaric acid, or dimer acid. The alicyclic polycarboxylic acid is, for example, 1,3-cyclopentanedicarboxylic acid or 1,4-cyclohexanedicarboxylic acid. The aromatic polycarboxylic acid is, for example, phthalic acid, isophthalic acid, terephthalic acid, trimellitic acid, pyromellitic acid, naphthalenedicarboxylic acid, naphthalic acid, biphenyldicarboxylic acid, or 1,2-bis (phenoxy)ethane-p,p'-dicarboxylic acid.

If necessary, the polyester polyol may be chain-extended with a polyisocyanate in advance. The polyisocyanate is, for example, a diisocyanate, such as 1,6-hexamethylene diisocyanate, isophorone diisocyanate, norbornene diisocyanate, m-xylylene diisocyanate, α,α,α'α'-tetramethyl-m-xylylene diisocyanate, tolylene diisocyanate, naphthalene diisocyanate, or diphenylmethane diisocyanate; or a biuret, nurate, or trimethylolpropane adduct of a diisocyanate.

A polyol compound, such as a polyester polyol, preferably has a weight-average molecular weight (Mw) of 800 or more, more preferably 1,200 or more, and preferably 10,000 or less, more preferably 4,000 or less, from the perspective of coatability. A polyol compound, such as a polyester polyol, preferably has a polydispersity (Mw/Mn) of 2.8 or less, more preferably 2.7 or less, still more preferably 2.6 or less, particularly preferably 2.5 or less, and preferably 1.2 or more, more preferably 1.5 or more, still more preferably 2.0 or more. Mn denotes the number-average molecular weight of the polyol compound. The average molecular weight is measured in terms of polystyrene by gel permeation chromatography (GPC) according to JIS K 7252-1: 2016.

An isocyanate compound has two or more isocyanate groups per molecule.

The isocyanate compound is, for example, an aromatic isocyanate or an aliphatic isocyanate. The isocyanate compound may also be a blocked isocyanate compound produced by an addition reaction using a known isocyanate blocking agent by an appropriate traditional method.

The isocyanate compound is, for example, a diisocyanate, such as tetramethylene diisocyanate, hexamethylene diisocyanate, norbornene diisocyanate, isophorone diisocyanate, diphenylmethane diisocyanate, hydrogenated diphenylmethane diisocyanate, m-xylylene diisocyanate, hydrogenated xylylene diisocyanate, tolylene diisocyanate, naphthalene diisocyanate, or α,α,α'α'-tetramethyl-m-xylylene diisocyanate; a trimer of the diisocyanate; or an adduct, biuret, or an allophanate produced by reacting the diisocyanate compound with a low-molecular-weight active hydrogen compound or an alkylene oxide adduct thereof or a high-molecular-weight active hydrogen compound.

The low-molecular-weight active hydrogen compound is, for example, ethylene glycol, propylene glycol, diethylene glycol, dipropylene glycol, 1,4-butanediol, neopentyl glycol, 1,6-hexamethylene glycol, 1,8-octamethylene glycol, 1,4-cyclohexanedimethanol, m-xylylene alcohol, 1,3-bishydroxyethylbenzene, 1,4-bishydroxyethylbenzene, trimethylolethane, trimethylolpropane, glycerol, pentaerythritol, erythritol, sorbitol, ethylenediamine, monoethanolamine, diethanolamine, triethanolamine, or m-xylylenediamine. The high-molecular-weight active hydrogen compound is, for example, a polyester, a polyether polyol, or a polyamide.

<Physical Properties>

In one embodiment, a barrier laminate according to the present disclosure has the thermal shrinkage ratio described below. The MD direction refers to the flow direction of a laminate, and the TD direction refers to the direction perpendicular to the MD direction.

A barrier laminate after heat treatment at 120° C. for 15 minutes has a thermal shrinkage ratio (MD1) of, for example, 2.00% or less, preferably 1.20% or less, more preferably 1.00% or less, still more preferably 0.90% or less, in the MD direction. The lower limit of the thermal shrinkage ratio (MD1) is preferably as low as possible and may be, for example, 0.10% or 0.20%. A barrier laminate with such a small thermal shrinkage ratio (MD1) has good gas barrier properties and has high bag-making suitability when a packaging bag is produced by heat sealing.

A barrier laminate after heat treatment at 120° C. for 15 minutes has a thermal shrinkage ratio (TD1) of, for example, 2.00% or less, preferably 1.50% or less, more preferably 1.30% or less, in the TD direction. The lower limit of the thermal shrinkage ratio (TD1) is preferably as low as possible and may be, for example, 0.10%, 0.20%, or 0.50%. A barrier laminate with not only such a low thermal shrinkage ratio (MD1) but also such a low thermal shrinkage ratio (TD1) has better gas barrier properties and higher bag-making suitability. For example, a packaging bag produced by heat sealing is less likely to have wrinkling, deformation, or the like. In particular, a barrier laminate with a small thermal shrinkage ratio (TD1) can have an image with a smaller distortion on its print layer.

The ratio (MD1/TD1) of the thermal shrinkage ratio (MD1) to the thermal shrinkage ratio (TD1) of a barrier laminate after heat treatment at 120° C. for 15 minutes is, for example, 0.30 or more and 3.00 or less, preferably 0.35 or more, more preferably 0.40 or more, and preferably 2.00 or less, more preferably 1.50 or less. With a ratio (MD1/TD1) in such a range, the laminate shrinks relatively uniformly in the MD direction and the TD direction even when subjected to heat treatment and, for example, the barrier laminate can therefore have an image with a smaller distortion on its print layer.

A barrier laminate after heat treatment at 150° C. for 5 minutes has a thermal shrinkage ratio (MD2) of, for example, 4.00% or less, preferably 3.50% or less, more preferably 3.10% or less, in the MD direction. The lower limit of the thermal shrinkage ratio (MD2) is preferably as low as possible and may be, for example, 0.50% or 1.00%.

A barrier laminate after heat treatment at 150° C. for 5 minutes has a thermal shrinkage ratio (TD2) of, for example, 4.00% or less, preferably 3.50% or less, more preferably 2.80% or less, in the TD direction. The lower limit of the thermal shrinkage ratio (TD2) is preferably as low as possible and may be, for example, 0.50% or 1.00%.

The ratio (MD2/TD2) of the thermal shrinkage ratio (MD2) to the thermal shrinkage ratio (TD2) of a barrier laminate after heat treatment at 150° C. for 5 minutes is, for example, 0.30 or more and 3.00 or less, preferably 0.40 or more, more preferably 0.50 or more, and preferably 2.00 or less, more preferably 1.60 or less.

The thermal shrinkage ratios are calculated using the following formulae:

Thermal shrinkage ratio (*MD*) (%)=(length of laminate before heat treatment in *MD* direction−length of laminate after heat treatment in *MD* direction)/length of laminate before heat treatment in *MD* direction×100

Thermal shrinkage ratio (*TD*) (%)=(length of laminate before heat treatment in *TD* direction−length of laminate after heat treatment in *TD* direction)/length of laminate before heat treatment in *TD* direction×100

In one embodiment, a barrier laminate according to the present disclosure has tear strength described below.

The tear strength is measured as described below. A sample is prepared by stacking 16 barrier laminates such that the front and back sides are alternately arranged and the MD direction and the TD direction of the films constituting the barrier laminates are aligned. The tear strength of the sample in the MD direction and the TD direction is measured in accordance with JIS K 7128-2: 1998 (an Elmendorf tear method), for example, using a No. 163 ELMENDORF tear tester manufactured by Toyo Seiki Seisaku-Sho, Ltd.

The barrier laminate has a tear strength (unit: N/16 laminates) of, for example, 0.1 or more and 2.0 or less, preferably 0.2 or more and 1.5 or less, in the MD direction. This can improve the unsealability of a packaging container composed of the barrier laminate in the MD direction.

The barrier laminate has a tear strength (unit: N/16 laminates) of, for example, 0.1 or more and 6.0 or less, preferably 0.2 or more, more preferably 0.5 or more, and preferably 5.5 or less, more preferably 5.0 or less, in the TD direction.

In one embodiment, the barrier laminate preferably has a tear strength (unit: N/16 laminates) of 3.5 or less, more preferably 3.0 or less, still more preferably 2.5 or less, and may be, for example, 0.1 or more, 0.2 or more, or 0.5 or more, in the TD direction. This can improve the unsealability of a packaging container composed of the barrier laminate in the TD direction. For example, a barrier laminate can be produced using a solvent-free adhesive agent to further reduce the tear strength in the TD direction.

The ratio ($strength_{TD}/strength_{MD}$) of the tear strength in the TD direction to the tear strength in the MD direction of the barrier laminate is, for example, 8.0 or less, preferably 7.0 or less, more preferably 6.0 or less. The lower limit of the ratio may be, for example, but is not limited to, 1.0, 1.5, or 2.0.

In one embodiment, the ratio ($strength_{TD}/strength_{M}D$) is preferably 5.0 or less, more preferably 4.5 or less, still more preferably 4.0 or less. This can improve the unsealability of a packaging container composed of the barrier laminate in the TD direction.

In one embodiment, the amount of residual solvent in a barrier laminate according to the present disclosure is 30 $mg/m^2$ or less, preferably 25 $mg/m^2$ or less, more preferably 10 $mg/m^2$ or less, still more preferably 5 $mg/m^2$ or less, still more preferably 3 $mg/m^2$ or less, 2 $mg/m^2$ or less, or 1 $mg/m^2$ or less. The lower limit of the amount of residual solvent is preferably as low as possible and may be, for example, 0.1 $mg/m^2$ or 0.2 $mg/m^2$.

The amount of residual solvent can be measured in a 10 cm square sample cut out from a barrier laminate by a calibration curve method, for example, using a gas chromatograph GC-2014 manufactured by Shimadzu Corporation.

In one embodiment, a barrier laminate preferably has a heat-seal strength of 23 N/15 mm or more, more preferably 30 N/15 mm or more. The upper limit of the heat-seal strength of the barrier laminate may be, for example, but is not limited to, 100 N/15 mm.

The heat-seal strength (hereinafter also referred to as "seal strength") is measured as described below. First, two barrier laminates prepared are cut into a size of 100 mm×100 mm, are stacked with the surfaces on the sealant layer side facing each other, and are heat-sealed. The heat-sealed portion is also referred to as a "heat seal portion". The sealing conditions are a sealing width of 10 mm, a sealing temperature of 175° C. (one side heating), a sealing pressure of 0.098 MPa, and a sealing time of 1 second. The sealed sample is cut into a width of 15 mm to prepare a test specimen with a length of 100 mm (including a seal width of 10 mm) and a width of 15 mm. The test specimen is subjected to a tensile test using a tensile tester in an environment of 23° C. and 50% RH. In the tensile test, the test specimen is opened by 180 degrees around the heat seal portion, both ends of the test specimen are attached to the tensile tester, and the seal strength (N/15 mm) is measured by T-type peeling at a rate of 300 mm/min.

The ratio of a polypropylene single material (hereinafter also referred to as a "monomaterial ratio") in the laminate according to the seventh or eighth aspect is preferably 80% by mass or more, more preferably 85% by mass or more, still more preferably 88% by mass or more, particularly preferably 90% by mass or more. This, for example, allows the laminate to be used to produce a packaging container made of a single material and can improve the recyclability of the packaging container. A higher monomaterial ratio is more preferred, and the upper limit thereof may be, for example, 99% by mass or 98% by mass.

In the seventh and eighth aspects, the monomaterial ratio means the ratio of the polypropylene single material to the total mass of the laminate. When a layer contains polypropylene as a main component (that is, more than 50% by mass), the monomaterial ratio is calculated on the assumption that the polypropylene constitutes 100% by mass of the layer. For example, for a sealant layer composed of 80% by mass of polypropylene, 5% by mass of a thermoplastic elastomer, and 15% by mass of polyethylene, the monomaterial ratio is calculated on the assumption that the sealant layer is composed of 100% by mass of polypropylene. For example, for a sealant layer composed of 80% by mass of polypropylene and 20% by mass of another resin material, the monomaterial ratio is calculated on the assumption that the sealant layer is composed of 100% by mass of polypropylene.

[Packaging Container]

A laminate according to the present disclosure can be suitable for use in a packaging material application.

A packaging material is used to produce a packaging container. A packaging material includes a laminate according to the present disclosure. A packaging container can be produced using at least a packaging material including a laminate according to the present disclosure.

A packaging container according to the present disclosure includes a laminate according to the present disclosure. The packaging container is, for example, a packaging bag, a tube container, or a container with a lid. The container with a lid includes a container main body with a storage portion, and a lid material bonded (heat-sealed) to the container main body to seal the storage portion.

In one embodiment, a packaging container according to the present disclosure maintains gas barrier properties even when subjected to high-temperature treatment and undergoes little deformation, and is therefore suitable as a container for a microwave oven or as a boiled or retort container. A packaging container according to the present disclosure is also suitable as a boiled or retort container for a microwave oven. A packaging container according to the present disclosure is particularly suitable as a boiled or retort pouch.

The heat sealing method is, for example, bar sealing, rotating roll sealing, belt sealing, impulse sealing, high-frequency sealing, or ultrasonic sealing.

A packaging bag according to one embodiment has a heat seal portion, and the heat seal portion preferably has a seal strength of 23 N/15 mm or more, more preferably 30 N/15 mm or more, as measured under conditions of a rate of 300 mm/min and T-type peeling. The upper limit of the seal strength may be, for example, but is not limited to, 100 N/15 mm.

The seal strength is measured as described below. A packaging bag is cut into a width of 15 mm to prepare a test specimen with a width of 15 mm. The test specimen is subjected to a tensile test using a tensile tester in an environment of 23° C. and 50% RH. In the tensile test, the test specimen is opened by 180 degrees around the heat seal portion, both ends of the test specimen are attached to the tensile tester, and the seal strength (N/15 mm) is measured by T-type peeling at a rate of 300 mm/min.

Examples of packaging bags include packaging bags of various types, such as a standing pouch type, a side seal type, a two-sided seal type, a three-sided seal type, a four-sided seal type, an envelope seal type, a butt seal type (pillow seal type), a ribbed seal type, a flat bottom seal type, a square bottom seal type, and a gusset type.

A packaging container may have an easy-open portion. The easy-open portion is, for example, a notch portion serving as a starting point for tearing a packaging container, or a half-cut line formed by laser processing, with a cutter, or the like as a tear line for a packaging container.

A packaging container may have a venting mechanism. The venting mechanism is configured to allow the inside of the packaging container to communicate with the outside to release the vapor when the vapor pressure in the packaging container reaches a predetermined value or more, and is also configured to reduce the release of the vapor at a portion other than the venting mechanism.

The venting mechanism includes, for example, a venting seal portion protruding from a side seal portion toward the inside of the packaging container and an unsealed portion separated from a content storage portion by the venting seal portion. The unsealed portion communicates with the outside of the packaging container. The packaging container filled with the contents and heat-sealed at the opening is heated with a microwave oven or the like. This increases the internal pressure and separates the venting seal portion. The vapor is released to the outside of the packaging container through the separated portion of the venting seal portion and through the unsealed portion.

In one embodiment, a packaging bag can be produced by folding a laminate according to the present disclosure in two such that a substrate, such as a first substrate, is positioned on the outside and a sealant layer is positioned on the inside, and heat-sealing an end portion or the like of the laminate. In another embodiment, a packaging bag can be produced by stacking a plurality of laminates according to the present disclosure with sealant layers facing each other, and heat-sealing an end portion or the like of the laminates. The packaging bag may be composed entirely of the laminate or may be composed partially of the laminate.

In one embodiment, a laminate according to the present disclosure is used as a lid material in a container with a lid. The container with a lid includes a container main body with a storage portion, and a lid material bonded (heat-sealed) to the container main body to seal the storage portion. The lid material, that is, a sealant layer of the laminate, and the container main body are heat-sealed. The container main body has, for example, a cup shape or a bottomed cylindrical shape. The container main body is made of, for example, polystyrene, polypropylene, polyethylene, or paper.

The contents to be contained in a packaging container are, for example, a liquid, a solid, a powder, or a gel. The contents may be a food or drink or may be a non-food or non-drink, such as a chemical product, a cosmetic product, a pharmaceutical agent, a metal component, or an electronic component. After a packaging container is filled with the contents, the packaging container can be sealed by heat-sealing the opening of the packaging container.

In one embodiment, the packaging container is a packaging bag.

A small bag and a standing pouch are described below as specific examples of a packaging bag.

A small bag is a small packaging bag and is used to contain, for example, 1 g or more and 200 g or less of contents. The contents contained in a small bag is, for example, sauce, soy sauce, a dressing, ketchup, syrup, a cooking liquor, or another liquid or viscous seasoning; a liquid soup, a powdered soup, or a fruit juice; a spice; a liquid beverage, a jelly beverage, an instant food, or another food or drink; or a non-food, such as a chemical product, a cosmetic product, a pharmaceutical agent, a metal component, or an electronic component.

A standing pouch is used, for example, to contain 50 g or more and 2000 g or less of contents. The contents to be contained in a standing pouch are, for example, shampoo, rinse, conditioner, hand soap, body soap, an aromatic, a deodorant, a deodorizer, an insect repellent, or a detergent; a dressing, an edible oil, mayonnaise, or another liquid or viscous seasoning; a liquid beverage, a jelly beverage, an instant food, or another food or drink; a cream; a metal component, or an electronic component.

Figure 13:
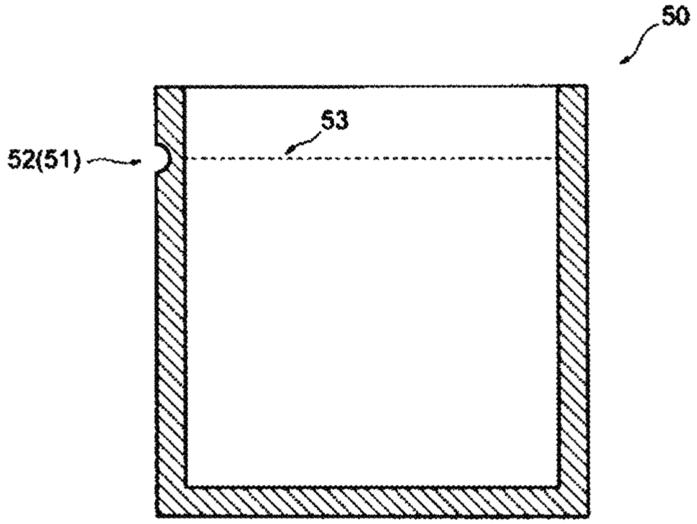
FIG. 13 is a front view of an embodiment of a packaging container.

FIG. 13 illustrates a packaging bag 50 produced by bonding two laminates. The hatched area indicates a heat-sealed portion. The packaging bag 50 may include an easy-open portion 51. The easy-open portion 51 is, for example, a notch portion 52 serving as a starting point for tearing or a half-cut line 53 formed by laser processing, with a cutter, or the like as a tear line.

Figure 14:
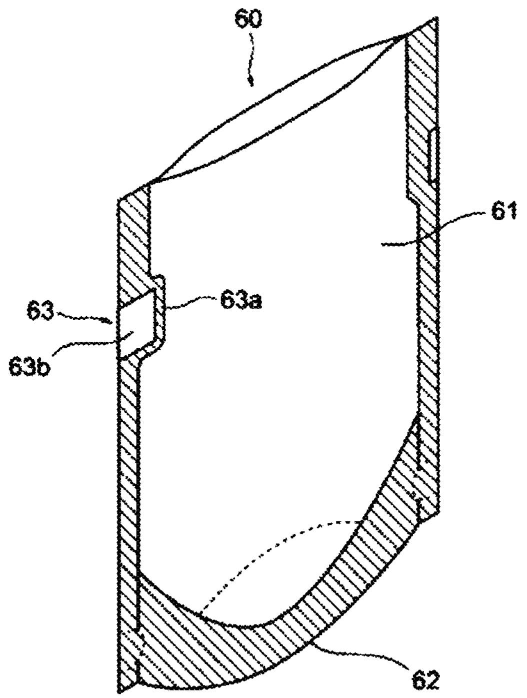
FIG. 14 is a perspective view of an embodiment of a packaging container.

FIG. 14 schematically illustrates an example of the structure of a standing pouch. The hatched area indicates a heat-sealed portion. In one embodiment, a standing pouch 60 includes a trunk (side sheet) 61 and a bottom portion (bottom sheet) 62. The side sheet 61 and the bottom sheet 62 may be composed of the same member or different members. The bottom sheet 62 can maintain the shape of the side sheet 61 and make the pouch free-standing, thus forming a pouch of standing type. A storage space for storing contents is formed in a region surrounded by the side sheet 61 and the bottom sheet 62.

The standing pouch 60 may have a venting mechanism 63. The venting mechanism 63 has a venting seal portion 63*a* protruding from a side seal portion toward the inside of the packaging container and an unsealed portion 63*b* separated from a content storage portion by the venting seal portion 63*a*. The unsealed portion 63*b* communicates with the outside of the packaging container.

In the standing pouch, only the trunk may be composed of a laminate according to the present disclosure, only the bottom portion may be composed of a laminate according to the present disclosure, or both the trunk and the bottom portion may be composed of a laminate according to the present disclosure.

In one embodiment, the side sheet can be formed by making a bag such that a sealant layer of a laminate according to the present disclosure is the innermost layer. In one embodiment, the side sheet can be formed by preparing two laminates according to the present disclosure, stacking these laminates with sealant layers facing each other, and heat-sealing side edge portions on both sides of the laminates to make a bag.

In another embodiment, the side sheet can be formed by preparing two laminates according to the present disclosure, stacking these laminates with sealant layers facing each other, inserting two laminates folded in a V shape with the sealant layers being on the outside between the laminates in the side edge portions on both sides of the stacked laminates, and heat-sealing the laminates. A standing pouch with a trunk having a side gusset can be produced in this way.

In one embodiment, the bottom sheet can be formed by inserting a laminate according to the present disclosure between lower portions of side sheets made into a bag and heat-sealing them. More specifically, the bottom sheet can be formed by inserting a laminate folded in a V shape with a sealant layer being on the outside between lower portions of side sheets made into a bag and heat-sealing them.

In one embodiment, the bottom portion is formed by preparing two of the laminates, stacking these laminates with sealant layers facing each other, folding another one of the laminate into a V shape with a sealant layer being on the outside, placing the laminate between the lower portions of the laminates facing each other, and heat-sealing them. Two sides adjacent to the bottom portion are then heat-sealed to form a trunk. Thus, a standing pouch according to one embodiment can be formed.

[Packaging Bag]

The packaging bags according to the fifth and sixth aspects of the present disclosure include the barrier laminate. In one embodiment, the barrier laminate maintains gas barrier properties even when subjected to high-temperature treatment and undergoes little deformation, and is therefore suitable as a microwavable packaging bag or as a pouch for a boiling or retort process. Thus, a packaging bag according to the present disclosure is suitable as a pouch for a boiling or retort process and is particularly suitable as a microwavable pouch for a boiling or retort process. The microwavable packaging bag means a packaging bag that can be heated with a microwave oven.

A pouch subjected to a retort process (hereinafter also referred to as a "retort pouch") is a packaging bag that is filled with contents, such as food and drink, is sealed, and is then subjected to heat sterilization (a retort process) with water or water vapor at a temperature of more than 100° C. under pressure. A pouch subjected to a boiling process (hereinafter also referred to as a "boiled pouch") is a packaging bag that is filled with contents, such as food and drink, is sealed, and is then subjected to a boiling process at a temperature of 100° C. or less.

In one embodiment, a packaging bag according to the present disclosure is a retort pouch. The retort process may be performed under various conditions, and the retort pouch includes any pouch subjected to a general retort process. For example, a retort process with a processing temperature of 105° C. or more and 115° C. or less may be referred to as a semi-retort process, a retort process with a processing temperature of more than 115° C. and 121° C. or less may be referred to as a retort process, and a retort process with a processing temperature of more than 121° C. and 135° C. or less may be referred to as a high retort process.

In one embodiment, a retort pouch according to the present disclosure preferably has an oxygen permeability of 2.0 cc/$m^2$/day/atm or less, more preferably 1.5 cc/$m^2$/day/atm or less, still more preferably 1.3 cc/$m^2$/day/atm or less, particularly preferably 1.0 cc/$m^2$/day/atm or less. The oxygen permeability is measured in an environment of 23° C. and a relative humidity of 90% RH in accordance with JIS K 7126-2: 2006. The lower limit of the oxygen permeability is preferably as low as possible and may be, for example, 0.1 cc/$m^2$/day/atm.

In one embodiment, a retort pouch according to the present disclosure preferably has a water vapor permeability of 2.0 g/$m^2$/day or less, more preferably 1.8 g/$m^2$/day or less, still more preferably 1.5 g/$m^2$/day or less, still more preferably 1.2 g/$m^2$/day or less. The water vapor permeability is measured in an environment of 40° C. and a relative humidity of 90% RH in accordance with JIS K 7129-2: 2019. The lower limit of the water vapor permeability is preferably as low as possible and may be, for example, 0.1 g/$m^2$/day.

In one embodiment, a packaging bag according to the present disclosure is a boiled pouch.

In one embodiment, a boiled pouch according to the present disclosure preferably has an oxygen permeability of 2.0 cc/$m^2$/day/atm or less, more preferably 1.5 cc/$m^2$/day/atm or less, still more preferably 1.0 cc/$m^2$/day/atm or less. The lower limit of the oxygen permeability is preferably as low as possible and may be, for example, 0.1 cc/$m^2$/day/atm.

In one embodiment, a boiled pouch according to the present disclosure preferably has a water vapor permeability of 2.0 g/$m^2$/day or less, more preferably 1.8 g/$m^2$/day or less, still more preferably 1.5 g/$m^2$/day or less, particularly preferably 1.0 g/$m^2$/day or less. The lower limit of the water vapor permeability is preferably as low as possible and may be, for example, 0.1 g/$m^2$/day.

The first aspect of the present disclosure relates to, for example, the following [1] to [18]:

[1] A barrier laminate including: a substrate; and a sealant layer in this order in a thickness direction, wherein the substrate is a barrier substrate including a polypropylene resin layer and an evaporated film, the polypropylene resin layer is a layer subjected to a stretching process, the evaporated film is composed of an inorganic oxide, the barrier laminate after heat treatment at 120° C. for 15 minutes has a thermal shrinkage ratio (MD1) of 2.00% or less in an MD direction and a thermal shrinkage ratio (TD1) of 2.00% or less in a TD direction.

[2] The barrier laminate according to [1], wherein the barrier laminate includes a first substrate, a second substrate, and a sealant layer in this order in the thickness direction, one of the first substrate and the second substrate is a barrier substrate, the other of the first substrate and the second substrate is a polypropylene resin substrate, and the polypropylene resin substrate is a substrate subjected to a stretching process.

[3] The barrier laminate according to [1] or [2], wherein a ratio (MD1/TD1) of a thermal shrinkage ratio (MD1) to a thermal shrinkage ratio (TD1) of the barrier laminate after heat treatment at 120° C. for 15 minutes is 0.30 or more and 3.00 or less.

[4] The barrier laminate according to any one of [1] to [3], wherein the barrier laminate after heat treatment at 150° C. for 5 minutes has a thermal shrinkage ratio (MD2) of 4.00% or less in the MD direction and a thermal shrinkage ratio (TD2) of 4.00% or less in the TD direction.

[5] The barrier laminate according to [4], wherein a ratio (MD2/TD2) of the thermal shrinkage ratio (MD2) to the thermal shrinkage ratio (TD2) of the barrier laminate after heat treatment at 150° C. for 5 minutes is 0.30 or more and 3.00 or less.

[6] The barrier laminate according to [2], wherein when the first substrate is a barrier substrate, the first substrate is disposed such that the evaporated film faces the sealant layer and the polypropylene resin layer faces the side opposite the sealant layer, and when the second substrate is a barrier substrate, the second substrate is disposed such that the evaporated film faces the first substrate and the polypropylene resin layer faces the sealant layer.

[7] The barrier laminate according to [2] or [6], wherein the first substrate is a polypropylene resin substrate, and the second substrate is a barrier substrate.

[8] The barrier laminate according to any one of [1] to [7], wherein the barrier substrate further includes a surface coating layer between the polypropylene resin layer and the evaporated film, and the surface coating layer contains a resin material with a polar group.

[9] The barrier laminate according to any one of [1] to [7], wherein the barrier substrate further includes a surface resin layer between the polypropylene resin layer and the evaporated film, and the surface resin layer contains a resin material with a melting point of 180° C. or more.

[10] The barrier laminate according to [9], wherein the polypropylene resin layer and the surface resin layer in the barrier substrate are a coextruded stretched resin film.

[11] The barrier laminate according to any one of [1] to [10], further including a barrier coating layer on the evaporated film.

[12] The barrier laminate according to any one of [1] to [11], wherein the sealant layer is a resin layer composed of polypropylene.

[13] The barrier laminate according to [2], [6], or [7], including a first adhesive layer between the first substrate and the second substrate, and a second adhesive layer between the second substrate and the sealant layer.

[14] The barrier laminate according to any one of [1] to [13], for use in a packaging container application.

[15] A packaging container including the barrier laminate according to any one of [1] to [14].

[16] The packaging container according to [15], which is a boiled or retort pouch.

[17] A lid material including the barrier laminate according to any one of [1] to [14].

[18] A packaging container including: a container main body with a storage portion; and the lid material according to [17] bonded to the container main body to seal the storage portion.

The second aspect of the present disclosure relates to, for example, the following [1] to [18]:

[1] A barrier laminate including: a first substrate; a second substrate; and a sealant layer in this order in a thickness direction, wherein one of the first substrate and the second substrate is a barrier substrate including a polypropylene resin layer and an evaporated film, the other of the first substrate and the second substrate is a polypropylene resin substrate, the polypropylene resin layer is a layer subjected to a stretching process, the evaporated film is composed of an inorganic oxide, and the polypropylene resin substrate is a substrate subjected to a stretching process.

[2] The barrier laminate according to [1], wherein when the first substrate is a barrier substrate, the first substrate is disposed such that the evaporated film faces the sealant layer and the polypropylene resin layer faces the side opposite the sealant layer, and when the second substrate is a barrier substrate, the second substrate is disposed such that the evaporated film faces the first substrate and the polypropylene resin layer faces the sealant layer.

[3] The barrier laminate according to [1] or [2], wherein the first substrate is a polypropylene resin substrate, and the second substrate is a barrier substrate.

[4] The barrier laminate according to any one of [1] to [3], wherein the barrier substrate further includes a surface coating layer between the polypropylene resin layer and the evaporated film, and the surface coating layer contains a resin material with a polar group.

[5] The barrier laminate according to any one of [1] to [3], wherein the barrier substrate further includes a surface resin layer between the polypropylene resin layer and the evaporated film, and the surface resin layer contains a resin material with a melting point of 180° C. or more.

[6] The barrier laminate according to [5], wherein the polypropylene resin layer and the surface resin layer in the barrier substrate are a coextruded stretched resin film.

[7] The barrier laminate according to any one of [1] to [6], further including a barrier coating layer on the evaporated film.

[8] The barrier laminate according to any one of [1] to [7], wherein the sealant layer is a resin layer composed of polypropylene.

[9] The barrier laminate according to any one of [1] to [8], including a first adhesive layer between the first substrate and the second substrate, and a second adhesive layer between the second substrate and the sealant layer.

[10] The barrier laminate according to any one of [1] to [9], wherein the barrier laminate after heat treatment at 120° C. for 15 minutes has a thermal shrinkage ratio (MD1) of 2.00% or less in an MD direction and a thermal shrinkage ratio (TD1) of 2.00% or less in a TD direction.

[11] The barrier laminate according to [10], wherein a ratio (MD1/TD1) of the thermal shrinkage ratio (MD1) to the thermal shrinkage ratio (TD1) of the barrier laminate after heat treatment at 120° C. for 15 minutes is 0.30 or more and 3.00 or less.

[12] The barrier laminate according to any one of [1] to [11], wherein the barrier laminate after heat treatment at 150° C. for 5 minutes has a thermal shrinkage ratio (MD2) of 4.00% or less in an MD direction and a thermal shrinkage ratio (TD2) of 4.00% or less in a TD direction.

[13] The barrier laminate according to [12], wherein a ratio (MD2/TD2) of the thermal shrinkage ratio (MD2) to the thermal shrinkage ratio (TD2) of the barrier laminate after heat treatment at 150° C. for 5 minutes is 0.30 or more and 3.00 or less.

[14] The barrier laminate according to any one of [1] to [13], for use in a packaging container application.

[15] A packaging container including the barrier laminate according to any one of [1] to [14].

[16] The packaging container according to [15], which is a boiled or retort pouch.

[17] A lid material including the barrier laminate according to any one of [1] to [14].

[18] A packaging container including: a container main body with a storage portion; and the lid material according to [17] bonded to the container main body to seal the storage portion.

The third aspect of the present disclosure relates to, for example, the following [1] to [19]:

[1] A barrier laminate including: a substrate; an adhesive layer; and a sealant layer in this order in a thickness direction, wherein the substrate is a barrier substrate including a polyolefin resin layer and an evaporated film, the polyolefin resin layer is a layer subjected to a stretching process, the evaporated film is composed of an inorganic oxide, and the adhesive layer is a layer with a thickness of 2 μm or less.

[2] A barrier laminate including: a first substrate; a first adhesive layer; a second substrate; a second adhesive layer; and a sealant layer in this order in a thickness direction, wherein one of the first substrate and the second substrate is a barrier substrate including a polyolefin resin layer and an evaporated film, the other of the first substrate and the second substrate is a polyolefin resin substrate, the polyolefin resin layer is a layer subjected to a stretching process, the evaporated film is composed of an inorganic oxide, the polyolefin resin substrate is a substrate subjected to a stretching process, and each of the first adhesive layer and the second adhesive layer is a layer with a thickness of 2 μm or less.

[3] The barrier laminate according to [1] or [2], wherein a test specimen composed of 16 of the barrier laminates stacked has a tear strength of 3.5 N or less in a TD direction as measured in accordance with JISK7128-2: 1998 (an Elmendorf tear method).

[4] The barrier laminate according to any one of [1] to [3], wherein a ratio ($strength_{TD}/strength_{MD}$) of tear strength in a TD direction to tear strength in a MD direction of a test specimen composed of 16 of the barrier laminates stacked is 5.0 or less as measured in accordance with JISK7128-2: 1998 (an Elmendorf tear method).

[5] The barrier laminate according to any one of [1] to [4], which is an adhesive layer or a layer formed of a solvent-free adhesive agent.

[6] The barrier laminate according to [5], wherein the solvent-free adhesive agent is a two-component curing adhesive agent including a main agent and a curing agent, and a polymer component contained in the main agent has a weight-average molecular weight (Mw) of 800 or more and 10,000 or less.

[7] The barrier laminate according to [5] or [6], wherein the solvent-free adhesive agent is a two-component curing adhesive agent including a main agent and a curing agent, and a polymer component contained in the main agent has a polydispersity (Mw/Mn) of 2.8 or less.

[8] The barrier laminate according to [2], wherein when the first substrate is a barrier substrate, the first substrate is disposed such that the evaporated film faces the sealant layer and the polyolefin resin layer faces the side opposite the sealant layer, and when the second substrate is a barrier substrate, the second substrate is disposed such that the evaporated film faces the first substrate and the polyolefin resin layer faces the sealant layer.

[9] The barrier laminate according to [2] or [8], wherein the first substrate is a polyolefin resin substrate, and the second substrate is a barrier substrate.

[10] The barrier laminate according to any one of [1] to [9], wherein the barrier substrate further includes a surface coating layer between the polyolefin resin layer and the evaporated film, and the surface coating layer contains a resin material with a polar group.

[11] The barrier laminate according to any one of [1] to [9], wherein the barrier substrate further includes a surface resin layer between the polyolefin resin layer and the evaporated film, and the surface resin layer contains a resin material with a melting point of 180° C. or more.

[12] The barrier laminate according to [11], wherein the polyolefin resin layer and the surface resin layer in the barrier substrate are a coextruded stretched resin film.

[13] The barrier laminate according to any one of [1] to [12], further including a barrier coating layer on the evaporated film.

[14] The barrier laminate according to any one of [1] to [13], wherein the sealant layer is a resin layer composed of a polyolefin.

[15] The barrier laminate according to any one of [1] to [14], for use in a packaging container application.

[16] A packaging container including the barrier laminate according to any one of [1] to [15].

[17] The packaging container according to [16], which is a boiled or retort pouch.

[18] A lid material including the barrier laminate according to any one of [1] to [15].

[19] A packaging container including: a container main body with a storage portion; and the lid material according to [18] bonded to the container main body to seal the storage portion.

The fourth aspect of the present disclosure relates to, for example, the following [1] to [17]: [1] A barrier laminate including: a substrate; an adhesive layer; and a sealant layer in this order in a thickness direction, wherein the substrate is a barrier substrate including a polypropylene resin layer and an evaporated film, the polypropylene resin layer is a layer subjected to a stretching process, the evaporated film is composed of an inorganic oxide, the adhesive layer is a layer with a thickness of 2 μm or less, and an amount of residual solvent in the barrier laminate is 10 $mg/m^2$ or less.

[2] A barrier laminate including: a first substrate; a first adhesive layer; a second substrate; a second adhesive layer; and a sealant layer in this order in a thickness direction, wherein one of the first substrate and the second substrate is a barrier substrate including a polypropylene resin layer and an evaporated film, the other of the first substrate and the second substrate is a polypropylene resin substrate, the polypropylene resin layer is a layer subjected to a stretching process, the evaporated film is composed of an inorganic oxide, the polypropylene resin substrate is a substrate subjected to a stretching process, each of the first adhesive layer and the second adhesive layer is a layer with a thickness of 2 μm or less, and an amount of residual solvent in the barrier laminate is 10 $mg/m^2$ or less.

[3] The barrier laminate according to [1] or [2], wherein the adhesive layer is a layer formed of a solvent-free adhesive agent.

[4] The barrier laminate according to [3], wherein the solvent-free adhesive agent is a two-component curing adhesive agent including a main agent and a curing agent, and a polymer component contained in the main agent has a weight-average molecular weight (Mw) of 800 or more and 10,000 or less.

[5] The barrier laminate according to [3] or [4], wherein the solvent-free adhesive agent is a two-component curing adhesive agent including a main agent and a curing agent, and a polymer component contained in the main agent has a polydispersity (Mw/Mn) of 2.8 or less.

[6] The barrier laminate according to [2], wherein when the first substrate is a barrier substrate, the first substrate is disposed such that the evaporated film faces the sealant layer and the polypropylene resin layer faces the side opposite the sealant layer, and when the second substrate is a barrier substrate, the second substrate is disposed such that the evaporated film faces the first substrate and the polypropylene resin layer faces the sealant layer.

[7] The barrier laminate according to [2] or [6], wherein the first substrate is a polypropylene resin substrate, and the second substrate is a barrier substrate.

[8] The barrier laminate according to any one of [1] to [7], wherein the barrier substrate further includes a surface coating layer between the polypropylene resin layer and the evaporated film, and the surface coating layer contains a resin material with a polar group.

[9] The barrier laminate according to any one of [1] to [7], wherein the barrier substrate further includes a surface resin layer between the polypropylene resin layer and the evaporated film, and the surface resin layer contains a resin material with a melting point of 180° C. or more.

[10] The barrier laminate according to [9], wherein the polypropylene resin layer and the surface resin layer in the barrier substrate are a coextruded stretched resin film.

[11] The barrier laminate according to any one of [1] to [10], further including a barrier coating layer on the evaporated film.

[12] The barrier laminate according to any one of [1] to [11], wherein the sealant layer is a resin layer composed of polypropylene.

[13] The barrier laminate according to any one of [1] to [12], for use in a packaging container application.

[14] A packaging container including the barrier laminate according to any one of [1] to [13].

[15] The packaging container according to [14], which is a boiled or retort pouch.

[16] A lid material including the barrier laminate according to any one of [1] to [13].

[17] A packaging container including: a container main body with a storage portion; and the lid material according to [16] bonded to the container main body to seal the storage portion.

The fifth and sixth aspects of the present disclosure relates to, for example, the following [1] to [16]:

[1] A packaging bag including: a barrier laminate including a first substrate, a first adhesive layer, a second substrate, a second adhesive layer, and a sealant layer in this order in a thickness direction, wherein the first substrate is a polypropylene resin substrate subjected to a stretching process, the second substrate is a barrier substrate including a polypropylene resin layer subjected to a stretching process and an evaporated film composed of an inorganic oxide, the second substrate is disposed such that the evaporated film faces the first substrate and the polypropylene resin layer faces the sealant layer, the sealant layer is a polypropylene resin layer, the first adhesive layer has a thickness of 10 μm or less, and the second adhesive layer has a thickness of 10 μm or less.

[2] The packaging bag according to [1], wherein the barrier substrate further includes a surface coating layer between the polypropylene resin layer and the evaporated film, and the surface coating layer contains a resin material with a polar group.

[3] The packaging bag according to [1], wherein the barrier substrate further includes a surface resin layer between the polypropylene resin layer and the evaporated film, and the surface resin layer contains a resin material with a melting point of 180° C. or more.

[4] The packaging bag according to [3], wherein the polypropylene resin layer and the surface resin layer in the barrier substrate are a coextruded stretched resin film.

[5] The packaging bag according to any one of [1] to [4], wherein the barrier substrate further includes a barrier coating layer on the evaporated film.

[6] The packaging bag according to any one of [1] to [5], wherein each of the first adhesive layer and the second adhesive layer is a layer formed of a solvent-based adhesive agent.

[7] The packaging bag according to any one of [1] to [6], wherein a polypropylene content is 80% by mass or more of the total amount of resin material contained in the barrier laminate.

[8] The packaging bag according to any one of [1] to [5], wherein the first adhesive layer has a thickness of 2 μm or less, and the second adhesive layer has a thickness of 2 μm or less.

[9] The packaging bag according to [8], wherein each of the first adhesive layer and the second adhesive layer is a layer formed of a solvent-free adhesive agent.

[10] The packaging bag according to [8] or [9], wherein a polypropylene content is 90% by mass or more of the total amount of resin material contained in the barrier laminate.

[11] The packaging bag according to any one of [1] to [10], which is a standing pouch type packaging bag or a four-sided seal type packaging bag.

[12] The packaging bag according to any one of [1] to [11], which is a pouch subjected to a boiling or retort process.

[13] The packaging bag according to [12], wherein the packaging bag is a pouch subjected to a retort process and has an oxygen permeability of 2.0 cc/m$^2$/day/atm or less as measured in an environment of 23° C. and a relative humidity of 90% RH in accordance with JIS K 7126-2: 2006.

[14] The packaging bag according to [13], which has a water vapor permeability of 2.0 g/m$^2$/day or less as measured in an environment of 40° C. and a relative humidity of 90% RH in accordance with JIS K 7129-2: 2019.

[15] The packaging bag according to any one of [1] to [14], wherein the packaging bag has a heat seal portion, and the heat seal portion has a heat-seal strength of 23 N/15 mm or more as measured under conditions of a rate of 300 mm/min and T-type peeling.

[16] The packaging bag according to any one of [1] to [15], which is a microwavable packaging bag.

The seventh aspect of the present disclosure relates to, for example, the following [1] to [17]:

[1] A laminate for a packaging material including: a substrate; and a sealant layer, wherein the substrate includes a polypropylene resin layer subjected to a stretching process, the sealant layer contains a propylene-ethylene block copolymer as a main component, a thermoplastic elastomer, and polyethylene, the sealant layer has a melting peak temperature observed in the range of 100° C. or more and less than 120° C.

[2] The laminate for a packaging material according to [1], wherein the sealant layer further has a melting peak temperature observed in the range of 120° C. or more and less than 135° C. and/or a melting peak temperature observed in the range of 160° C. or more.

[3] The laminate for a packaging material according to [1] or [2], wherein the sealant layer has, on a mass basis, a higher polyethylene content than the thermoplastic elastomer content and a higher propylene-ethylene block copolymer content than the polyethylene content.

[4] The laminate for a packaging material according to any one of [1] to [3], wherein the polyethylene is a linear low-density polyethylene with a density of 925 kg/m$^3$ or less.

[5] The laminate for a packaging material according to any one of [1] to [4], wherein the substrate is a barrier substrate including a polypropylene resin layer and an evaporated film, and the evaporated film is composed of an inorganic oxide.

[6] The laminate for a packaging material according to [5], wherein the barrier substrate further includes a surface coating layer between the polypropylene resin layer and the evaporated film, and the surface coating layer contains a resin material with a polar group.

[7] The laminate for a packaging material according to [5], wherein the barrier substrate further includes a surface resin layer between the polypropylene resin layer and the evaporated film, and the surface resin layer contains a resin material with a melting point of 180° C. or more.

[8] The laminate for a packaging material according to [7], wherein the polypropylene resin layer and the surface resin layer in the barrier substrate constitute a coextruded stretched resin film.

[9] The laminate for a packaging material according to any one of [5] to [8], further including a barrier coating layer on the evaporated film.

[10] The laminate for a packaging material according to any one of [5] to [9], wherein the laminate includes a first substrate, a second substrate, and the sealant layer in this order in a thickness direction, and the first substrate and the second substrate are each independently a barrier substrate or a polypropylene resin substrate subjected to a stretching process.

[11] The laminate for a packaging material according to [10], wherein the first substrate is a polypropylene resin substrate, and the second substrate is a barrier substrate.

[12] The laminate for a packaging material according to [10] or [11], including a first adhesive layer between the first substrate and the second substrate, and a second adhesive layer between the second substrate and the sealant layer.

[13] The laminate for a packaging material according to any one of [1] to [12], which has a polypropylene single material content of 80% by mass or more.

[14] A packaging container including the laminate for a packaging material according to any one of [1] to [13].

[15] The packaging container according to [14], which is a boiled or retort pouch.

[16] A lid material including the laminate for a packaging material according to any one of [1] to [13].

[17] A packaging container including: a container main body with a storage portion; and the lid material according to [16] bonded to the container main body to seal the storage portion.

The eighth aspect of the present disclosure relates to, for example, the following [1] to [18]:

[1] A laminate for a packaging material including: a first substrate; and a sealant layer, wherein the first substrate includes a stretched resin layer containing polypropylene as a main component, the sealant layer is a resin layer containing polypropylene as a main component, the polypropylene contained in the stretched resin layer has an extrapolated initial melting temperature (Tim) at first heating obtained by differential scanning calorimetry (DSC) according to JIS K 7121: 2012 higher than Tim of the polypropylene contained in the sealant layer at the first heating obtained by the DSC, and when the laminate is heat-sealed under heat-sealing conditions of a pressure of 0.1 MPa and a time of 1 second, a heat-sealing temperature range in which seal strength by T-type peeling at a test speed of 300 mm/min is 23 N/15 mm or more and the laminate has a shrinkage ratio of 0% or more and 1.0% or less in a TD direction is 5° C. or more in the range of 130° C. or more and 190° C. or less.

[2] The laminate for a packaging material according to [1], wherein a difference between Tim of the polypropylene contained in the stretched resin layer in the first substrate at the first heating obtained by DSC and Tim of the polypropylene contained in the sealant layer at the first heating obtained by DSC is 20° C. or more.

[3] The laminate for a packaging material according to [1] or [2], wherein a difference between Tim of the polypropylene contained in the stretched resin layer in the first substrate at second heating obtained by DSC and Tim of the polypropylene contained in the sealant layer at the second heating obtained by DSC is 10° C. or more.

[4] The laminate for a packaging material according to any one of [1] to [3], wherein the polypropylene contained in the sealant layer has a Tim of 145° C. or less at the first heating obtained by DSC.

[5] The laminate for a packaging material according to any one of [1] to [4], wherein the polypropylene contained in the sealant layer has a Tim of 150° C. or less at second heating obtained by DSC.

[6] The laminate for a packaging material according to any one of [1] to [5], wherein the first substrate is a barrier substrate including a stretched resin layer and an evaporated film composed of an inorganic oxide, or a polypropylene resin substrate composed of a stretched resin layer.

[7] The laminate for a packaging material according to any one of [1] to [6], wherein the laminate further includes a second substrate including a stretched resin layer containing polypropylene as a main component between the first substrate and the sealant layer, and the second substrate is a barrier substrate including a stretched resin layer and an evaporated film composed of an inorganic oxide, or a polypropylene resin substrate composed of a stretched resin layer.

[8] The laminate for a packaging material according to [6] or [7], wherein the barrier substrate further includes a surface coating layer between the stretched resin layer and the evaporated film, and the surface coating layer contains a resin material with a polar group.

[9] The laminate for a packaging material according to [6] or [7], wherein the barrier substrate further includes a surface resin layer between the stretched resin layer and the evaporated film, and the surface resin layer contains a resin material with a melting point of 180° C. or more.

[10] The laminate for a packaging material according to [9], wherein the stretched resin layer and the surface resin layer in the barrier substrate constitute a coextruded stretched resin film.

[11] The laminate for a packaging material according to any one of [6] to [10], further including a barrier coating layer on the evaporated film.

[12] The laminate for a packaging material according to [7], wherein the first substrate is a polypropylene resin substrate composed of a stretched resin layer, and the second substrate is a barrier substrate.

[13] The laminate for a packaging material according to [7] or [12], including a first adhesive layer between the first substrate and the second substrate, and a second adhesive layer between the second substrate and the sealant layer.

[14] The laminate for a packaging material according to any one of [1] to [13], which has a polypropylene single material content of 80% by mass or more.

[15] A packaging container including the laminate for a packaging material according to any one of [1] to [14].

[16] The packaging container according to [15], which is a boiled or retort pouch.

[17] A lid material including the laminate for a packaging material according to any one of [1] to [14].

[18] A packaging container including: a container main body with a storage portion; and the lid material according to [17] bonded to the container main body to seal the storage portion.

EXAMPLES

Evaluation methods in Examples are described below.

[Evaluation of Gas Barrier Properties]

A barrier laminate produced as described below was cut out to prepare a test specimen. The oxygen permeability (cc/m$^2$/day/atm) and water vapor permeability (g/m$^2$/day) of the test specimen were measured by the following method.

While oxygen was supplied to the first substrate side of the test specimen, the oxygen permeability was measured with an oxygen permeability measuring apparatus (OX-TRAN 2/20 manufactured by MOCON) in accordance with JISK7126-2: 2006 in an environment of 23° C. and a relative humidity of 90% RH.

While water vapor was supplied to the first substrate side of the test specimen, the water vapor permeability was measured with a water vapor permeability measuring apparatus (PERMATRAN-w 3/33 manufactured by MOCON) in accordance with JIS K 7129-2: 2019 in an environment of 40° C. and a relative humidity of 90% RH.

[Evaluation of Gas Barrier Properties (after Boiling Process or after Retort Process)]

A barrier laminate produced as described below was used to produce a flat packaging bag. The flat packaging bag had a B5 size (182 mm×257 mm). The flat packaging bag was filled with 150 mL of water.

<Boiling Process>

The flat packaging bag was boiled in hot water at 95° C. for 30 minutes. A barrier laminate was cut out from the flat packaging bag to prepare a test specimen. The oxygen permeability and water vapor permeability of the test specimen were measured as described above.

<Retort Process>

The flat packaging bag was subjected to a retort process in hot water at 121° C. for 30 minutes. A barrier laminate was cut out from the flat packaging bag to prepare a test specimen. The oxygen permeability and water vapor permeability of the test specimen were measured as described above. In examples of the fifth and sixth aspects, the retort process was also performed at 135° C.

[Evaluation of Gas Barrier Properties (after Gelbo Flex Test)]

Two barrier laminates produced as described below were used to produce a four-sided bag. The bag had an A4 size (210 mm×297 mm). The bag was subjected 10 times to a Gelbo Flex test (stroke: 80 mm, bending: 400 degrees) according to ASTM F392. A barrier laminate was then cut out from the bag to prepare a test specimen. The oxygen permeability and water vapor permeability of the test specimen were measured as described above.

[Evaluation of Gas Barrier Properties (after Boiling or Retort Process and Gelbo Flex Test)]

Two barrier laminates produced as described below were used to produce a four-sided bag. The bag had an A4 size (210 mm×297 mm). The bag was filled with 400 mL of water. The four-sided bag was subjected to a boiling process or a retort process under the above conditions. The four-sided bag was drained and was subjected 10 times to the Gelbo Flex test (stroke: 80 mm, bending: 400 degrees) according to ASTM F392. A barrier laminate was then cut out from the bag to prepare a test specimen. The oxygen permeability and water vapor permeability of the test specimen were measured as described above.

[Measurement of Thermal Shrinkage Ratio]

A barrier laminate produced as described below was cut out to prepare a 10 cm×10 cm test specimen. The test specimen was heated in an oven at 120° C. for 15 minutes or at 150° C. for 5 minutes. The length of the test specimen was measured with a glass scale in the MD direction and the TD direction before and after heating in the oven. The thermal shrinkage ratio (MD) in the MD direction and the thermal shrinkage ratio (TD) in the TD direction were calculated using the following formulae. Table 1 lists the average value of the thermal shrinkage ratios of two test specimens.

Thermal shrinkage ratio (*MD*) (%)=(length of laminate before heat treatment in *MD* direction−length of laminate after heat treatment in *MD* direction)/length of laminate before heat treatment in *MD* direction×100

Thermal shrinkage ratio (*TD*) (%)=(length of laminate before heat treatment in *TD* direction−length of laminate after heat treatment in *TD* direction)/length of laminate before heat treatment in *TD* direction×100

[Amount of Residual Solvent]

A barrier laminate produced as described below was cut out to prepare a 10 cm square sample. The amount of residual solvent of the sample was measured by a calibration curve method using a gas chromatograph GC-2014 manufactured by Shimadzu Corporation.

[Seal Strength]

Two barrier laminates produced as described below were prepared, were cut into a size of 100 mm×100 mm, were stacked with the surfaces on the unstretched polypropylene film side facing each other, and were heat-sealed. The sealing conditions were a sealing width of 10 mm, a sealing temperature of 175° C. (one side heating), a sealing pressure of 0.098 MPa, and a sealing time of 1 second. The sealed sample was cut into a width of 15 mm to prepare a test specimen with a length of 100 mm (including a seal width of 10 mm) and a width of 15 mm. The test specimen was subjected to a tensile test using a tensile tester (Tensilon universal testing machine RTC-1530 manufactured by Orientec Co., Ltd.) in an environment of 23° C. and 50% RH. In the tensile test, the test specimen was opened by 180 degrees around the heat seal portion, both ends of the test specimen were attached to the tensile tester, and the seal strength (N/15 mm) was measured by T-type peeling at a rate of 300 mm/min.

[Tear Strength]

A sample was prepared by stacking 16 barrier laminates produced as described below such that the front and back sides were alternately arranged and the MD direction and the TD direction of the films constituting the barrier laminates were aligned. The tear strength of the sample in the MD direction and the TD direction was measured in accordance with JIS K 7128-2: 1998 (an Elmendorf tear method) using a No. 163 Elmendorf tear tester manufactured by Toyo Seiki Seisaku-Sho, Ltd.

[Production of Barrier Substrate]

A (meth)acrylic resin with a hydroxy group (number-average molecular weight: 25,000, glass transition temperature: 99° C., hydroxyl value: 80 mg KOH/g) was diluted with a mixed solvent of methyl ethyl ketone and ethyl acetate (mixing ratio: 1:1) to a solid concentration of 10% by mass to prepare a main agent.

An ethyl acetate solution containing tolylene diisocyanate (solid content: 75% by mass) was added to the main agent as a curing agent to prepare a solution for forming a surface coating layer. The amount of the curing agent used was 10 parts by mass per 100 parts by mass of the main agent.

A biaxially stretched polypropylene film with a corona-treated surface and with a thickness of 20 μm (ME-1 manufactured by Mitsui Chemicals Tohcello, Inc.) was prepared. The solution for forming a surface coating layer was applied to the corona-treated surface of the film and was dried to form a surface coating layer with a thickness of 0.5 μm. Thus, a resin substrate was produced.

A carbon-containing silicon oxide (silica) evaporated film with a thickness of 12 nm was formed on the surface coating layer of the resin substrate using a low-temperature plasma chemical vapor deposition apparatus as a real apparatus (a CVD method) while applying tension to the resin substrate by roll-to-roll. The evaporated film formation conditions are described below.

(Formation Conditions)

Hexamethyldisiloxane:oxygen gas:helium=1:10:10 (unit: slm)

Electricity supplied to cooling/electrode drum: 22 kW

Line speed: 100 m/min

The carbon content C, the silicon content Si, and the oxygen content O of the carbon-containing silicon oxide evaporated film were measured. The carbon content C, the silicon content Si, and the oxygen content O were 32.7%, 29.8%, and 37.5%, respectively, of the total (100%) of three elements of silicon, oxygen, and carbon. Each element content was measured by X-ray photoelectron spectroscopy (XPS) and narrow scan analysis under the measurement conditions described above.

385 g of water, 67 g of isopropyl alcohol, and 9.1 g of 0.5 N hydrochloric acid were mixed to prepare a solution with a pH of 2.2. The solution was mixed with 175 g of tetraethoxysilane as a metal alkoxide and 9.2 g of glycidoxypropyltrimethoxysilane as a silane coupling agent while cooling to 10° C. to prepare a solution A.

14.7 g of poly(vinyl alcohol) with a degree of saponification of 99% or more and a degree of polymerization of 2400 as a water-soluble polymer, 324 g of water, and 17 g of isopropyl alcohol were mixed to prepare a solution B.

The solution A and the solution B were mixed at 6.5:3.5 based on mass to prepare a barrier coating agent. The barrier coating agent was applied by a spin coating method to the evaporated film formed on the resin substrate and was heat-treated in an oven at 80° C. for 60 seconds to form a barrier coating layer with a thickness of 300 nm.

Thus, a transparent barrier substrate was produced.

[First to Fourth Aspects]

The first to fourth aspects are more specifically described below.

Example 1A

A surface of the biaxially stretched polypropylene film in the transparent barrier substrate was subjected to corona treatment to have a wetting tension of 38 dyn or more. The biaxially stretched polypropylene film with a thickness of 20 μm (P2171 manufactured by Toyobo Co., Ltd.) as a first substrate, the transparent barrier substrate subjected to the corona treatment as a second substrate, and an unstretched polypropylene film with a thickness of 60 μm (ZK207 manufactured by Toray Advanced Film Co., Ltd.) as a sealant layer were dry-laminated via a solvent-based polyester urethane adhesive agent (RU-004/H-1 (blend ratio:

7.5/1) manufactured by Rock Paint Co., Ltd.) and were allowed to stand at 40° C. for 72 hours to produce a barrier laminate. An adhesive layer formed of the solvent-based polyester urethane adhesive agent had a thickness of 4 μm. The barrier laminate had a polypropylene content of 89% by mass. A polymer component contained in the main agent in the solvent-based polyester urethane adhesive agent had a weight-average molecular weight (Mw) in the range of 29,000 to 30,000 and a polydispersity (Mw/Mn) in the range of 2.9 to 3.75.

The barrier laminate was cut out to prepare a 10 cm square sample. The amount of residual solvent of the sample was measured by a calibration curve method using a gas chromatograph GC-2014 manufactured by Shimadzu Corporation. The amount of residual solvent was 20 mg/m$^2$.

A sample was prepared by stacking 16 of the barrier laminates such that the front and back sides were alternately arranged and the MD direction and the TD direction of the films constituting the barrier laminates were aligned. The tear strength of the sample in the MD direction and the TD direction was measured in accordance with JIS K 7128-2: 1998 (an Elmendorf tear method) using a No. 163 Elmendorf tear tester manufactured by Toyo Seiki Seisaku-Sho, Ltd. As a result, the tear strength in the MD direction was 0.7 N/16 laminates, the tear strength in the TD direction was 4.1 N/16 laminates, and the tear strength ratio (strength$_{TD}$/strength$_{MD}$) was 5.9.

Example 1Aa

A surface of the biaxially stretched polypropylene film in the transparent barrier substrate was subjected to corona treatment to have a wetting tension of 38 dyn or more. The biaxially stretched polypropylene film with a thickness of 20 μm (P2171 manufactured by Toyobo Co., Ltd.) as a first substrate, the transparent barrier substrate subjected to the corona treatment as a second substrate, and an unstretched polypropylene film with a thickness of 60 μm (ZK207 manufactured by Toray Advanced Film Co., Ltd.) as a sealant layer were subjected to non-solvent lamination via a solvent-free polyester urethane adhesive agent (RN-920/HN-920 (blend ratio: 1/1) manufactured by Rock Paint Co., Ltd.) and were allowed to stand at 40° C. for 72 hours to produce a barrier laminate. An adhesive layer formed of the solvent-free polyester urethane adhesive agent had a thickness of 1 μm. The barrier laminate had a polypropylene content of 95% by mass. A polymer component contained in the main agent in the solvent-free polyester urethane adhesive agent had a weight-average molecular weight (Mw) in the range of 2,000 to 2,500 and a polydispersity (Mw/Mn) in the range of 2.0 to 2.5.

The amount of residual solvent in the barrier laminate was 0.7 mg/m$^2$.

A sample was prepared by stacking 16 of the barrier laminates such that the front and back sides were alternately arranged and the MD direction and the TD direction of the films constituting the barrier laminates were aligned. The sample had a tear strength of 0.6 N/16 laminates in the MD direction, a tear strength of 1.7 N/16 laminates in the TD direction, and a tear strength ratio (strength$_{TD}$/strength$_{MD}$) of 2.8.

Example 2A

The transparent barrier substrate as a first substrate, a biaxially stretched polypropylene film with a thickness of 20 μm (P2271 manufactured by Toyobo Co., Ltd.) as a second substrate, and an unstretched polypropylene film with a thickness of 60 μm (ZK207 manufactured by Toray Advanced Film Co., Ltd.) as a sealant layer were dry-laminated via the solvent-based polyester urethane adhesive agent (RU-004/H-1 (blend ratio: 7.5/1) manufactured by Rock Paint Co., Ltd.) and were allowed to stand at 40° C. for 72 hours to produce a barrier laminate. An adhesive layer formed of the solvent-based polyester urethane adhesive agent had a thickness of 4 μm. The barrier laminate had a polypropylene content of 89% by mass.

TABLE 1

| | Example 1A | | Example 1 A a |
|---|---|---|---|
| First substrate | Biaxially stretched PP film | Thickness 20 μm | Biaxially stretched PP film |
| First adhesive layer | Polyester urethane adhesive agent (solvent-based type) | Thickness 4 μm | Polyester urethane adhesive agent (solvent-free type) |
| Second substrate | Barrier coating layer | Thickness 300 nm | Barrier coating layer |
| | Carbon-containing silicon oxide evaporated film | Thickness 12 nm | Carbon-containing silicon oxide evaporated film |
| | Surface coating layer | Thickness 0.5 μm | Surface coating layer |
| | Biaxially stretched PP film | Thickness 20 μm | Biaxially stretched PP film |
| Second adhesive layer | Polyester urethane adhesive agent (solvent-based type) | Thickness 4 μm | Polyester urethane adhesive agent (solvent-free type) |
| Sealant layer | Unstretched PP film | Thickness 60 μm | Unstretched PP film |
| | Oxygen permeability [cc/m2 · day · atm] (23° C., 90% RH) | Water vapor permeability [g/m2 · day] (40° C., 90% RH) | Oxygen permeability [cc/m2 · day · atm] (23° C., 90% RH) |
| Untreated | 0.45 | 0.45 | 0.45 |
| After boiling process | 0.65 | 0.55 | 0.65 |
| After retort process | 1.21 | 0.95 | 0.95 |
| Untreated, after Gelbo test | 1.13 | 0.61 | 1.50 |
| After boiling process, after Gelbo test | 1.22 | 0.69 | 2.00 |
| After retort process, after Gelbo test | 2.80 | 1.15 | 2.80 |

TABLE 1-continued

| | | | |
|---|---|---|---|
| Heating conditions 120° C. × 15 minutes | | | |
| Thermal shrinkage ratio % (MD direction) | 0.57 | | 0.77 |
| Thermal shrinkage ratio % (TD direction) | 1.20 | | 1.24 |
| Ratio of thermal shrinkage ratios (MD/TD) | 0.47 | | 0.62 |
| Heating conditions 150° C. × 5 minutes | | | |
| Thermal shrinkage ratio % (MD direction) | 2.88 | | 2.96 |
| Thermal shrinkage ratio % (TD direction) | 2.05 | | 2.72 |
| Ratio of thermal shrinkage ratios (MD/TD) | 1.41 | | 1.09 |
| | Example 1 A a | Example 2 A | |
| First substrate | Thickness 20 μm | Biaxially stretched PP film | Thickness 20 μm |
| | | Surface coating layer | Thickness 0.5 μm |
| | | Carbon-containing silicon oxide evaporated film | Thickness 12 nm |
| | | Barrier coating layer | Thickness 300 nm |
| First adhesive layer | Thickness 1 μm | Polyester urethane adhesive agent (solvent-based type) | Thickness 4 μm |
| Second substrate | Thickness 300 nm<br>Thickness 12 nm<br>Thickness 0.5 μm<br>Thickness 20 μm | Stretched PP film | Thickness 20 μm |
| Second adhesive layer | Thickness 1 μm | Polyester urethane adhesive agent (solvent-based type) | Thickness 4 μm |
| Sealant layer | Thickness 60 μm | Unstretched PP film | Thickness 60 μm |
| | Water vapor permeability [g/m2 · day] (40° C., 90% RH) | Oxygen permeability [cc/m2 · day · atm] (23° C., 90% RH) | Water vapor permeability [g/m2 · day] (40° C., 90% RH) |
| Untreated | 0.45 | 1.45 | 0.80 |
| After boiling process | 0.55 | 2.67 | 0.87 |
| After retort process | 1.50 | 4.27 | 1.46 |
| Untreated, after Gelbo test | 1.10 | 2.96 | 1.30 |
| After boiling process, after Gelbo test | 1.50 | 4.09 | 1.02 |
| After retort process, after Gelbo test | 1.30 | 9.28 | 2.05 |
| Heating conditions 120° C. × 15 minutes | | | |
| Thermal shrinkage ratio % (MD direction) | 0.77 | 1.16 | |
| Thermal shrinkage ratio % (TD direction) | 1.24 | 0.87 | |
| Ratio of thermal shrinkage ratios (MD/TD) | 0.62 | 1.34 | |
| Heating conditions 150° C. × 5 minutes | | | |
| Thermal shrinkage ratio % (MD direction) | 2.96 | 3.25 | |
| Thermal shrinkage ratio % (TD direction) | 2.72 | 2.50 | |
| Ratio of thermal shrinkage ratios (MD/TD) | 1.09 | 1.30 | |

TABLE 2

| | Example 1A | | Example 1 Aa | |
|---|---|---|---|---|
| First substrate | Biaxially stretched PP film | Thickness 20 μm | Biaxially stretched PP film | Thickness 20 μm |
| First adhesive layer | Polyester urethane adhesive agent (solvent-based type) | Thickness 4 μm | Polyester urethane adhesive agent (solvent- free type) | Thickness 1 μm |
| Second substrate | Barrier coating layer | Thickness 300 nm | Barrier coating layer | Thickness 300 nm |
| | Carbon-containing silicon oxide evaporated film | Thickness 12 nm | Carbon-containing silicon oxide evaporated film | Thickness 12 nm |
| | Surface coating layer | Thickness 0.5 μm | Surface coating layer | Thickness 0.5 μm |
| | Biaxially stretched PP film | Thickness 20 μm | Biaxially stretched PP film | Thickness 20 μm |

TABLE 2-continued

| | | | | |
|---|---|---|---|---|
| Second adhesive layer | Polyester urethane adhesive agent (solvent-based type) | Thickness 4 μm | Polyester urethane adhesive agent (solvent-free type) | Thickness 1 μm |
| Sealant layer | Unstretched PP film | Thickness 60 μm | Unstretched PP film | Thickness 60 μm |
| | Oxygen permeability [cc/m2 · day · atm] (23° C., 90% RH) | Water vapor permeability [g/m2 · day] (40° C., 90% RH) | Oxygen permeability [cc/m2 · day · atm] (23° C., 90% RH) | Water vapor permeability [g/m2 · day] (40° C., 90% RH) |
| Untreated | 0.45 | 0.45 | 0.45 | 0.45 |
| After boiling process | 0.65 | 0.55 | 0.65 | 0.55 |
| After retort process | 1.21 | 0.95 | 0.95 | 1.50 |
| Untreated, after Gelbo test | 1.13 | 0.61 | 1.50 | 1.10 |
| After boiling process, after Gelbo test | 1.22 | 0.69 | 2.00 | 1.50 |
| After retort process, after Gelbo test | 2.80 | 1.15 | 2.80 | 1.30 |
| Heating conditions 120° C. × 15 minutes | | | | |
| Thermal shrinkage ratio % (MD direction) | 0.57 | | 0.77 | |
| Thermal shrinkage ratio % (TD direction) | 1.20 | | 1.24 | |
| Ratio of thermal shrinkage ratios (MD/TD) | 0.47 | | 0.62 | |
| Heating conditions 150° C. × 5 minutes | | | | |
| Thermal shrinkage ratio % (MD direction) | 2.88 | | 2.96 | |
| Thermal shrinkage ratio % (TD direction) | 2.05 | | 2.72 | |
| Ratio of thermal shrinkage ratios (MD/TD) | 1.41 | | 1.09 | |
| Amount of residual solvent (mg/m2) | 20 | | 0.7 | |
| Tear strength in MD direction (N/16 laminates) | 0.7 | | 0.6 | |
| Tear strength in TD direction (N/16 laminates) | 4.1 | | 1.7 | |
| Tear strength ratio (strength TD/strength MD) | 5.9 | | 2.8 | |

[Fifth and Sixth Aspects]

The fifth and sixth aspects are more specifically described below.

In the following description, a polypropylene film is also referred to as a "PP film", and a biaxially stretched polypropylene film is also referred to as a "biaxially stretched PP film" or an "OPP film".

Example 1B

The biaxially stretched polypropylene film with a thickness of 20 μm (P2171 manufactured by Toyobo Co., Ltd.) with a corona-treated surface was prepared as a first substrate. The transparent barrier substrate was prepared as a second substrate. An unstretched polypropylene film with a corona-treated surface and with a thickness of 60 μm (ET-20 manufactured by Okamoto Industries, Inc.) was prepared as a sealant layer.

A print layer with a coating thickness of 1 μm (dry) was formed by a gravure roll coating method on the corona-treated surface of the film serving as the first substrate. The solvent-free polyester urethane adhesive agent (RN-920/HN-920 (blend ratio: 1/1) manufactured by Rock Paint Co., Ltd.) was applied to the print layer at a coating thickness of 1 μm (dry) by the gravure roll coating method, and the adhesive agent surface side of the first substrate and the barrier coating surface side of the transparent barrier substrate were laminated. Furthermore, the solvent-free polyester urethane adhesive agent (RN-920/HN-920 (blend ratio: 1/1) manufactured by Rock Paint Co., Ltd.) was applied at a coating thickness of 1 μm (dry) by the gravure roll coating method, and the adhesive agent surface side of the transparent barrier substrate and the corona-treated surface side of the unstretched polypropylene film were laminated. A polymer component contained in the main agent in the solvent-free polyester urethane adhesive agent had a weight-average molecular weight (Mw) in the range of 2,000 to 2,500 and a polydispersity (Mw/Mn) in the range of 2.0 to 2.5.

Thus, a barrier laminate was produced. The barrier laminate had a total thickness of 103 am and had a layer structure of OPP film (20 μm)/print layer (1 μm)/solvent-free adhesive layer (1 μm)/transparent barrier substrate (20 μm)/solvent-free adhesive layer (1 μm)/unstretched PP film (60 μm). Each value in parentheses indicates the thickness of the corresponding layer. The barrier laminate had a polypropylene content of 95% by mass.

The barrier laminate was used to produce the packaging bag.

Example 2B

The biaxially stretched polypropylene film with a thickness of 20 μm (P2171 manufactured by Toyobo Co., Ltd.) with a corona-treated surface was prepared as a first substrate. The transparent barrier substrate was prepared as a second substrate. The unstretched polypropylene film with a corona-treated surface and with a thickness of 60 μm (ET-20 manufactured by Okamoto Industries, Inc.) was prepared as a sealant layer.

A print layer with a coating thickness of 1 μm (dry) was formed by the gravure roll coating method on the corona-treated surface of the film serving as the first substrate. A two-component curing polyurethane adhesive agent (RU-004/H-1 (blend ratio: 7.5/1) manufactured by Rock Paint Co., Ltd.) was applied to the print layer at a coating thickness of 4 μm (dry) by the gravure roll coating method, and the adhesive agent surface side of the first substrate and the barrier coating surface side of the transparent barrier substrate were dry-laminated. Furthermore, a non-barrier-coated surface side of the transparent barrier substrate was subjected to corona treatment and was coated with the two-component curing polyurethane adhesive agent (RU-004/H-1 (blend ratio: 7.5/1) manufactured by Rock Paint Co., Ltd.) at a coating thickness of 4 μm (dry) by the gravure roll coating method, and the adhesive agent surface side of the transparent barrier substrate and the corona-treated surface side of the unstretched polypropylene film were dry-laminated.

Thus, a barrier laminate was produced. The barrier laminate had a total thickness of 109 am and had a layer structure of OPP film (20 μm)/print layer (1 μm)/solvent-based adhesive layer (4 μm)/transparent barrier substrate (20 μm)/solvent-based adhesive layer (4 μm)/unstretched PP film (60 μm). The barrier laminate had a polypropylene content of 90% by mass.

The barrier laminate was used to produce the packaging bag.

Example 3B

The transparent barrier substrate was prepared as a first substrate. The biaxially stretched polypropylene film with a thickness of 20 μm (P2271 manufactured by Toyobo Co., Ltd.), both surfaces of which were subjected to corona treatment, was prepared as a second substrate. A barrier laminate was produced in the same manner as in Example 1B except that the first substrate and the second substrate were used. The transparent barrier substrate was disposed such that the biaxially stretched polypropylene film constituting the substrate was the outermost layer of the barrier laminate.

The barrier laminate had a total thickness of 103 μm and had a layer structure of transparent barrier substrate (20 μm)/print layer (1 μm)/solvent-free adhesive layer (1 μm)/OPP film (20 μm)/solvent-free adhesive layer (1 μm)/unstretched PP film (60 am). The barrier laminate had a polypropylene content of 95% by mass.

The barrier laminate was used to produce the packaging bag.

Example 4B

The transparent barrier substrate was prepared as a first substrate. The biaxially stretched polypropylene film with a thickness of 20 μm (P2271 manufactured by Toyobo Co., Ltd.), both surfaces of which were subjected to corona treatment, was prepared as a second substrate. A barrier laminate was produced in the same manner as in Example 2B except that the first substrate and the second substrate were used. The transparent barrier substrate was disposed such that the biaxially stretched polypropylene film constituting the substrate was the outermost layer of the barrier laminate.

The barrier laminate had a total thickness of 109 μm and had a layer structure of transparent barrier substrate (20 μm)/print layer (1 μm)/solvent-based adhesive layer (4 μm)/OPP film (20 μm)/solvent-based adhesive layer (4 μm)/unstretched PP film (60 am). The barrier laminate had a polypropylene content of 90% by mass.

The barrier laminate was used to produce the packaging bag.

Example 5B

The transparent barrier substrate was prepared as a first substrate. The unstretched polypropylene film with a corona-treated surface and with a thickness of 60 μm (ET-20 manufactured by Okamoto Industries, Inc.) was prepared as a sealant layer.

A print layer with a coating thickness of 1 μm (dry) was formed by the gravure roll coating method on the barrier coating layer surface of the transparent barrier substrate. The solvent-free polyester urethane adhesive agent (RN-920/HN-920 (blend ratio: 1/1) manufactured by Rock Paint Co., Ltd.) was applied to the print layer at a coating thickness of 1 μm (dry) by the gravure roll coating method, and the adhesive agent surface side of the transparent barrier substrate and the corona-treated surface side of the unstretched polypropylene film were dry-laminated.

The barrier laminate had a total thickness of 82 μm and had a layer structure of transparent barrier substrate (20 μm)/print layer (1 μm)/solvent-free adhesive layer (1 μm)/unstretched PP film (60 μm). The barrier laminate had a polypropylene content of 97% by mass.

The barrier laminate was used to produce the packaging bag.

Example 6B

The transparent barrier substrate was prepared as a first substrate. The unstretched polypropylene film with a corona-treated surface and with a thickness of 60 μm (ET-20 manufactured by Okamoto Industries, Inc.) was prepared as a sealant layer.

A print layer with a coating thickness of 1 μm (dry) was formed by the gravure roll coating method on the barrier coating layer surface of the transparent barrier substrate. The two-component curing polyurethane adhesive agent ((RU-004/H-1 (blend ratio: 7.5/1) manufactured by Rock Paint Co., Ltd. was applied to the print layer at a coating thickness of 4 μm (dry) by the gravure roll coating method, and the adhesive agent surface side of the transparent barrier substrate and the corona-treated surface side of the unstretched polypropylene film were dry-laminated.

The barrier laminate had a total thickness of 85 μm and had a layer structure of transparent barrier substrate (20 μm)/print layer (1 μm)/solvent-based adhesive layer (4 μm)/unstretched PP film (60 μm). The barrier laminate had a polypropylene content of 93% by mass.

The barrier laminate was used to produce the packaging bag.

TABLE 3

| | Example 1 B | | Example 2 B | |
|---|---|---|---|---|
| First substrate | Biaxially stretched PP film | Thickness 20 μm | Biaxially stretched PP film | Thickness 20 μm |
| Print layer | Print layer | Thickness 1 μm | Print layer | Thickness 1 μm |
| First adhesive layer | Polyester urethane adhesive agent (solvent-free type) | Thickness 1 μm | Polyester urethane adhesive agent (solvent-based type) | Thickness 4 μm |
| Second substrate | Barrier coating layer | Thickness 300 nm | Barrier coating layer | Thickness 300 nm |

TABLE 3-continued

| | | | | |
|---|---|---|---|---|
| | Carbon-containing silicon oxide evaporated film | Thickness 12 nm | Carbon-containing silicon oxide evaporated film | Thickness 12 nm |
| | Surface coating layer | Thickness 0.5 μm | Surface coating layer | Thickness 0.5 μm |
| | Biaxially stretched PP film | Thickness 20 μm | Biaxially stretched PP film | Thickness 20 μm |
| Second adhesive layer | Polyester urethane adhesive agent (solvent-free type) | Thickness 1 μm | Polyester urethane adhesive agent (solvent-based type) | Thickness 4 μm |
| Sealant layer | Unstretched PP film | Thickness 60 μm | Unstretched PP film | Thickness 60 μm |
| Gas barrier properties | Oxygen permeability [cc/m2 · day · atm] (23° C., 90% RH) | Water vapor permeability [g/m2 · day] (40° C., 90% RH) | Oxygen permeability [cc/m2 · day · atm] (23° C., 90% RH) | Water vapor permeability [g/m2 · day] (40° C., 90% RH) |
| Untreated | 0.15 | 1.10 | 0.45 | 0.45 |
| After boiling process | 0.45 | 1.65 | 0.65 | 0.55 |
| After retort process (121° C.) | 0.91 | 1.60 | 1.21 | 0.95 |
| After retort process (135° C.) | 1.27 | 1.77 | 1.79 | 1.88 |
| Seal strength (N/15 mm width) | 35 | | 35 | |
| Tearability (MD) N/16 laminates | 0.6 | | 0.7 | |
| Tearability (TD) N/16 laminates | 1.7 | | 4.1 | |
| Amount of residual solvent (mg/m2) | 0.7 | | 20 | |

| | Example 3 B | | Example 4 B | |
|---|---|---|---|---|
| First substrate | Biaxially stretched PP film | Thickness 20 μm | Biaxially stretched PP film | Thickness 20 μm |
| | Surface coating layer | Thickness 0.5 μm | Surface coating layer | Thickness 0.5 μm |
| | Carbon-containing silicon oxide evaporated film | Thickness 12 nm | Carbon-containing silicon oxide evaporated film | Thickness 12 nm |
| | Barrier coating layer | Thickness 300 nm | Barrier coating layer | Thickness 300 nm |
| Print layer | Print layer | Thickness 1 μm | Print layer | Thickness 1 μm |
| First adhesive layer | Polyester urethane adhesive agent (solvent-free type) | Thickness 1 μm | Polyester urethane adhesive agent (solvent-based type) | Thickness 4 μm |
| Second substrate | Biaxially stretched PP film | Thickness 20 μm | Biaxially stretched PP film | Thickness 20 μm |
| Second adhesive layer | Polyester urethane adhesive agent (solvent-free type) | Thickness 1 μm | Polyester urethane adhesive agent (solvent-based type) | Thickness 4 μm |
| Sealant layer | Unstretched PP film | Thickness 60 μm | Unstretched PP film | Thickness 60 μm |
| Gas barrier properties | Oxygen permeability [cc/m2 · day · atm] (23° C., 90% RH) | Water vapor permeability [g/m2 · day] (40° C., 90% RH) | Oxygen permeability [cc/m2 · day · atm] (23° C., 90% RH) | Water vapor permeability [g/m2 · day] (40° C., 90% RH) |
| Untreated | 1.87 | 0.74 | 1.45 | 0.80 |
| After boiling process | 2.84 | 1.15 | 2.67 | 0.87 |
| After retort process (121° C.) | 4.34 | 1.50 | 4.27 | 1.46 |
| After retort process (135° C.) | 63.58 | 1.90 | 72.34 | 2.01 |
| Seal strength (N/15 mm width) | 35 | | 35 | |
| Tearability (MD) N/16 laminates | 0.6 | | 0.7 | |
| Tearability (TD) N/16 laminates | 1.7 | | 4.1 | |
| Amount of residual solvent (mg/m2) | 0.7 | | 20 | |

TABLE 4

| | Example 5 B | | Example 6 B | |
|---|---|---|---|---|
| First substrate | Biaxially stretched PP film | Thickness 20 μm | Biaxially stretched PP film | Thickness 20 μm |
| | Surface coating layer | Thickness 0.5 μm | Surface coating layer | Thickness 0.5 μm |
| | Carbon-containing silicon oxide evaporated film | Thickness 12 nm | Carbon-containing silicon oxide evaporated film | Thickness 12 nm |
| | Barrier coating layer | Thickness 300 nm | Barrier coating layer | Thickness 300 nm |
| Print layer | Print layer | Thickness 1 μm | Print layer | Thickness 1 μm |

TABLE 4-continued

| | | | | |
|---|---|---|---|---|
| First adhesive layer | Polyester urethane adhesive agent (solvent-freetype) | Thickness 1 μm | Polyester urethane adhesive agent (solvent-based type) | Thickness 4 μm |
| Second substrate | | | | |
| Second adhesive layer | | | | |
| Sealant layer | Unstretched PP film | Thickness 60 μm | Unstretched PP film | Thickness 60 μm |
| Gas barrier properties | Oxygen permeability [cc/m2 · day · atm] (23° C., 90% RH) | Water vapor permeability [g/m2 · day] (40° C., 90% RH) | Oxygen permeability [cc/m2 · day · atm] (23° C., 90% RH) | Water vapor permeability [g/m2 · day] (40° C., 90% RH) |
| Untreated | 1.98 | 1.45 | 2.69 | 1.56 |
| After boiling process | 2.51 | 1.74 | 2.94 | 1.73 |
| After retort process (121° C.) | 3.1 | 1.88 | 3.52 | 1.76 |
| After retort process (135° C.) | 70.45 | 1.94 | 75.45 | 2.05 |
| Seal strength (N/15 mm width) | 20 | | 20 | |
| Tearability (MD) N/16 laminates | 0.5 | | 0.5 | |
| Tearability (TD) N/16 laminates | 1.7 | | 3.5 | |
| Amount of residual solvent (mg/m2) | 0.5 | | 15 | |

[Seventh Aspect]

The seventh aspect is more specifically described below.

Example 1C

<Production of Sealant Film>

A resin composition containing 80% by mass of a propylene-ethylene block copolymer, 5% by mass of a styrene-ethylene/butylene-styrene block copolymer (SEBS), and 15% by mass of a fossil-fuel-derived linear low-density polyethylene (SP2040 manufactured by Prime Polymer Co., Ltd., MFR: 3.8 g/10 min, Tm: 116° C., density: 918 kg/m$^3$) was extruded through a T-die to produce an unstretched film with a thickness of 60 μm (hereinafter also referred to as a "sealant film (A)").

<Production of Transparent Barrier Substrate>

A (meth)acrylic resin with a hydroxy group (number-average molecular weight: 25,000, glass transition temperature: 99° C., hydroxyl value: 80 mg KOH/g) was diluted with a mixed solvent of methyl ethyl ketone and ethyl acetate (mixing ratio: 1:1) to a solid concentration of 10% by mass to prepare a main agent. An ethyl acetate solution containing tolylene diisocyanate (solid content: 75% by mass) was added to the main agent as a curing agent to prepare a solution for forming a surface coating layer. The amount of the curing agent used was 10 parts by mass per 100 parts by mass of the main agent.

The biaxially stretched polypropylene film with a corona-treated surface and with a thickness of 20 μm (ME-1 manufactured by Mitsui Chemicals Tohcello, Inc.) was prepared. The solution for forming a surface coating layer was applied to the corona-treated surface of the film and was dried to form a surface coating layer with a thickness of 0.5 μm, thereby producing a resin substrate.

A carbon-containing silicon oxide (silica) evaporated film with a thickness of 12 nm was formed on the surface coating layer of the resin substrate using a low-temperature plasma chemical vapor deposition apparatus as a real apparatus (a CVD method) while applying tension to the resin substrate by roll-to-roll. The evaporated film formation conditions are described below.

(Formation Conditions)

Hexamethyldisiloxane:oxygen gas:helium=1:10:10 (unit: slm)

Electricity supplied to cooling/electrode drum: 22 kW

Line speed: 100 m/min 385 g of water, 67 g of isopropyl alcohol, and 9.1 g of 0.5 N hydrochloric acid were mixed to prepare a solution with a pH of 2.2. The solution was mixed with 175 g of tetraethoxysilane as a metal alkoxide and 9.2 g of glycidoxypropyltrimethoxysilane as a silane coupling agent while cooling to 10° C. to prepare a solution A. 14.7 g of poly(vinyl alcohol) with a degree of saponification of 99% or more and a degree of polymerization of 2400 as a water-soluble polymer, 324 g of water, and 17 g of isopropyl alcohol were mixed to prepare a solution B.

The solution A and the solution B were mixed at 6.5:3.5 based on mass (solution A:solution B) to prepare a barrier coating agent. The barrier coating agent was applied by the spin coating method to the evaporated film formed on the resin substrate and was heat-treated in an oven at 80° C. for 60 seconds to form a barrier coating layer with a thickness of 300 nm.

Thus, a transparent barrier substrate was produced.

<Production of Laminate>

The biaxially stretched polypropylene film with a corona-treated surface and with a thickness of 20 μm (ME-1 manufactured by Mitsui Chemicals Tohcello, Inc.) was prepared as a first substrate. A print layer with a coating thickness of 1 μm (dry) was formed by the gravure roll coating method on the corona-treated surface of the first substrate. A two-component curing polyurethane adhesive agent (RU-40/H-4 manufactured by Rock Paint Co., Ltd.) was then applied to the print layer at a coating thickness of 4 μm (dry) by the gravure roll coating method, and the transparent barrier substrate was dry-laminated such that the barrier coating layer surface of the transparent barrier substrate was in contact with the adhesive layer surface.

A non-barrier coating layer surface of the transparent barrier substrate as a second substrate (intermediate substrate) was subjected to corona treatment and was coated with the two-component curing polyurethane adhesive agent (RU-40/H-4 manufactured by Rock Paint Co., Ltd.) at a coating thickness of 4 μm (dry) by the gravure roll coating method, and a sealant film (A) was dry-laminated on the adhesive layer surface.

Thus, a laminate with a thickness of approximately 109 μm was produced. The laminate had a structure of biaxially stretched polypropylene film (20 am)/print layer (1 μm)/solvent-based adhesive layer (4 am)/transparent barrier substrate (approximately 20 μm)/solvent-based adhesive layer (4 μm)/sealant film (A) (60 am). The laminate had a monomaterial ratio of approximately 91% by mass.

Example 2C

A laminate with a thickness of approximately 104 μm was produced in the same manner as in Example 1C except that a non-solvent two-component curing polyurethane adhesive agent (RN-920/HN-920 manufactured by Rock Paint Co., Ltd.) was applied as an adhesive layer at a coating thickness of 1.5 μm (dry) by a roll coating method. The laminate had a structure of biaxially stretched polypropylene film (20 μm)/print layer (1 μm)/solvent-free adhesive layer (1.5 μm)/transparent barrier substrate (approximately 20 μm)/solvent-free adhesive layer (1.5 μm)/sealant film (A) (60 am). The laminate had a monomaterial ratio of approximately 96% by mass.

Example 3C

A laminate with a thickness of approximately 85 μm was produced in the same manner as in Example 1C except that a transparent barrier substrate was used as a first substrate and was disposed such that a biaxially stretched polypropylene film thereof was the outermost layer of the laminate, a print layer was formed on the barrier coating layer, and the second substrate (intermediate substrate) was not laminated. The laminate had a structure of transparent barrier substrate (approximately 20 μm)/print layer (1 μm)/solvent-based adhesive layer (4 μm)/sealant film (A) (60 am). The laminate had a monomaterial ratio of approximately 94% by mass.

Example 4C

A laminate with a thickness of approximately 109 μm was produced in the same manner as in Example 1C except that an unstretched polypropylene film with a thickness of 60 μm (ZK207 manufactured by Toray Advanced Film Co., Ltd.) was used as a sealant layer. "ZK207" is composed of a propylene-ethylene block copolymer and a thermoplastic elastomer (no polyethylene component). The laminate had a structure of biaxially stretched polypropylene film (20 μm)/print layer (1 μm)/solvent-based adhesive layer (4 μm)/transparent barrier substrate (approximately 20 μm)/solvent-based adhesive layer (4 μm)/unstretched polypropylene film (60 am). The laminate had a monomaterial ratio of approximately 91% by mass.

Example 5C

A laminate with a thickness of approximately 109 μm was produced in the same manner as in Example 1C except that an unstretched polypropylene film with a thickness of 60 μm (ZK99S manufactured by Toray Advanced Film Co., Ltd.) was used as a sealant layer. "ZK99S" is composed of a propylene-ethylene block copolymer (no thermoplastic elastomer and no polyethylene component). The laminate had a structure of biaxially stretched polypropylene film (20 μm)/print layer (1 μm)/solvent-based adhesive layer (4 μm)/transparent barrier substrate (approximately 20 μm)/solvent-based adhesive layer (4 μm)/unstretched polypropylene film (60 am). The laminate had a monomaterial ratio of approximately 91% by mass.

Example 6C

A laminate with a thickness of 96 μm was produced in the same manner as in Example 1C except that a silica-deposited PET film with a thickness of 12 μm (IB-PET-PIR2 manufactured by DNP) was used as a first substrate, a biaxially stretched nylon film with a thickness of 15 μm (Bonyl-W manufactured by Kohjin Film & Chemicals Co., Ltd.) was used as a second substrate (intermediate substrate), and the unstretched polypropylene film with a thickness of 60 μm (ZK99S manufactured by Toray Advanced Film Co., Ltd.) was used as a sealant layer. The laminate had a structure of silica-deposited PET film (12 μm)/print layer (1 μm)/solvent-based adhesive layer (4 μm)/biaxially stretched nylon film (15 μm)/solvent-based adhesive layer (4 μm)/unstretched polypropylene film (60 am). The laminate had a monomaterial ratio of approximately 62% by mass.

[Retort Test]

Two laminates produced as described above were prepared and were stacked with the surfaces on the sealant film (unstretched polypropylene film) side facing each other. Another one of the laminate was then folded in a V shape with the surface on the sealant film side being on the outside, was placed between the lower portions of the laminates facing each other, and was heat-sealed to form a bottom portion. Two sides adjacent to the bottom portion were then heat-sealed to form a trunk. A standing pouch with a concave seal portion at the bottom portion thus produced had a width of 130 mm, a height of 170 mm, and a bottom gusset of 35 mm. The seal width was 5 mm at the bottom portion and 5 mm at the side portion. The pouch was filled with 210 g of water from the opening, and the opening was hermetically heat-sealed. The sealed pouch was subjected to a retort process of a hot water type at a retort temperature of 121° C. for a retort time of 30 minutes.

[Differential Scanning Calorimetry (DSC)]

The sealant film was separated from the standing pouch after the retort process and was subjected to differential scanning calorimetry (DSC). A melting peak temperature was measured with a differential scanning calorimeter (product name: DSC7000X, manufactured by Hitachi High-Tech Science Corporation) in accordance with JIS K 7121: 2012. The sealant film was held at 20° C. for 1 minute and was then heated from 20° C. to 200° C. at a heating rate of 10° C./min to measure a melting peak temperature (° C.). The nitrogen gas flow rate was 20 ml/min.

[Drop Test]

The standing pouch after the retort process was stored at 3° C. for 1 week. At normal temperature (approximately 23° C.), the stored pouch was dropped 10 times from a height of 120 cm horizontally to the floor (so that the trunk of the pouch hit the floor) and was then dropped 10 times from a height of the 120 cm vertically to the floor (so that the bottom portion of the pouch hit the floor) to examine the number of broken pouches out of 10 pouches.

TABLE 5

<Differential scanning calorimetry (DSC)>

| | First melting peak temperature | Second melting peak temperature | Third melting peak temperature |
|---|---|---|---|
| Sample 1C Sealant film (A) | 110.9° C. | 125.3° C. | 164.9° C. |
| Sample 4C Unstretched PP film (ZK207) | — | 126.4° C. | 163.8° C. |
| Sample 5C Unstretched PP film (ZK99S) | — | 129.8° C. | 163.6° C. |

TABLE 6

| | Monomaterial ratio (mass %) | Drop test Number of broken bags/ number of tested bags |
|---|---|---|
| Sample 1C | Approximately 91 | 0/10 |
| Sample 2C | Approximately 96 | 0/10 |
| Sample 3C | Approximately 94 | 0/10 |
| Sample 4C | Approximately 91 | 3/10 |
| Sample 5C | Approximately 91 | 4/10 |
| Sample 6C | Approximately 62 | 0/10 |

[Eighth Aspect]

The eighth aspect is more specifically described below.

Example 1D

<Production of Transparent Barrier Substrate>

A (meth)acrylic resin with a hydroxy group (number-average molecular weight: 25,000, glass transition temperature: 99° C., hydroxyl value: 80 mg KOH/g) was diluted with a mixed solvent of methyl ethyl ketone and ethyl acetate (mixing ratio: 1:1) to a solid concentration of 10% by mass to prepare a main agent. An ethyl acetate solution containing tolylene diisocyanate (solid content: 75% by mass) was added to the main agent as a curing agent to prepare a solution for forming a surface coating layer. The amount of the curing agent used was 10 parts by mass per 100 parts by mass of the main agent.

The biaxially stretched polypropylene film with a corona-treated surface and with a thickness of 20 μm (ME-1 manufactured by Mitsui Chemicals Tohcello, Inc.) was prepared. The solution for forming a surface coating layer was applied to the corona-treated surface of the film and was dried to form a surface coating layer with a thickness of 0.5 μm, thereby producing a resin substrate.

A carbon-containing silicon oxide (silica) evaporated film with a thickness of 12 nm was formed on the surface coating layer of the resin substrate using a low-temperature plasma chemical vapor deposition apparatus as a real apparatus (a CVD method) while applying tension to the resin substrate by roll-to-roll. The evaporated film formation conditions are described below.

(Formation Conditions)

Hexamethyldisiloxane:oxygen gas:helium=1:10:10 (unit: slm)

Electricity supplied to cooling/electrode drum: 22 kW

Line speed: 100 m/min 385 g of water, 67 g of isopropyl alcohol, and 9.1 g of 0.5 N hydrochloric acid were mixed to prepare a solution with a pH of 2.2. The solution was mixed with 175 g of tetraethoxysilane as a metal alkoxide and 9.2 g of glycidoxypropyltrimethoxysilane as a silane coupling agent while cooling to 10° C. to prepare a solution A. 14.7 g of poly(vinyl alcohol) with a degree of saponification of 99% or more and a degree of polymerization of 2400 as a water-soluble polymer, 324 g of water, and 17 g of isopropyl alcohol were mixed to prepare a solution B.

The solution A and the solution B were mixed at 6.5:3.5 based on mass (solution A:solution B) to prepare a barrier coating agent. The barrier coating agent was applied by a spin coating method to the evaporated film formed on the resin substrate and was heat-treated in an oven at 80° C. for 60 seconds to form a barrier coating layer with a thickness of 300 nm.

Thus, a transparent barrier substrate was produced.

<Production of Laminate>

The biaxially stretched polypropylene film with a thickness of 20 μm (P2171 manufactured by Toyobo Co., Ltd.) with a corona-treated surface was prepared as a first substrate. A print layer with a coating thickness of 1 μm (dry) was formed by the gravure roll coating method on the corona-treated surface of the first substrate. The two-component curing polyurethane adhesive agent (RU-40/H-4 manufactured by Rock Paint Co., Ltd.) was then applied to the print layer at a coating thickness of 4 μm (dry) by the gravure roll coating method, and the transparent barrier substrate was dry-laminated such that the barrier coating layer surface of the transparent barrier substrate as a second substrate (intermediate substrate) was in contact with the adhesive layer surface.

A non-barrier coating layer surface of the transparent barrier substrate was subjected to corona treatment and was coated with the two-component curing polyurethane adhesive agent (RU-40/H-4 manufactured by Rock Paint Co., Ltd.) at a coating thickness of 4 μm (dry) by the gravure roll coating method, and the unstretched polypropylene film with a corona-treated surface and with a thickness of 60 μm (ET-20 manufactured by Okamoto Industries, Inc.) was dry-laminated as a sealant layer such that the corona-treated surface of the film was in contact with the adhesive layer surface.

Thus, a laminate with a thickness of approximately 109 μm was produced. The laminate had a structure of biaxially stretched polypropylene film (20 μm)/print layer (1 μm)/solvent-based adhesive layer (4 μm)/transparent barrier substrate (approximately 20 μm)/solvent-based adhesive layer (4 μm)/unstretched polypropylene film (60 am). The laminate had a monomaterial ratio of approximately 91% by mass.

Example 2D

A laminate with a thickness of approximately 104 μm was produced in the same manner as in Example 1D except that the non-solvent two-component curing polyurethane adhesive agent (RN-920/HN-920 manufactured by Rock Paint Co., Ltd.) was applied as an adhesive layer at a coating thickness of 1.5 μm (dry) by a roll coating method. The laminate had a structure of biaxially stretched polypropylene film (20 am)/print layer (1 μm)/solvent-free adhesive layer (1.5 am)/transparent barrier substrate (approximately 20 μm)/solvent-free adhesive layer (1.5 am)/unstretched polypropylene film (60 am). The laminate had a monomaterial ratio of approximately 96% by mass.

Example 3D

A laminate with a thickness of approximately 109 μm was produced in the same manner as in Example 1D except that an unstretched polypropylene film with a thickness of 60 μm (ZK500 manufactured by Toray Advanced Film Co., Ltd.) was used as a sealant layer. The laminate had a structure of biaxially stretched polypropylene film (20 μm)/print layer (1 μm)/solvent-based adhesive layer (4 μm)/transparent barrier substrate (approximately 20 μm)/solvent-based adhesive layer (4 μm)/unstretched polypropylene film (60 am). The laminate had a monomaterial ratio of approximately 91% by mass.

Example 4D

A laminate with a thickness of approximately 109 μm was produced in the same manner as in Example 1D except that a biaxially stretched polypropylene film with a thickness of 20 μm (P2161 manufactured by Toyobo Co., Ltd.) was used as a first substrate. The laminate had a structure of biaxially stretched polypropylene film (20 μm)/print layer (1 μm)/solvent-based adhesive layer (4 μm)/transparent barrier substrate (approximately 20 μm)/solvent-based adhesive layer (4 μm)/unstretched polypropylene film (60 am). The laminate had a monomaterial ratio of approximately 91% by mass.

Example 5D

A laminate with a thickness of approximately 109 μm was produced in the same manner as in Example 1D except that the biaxially stretched polypropylene film with a thickness of 20 μm (P2161 manufactured by Toyobo Co., Ltd.) was used as a first substrate, and the unstretched polypropylene film with a thickness of 60 μm (ZK500 manufactured by Toray Advanced Film Co., Ltd.) was used as a sealant layer. The laminate had a structure of biaxially stretched polypropylene film (20 μm)/print layer (1 μm)/solvent-based adhesive layer (4 μm)/transparent barrier substrate (approximately 20 μm)/solvent-based adhesive layer (4 μm)/unstretched polypropylene film (60 am). The laminate had a monomaterial ratio of approximately 91% by mass.

Example 6D

A laminate with a thickness of 96 μm was produced in the same manner as in Example 1D except that the silica-deposited PET film with a thickness of 12 μm (IB-PET-PIR2 manufactured by DNP) was used as a first substrate, the biaxially stretched nylon film with a thickness of 15 μm (Bonyl-W manufactured by Kohjin Film & Chemicals Co., Ltd.) was used as a second substrate (intermediate substrate), and the unstretched polypropylene film with a thickness of 60 μm (ZK500 manufactured by Toray Advanced Film Co., Ltd.) was used as a sealant layer. The laminate had a structure of silica-deposited PET film (approximately 12 μm)/print layer (1 μm)/solvent-based adhesive layer (4 μm)/biaxially stretched nylon film (15 μm)/solvent-based adhesive layer (4 μm)/unstretched polypropylene film (60 am). The laminate had a monomaterial ratio of approximately 62% by mass.

[Evaluation]

<Differential Scanning Calorimetry (DSC)>

Measurement was performed with a differential scanning calorimeter (product name: DSC7000X, manufactured by Hitachi High-Tech Science Corporation) in accordance with JIS K 7121: 2012 (Testing methods for transition temperatures of plastics). Measurement samples are the biaxially stretched polypropylene film of the first substrate and the unstretched polypropylene film of the sealant layer (referred to as OPP and CPP, respectively, in Table 7). A measurement sample was held at 20° C. for 1 minute, was then heated from 20° C. to 200° C. at a heating rate of 10° C./min (1st), was held at 200° C. for 5 minutes, was then cooled from 200° C. to 20° C. at a cooling rate of 10° C./min, and was held at 20° C. for 5 minutes. The temperature was then increased again from 20° C. to 200° C. at a heating rate of 10° C./min (2nd). Thus, DSC curves of 1st and 2nd were obtained. In the DSC curves, an extrapolated initial melting temperature (Tim) was obtained, which was a temperature at an intersection point between a straight line obtained by extending the baseline on the low temperature side to the high temperature side and a tangent line with the maximum slope to a curve of a melting peak on the low temperature side. When there were two or more Tims, the Tim of the melting peak with the highest peak intensity was used. The nitrogen gas flow rate was 20 ml/min. Table 7 shows the results.

<Retort Test>

Two laminates produced as described above were prepared and were stacked with the surfaces on the sealant layer (unstretched polypropylene film) side facing each other. Another one of the laminate was then folded in a V shape with the surface on the sealant layer side being on the outside, was placed between the lower portions of the laminates facing each other, and was heat-sealed to form a bottom portion. Two sides adjacent to the bottom portion were then heat-sealed to form a trunk. A standing pouch with a concave seal portion at the bottom portion thus produced had a width of 130 mm, a height of 170 mm, and a bottom gusset of 35 mm. The seal width was 6 mm at the bottom portion and 6 mm at the side portion. The pouch was filled with 210 g of water from the opening, and the opening was hermetically heat-sealed. The sealed pouch was subjected to a retort process of a hot water type at a retort temperature of 121° C. for a retort time of 30 minutes.

Examples 1D and 2D had no problem, such as delamination or seal retraction.

<Seal Evaluation>

Two laminates produced as described above were prepared and were cut into a size of 100 mm×100 mm. The surfaces on the unstretched polypropylene film sides were overlapped to face each other and were heat-sealed in the TD direction using a one-sided heating flat heat-sealing bar with a width of 10 mm. The heat-sealing conditions were a temperature of 130° C. to 180° C., a pressure of 0.1 MPa, and a time of 1 second. The sealed sample was cut into a width of 15 mm in the MD direction to prepare a test specimen with a width of 15 mm and a length of 100 mm. The test specimen was used to measure seal strength with a tensile tester (STA-1150 manufactured by Orientec Co., Ltd.) by T-type peeling at a test speed of 300 mm/min. Table 8 shows the results.

<Shrinkage Ratio>

Two laminates produced as described above were prepared and were cut into a size of 100 mm×100 mm. The surfaces on the unstretched polypropylene film sides were overlapped to face each other and were heat-sealed in the TD direction using a one-sided heating flat heat-sealing bar with a width of 10 mm. The heat-sealing conditions were a temperature of 130° C. to 190° C., a pressure of 0.1 MPa, and a time of 1 second. The length of the heat seal portion of the sealed sample in the TD direction was measured with a 150-mm ruler, and the shrinkage ratio (%) was calculated using (the length before sealing (100 mm)−the length after sealing (mm))/the length before sealing (100 mm)×100. A sample that was thermally deformed too much by the heat sealing to calculate the shrinkage ratio was evaluated as “failure”. The appearance of the sealed sample was visually evaluated, and a sample with a good appearance was rated AA, a sample with a slightly good appearance was rated BB, and a sample with a poor appearance was rated CC. Table 9 shows the results.

TABLE 7

| <Differential scanning calorimetry (DSC)> | | | | | | |
|---|---|---|---|---|---|---|
| | Extrapolated initial melting temperature Tim (° C.) | | | | Difference in Tim (° C.) | |
| | OPP | | CPP | | OPP − CPP | |
| | 1 st | 2 nd | 1 st | 2 nd | 1 st | 2 nd |
| Sample 1D | 148.2 | 151.7 | 125.9 | 139.7 | 22.3 | 12.0 |
| Sample 2D | 148.2 | 151.7 | 125.9 | 139.7 | 22.3 | 12.0 |
| Sample 3D | 148.2 | 151.7 | 151.7 | 156.0 | −3.5 | −4.3 |
| Sample 4D | 145.1 | 149.2 | 125.9 | 139.7 | 19.2 | 9.5 |
| Sample 5D | 145.1 | 149.2 | 151.7 | 156.0 | −6.6 | −6.8 |

* 1st column: Tim at first heating, that is, Tim1
* 2nd column: Tim at second heating, that is, Tim2

TABLE 8

| Tagle 8 <Seal strength (N/15 mm)> | | | | |
|---|---|---|---|---|
| Heat-sealing temperature | Sample 1D | Sample 3D | Sample 4D | Sample 5D |
| 130° C. | 0.1 | 0.1 | 0.1 | 0.1 |
| 140° C. | 0.1 | 0.1 | 0.1 | 0.1 |
| 150° C. | 0.3 | 0.2 | 0.2 | 0.2 |
| 160° C. | 10.2 | 0.3 | 10.0 | 0.2 |
| 165° C. | 30.8 | — | 28.9 | — |
| 170° C. | 32.9 | 0.5 | 32.3 | 0.4 |
| 180° C. | 48.6 | 4.4 | 47.8 | 4.2 |

"—" indicates unmeasured.

TABLE 9

| Tagle 9 <Shrinkage ratio (%)/appearance (AA: good, BB: slightly good, CC: poor)> | | | | |
|---|---|---|---|---|
| Heat-sealing temperature | Sample 1D | Sample 3D | Sample 4D | Sample 5D |
| 130° C. | 0/AA | 0/AA | 0/AA | 0/AA |
| 140° C. | 0/AA | 0/AA | 0/AA | 0/AA |
| 150° C. | 0/AA | 0/AA | 0.3/AA | 0.2/AA |
| 160° C. | 0.4/AA | 0.2/AA | 0.8/AA | 0.5/AA |
| 165° C. | 0.7/AA | — | 0.9/AA | — |
| 170° C. | 0.8/AA | 0.2/AA | 2.5/BB | 2.0/BB |
| 180° C. | 2.8/BB | 1.1/BB | 11.3/CC | 10.0/CC |
| 190° C. | 11.0/CC | 7.5/CC | N.A./CC | N.A./CC |

"—" indicates unmeasured.

TABLE 10

| | Monomaterial ratio(mass %) |
|---|---|
| Sample 1D | Approximately 91 |
| Sample 2D | Approximately 96 |
| Sample 3D | Approximately 91 |
| Sample 4D | Approximately 91 |
| Sample 5D | Approximately 91 |
| Sample 6D | Approximately 62 |

Those skilled in the art will appreciate that a laminate or the like according to the present invention is not limited to these examples, the examples and the description only illustrate the principles of the present invention, various modifications and improvements may be made without departing from the gist and scope of the present invention, and all the modifications and improvements fall within the scope of the present invention as claimed. Furthermore, the scope of protection claimed by the present invention includes not only the claims but also equivalents thereof.

REFERENCE SIGNS LIST

1 laminate, 10 polyolefin resin substrate, such as polypropylene resin substrate, 20 barrier substrate, 22 polyolefin resin layer, such as polypropylene resin layer, 23 surface coating layer or surface resin layer, 24 evaporated film, 25 barrier coating layer, 30 sealant layer, 40A, 40B adhesive layer,

50 packaging bag, 51 easy-open portion, 52 notch portion, 53 half-cut line,

60 standing pouch, 61 trunk (side sheet), 62 bottom portion (bottom sheet), 63 venting mechanism, 63*a* venting seal portion, 63*b* unsealed portion, A vacuum chamber, B unwinder, C film-forming drum, D winder, E feed roller, F evaporation source, G reactant gas supply portion, H anti-deposition box, I deposition material, J plasma gun, S substrate, A1 vacuum chamber, B1 unwinder, C1 cooling/electrode drum, D1 winder, E1 feed roller, F1 glow discharge plasma, G1 reactant gas supply portion, H1 raw material supply nozzle, I1 raw material gas supply portion, J1 magnet, K1 power supply, L1 vacuum pump.

The invention claimed is:

1. A barrier laminate comprising:

a first substrate;

a second substrate; and a sealant layer in this order in a thickness direction, wherein one of the first substrate and the second substrate is a barrier substrate including a polypropylene resin layer and an evaporated film, and the other of the first substrate and the second substrate is a polypropylene resin substrate, the barrier substrate includes a surface resin layer between the polypropylene resin layer and the evaporated film, the barrier substrate includes an adhesive resin layer between the polypropylene resin layer and the surface resin layer, the polypropylene resin layer is a layer subjected to a stretching process, the evaporated film is composed of an inorganic oxide, the polypropylene resin substrate is a substrate subjected to a stretching process, and the barrier laminate after heat treatment at 120° C. for 15 minutes has a thermal shrinkage ratio (MD1) of 2.00% or less in an MD direction and a thermal shrinkage ratio (TD1) of 2.00% or less in a TD direction.

2. The barrier laminate according to claim 1, wherein a ratio (MD1/TD1) of the thermal shrinkage ratio (MD1) to the thermal shrinkage ratio (TD1) of the barrier laminate after heat treatment at 120° C. for 15 minutes is 0.30 or more and 3.00 or less.

3. The barrier laminate according to claim 1, wherein the barrier laminate after heat treatment at 150° C. for 5 minutes has a thermal shrinkage ratio (MD2) of 4.00% or less in the MD direction and a thermal shrinkage ratio (TD2) of 4.00% or less in the TD direction.

4. The barrier laminate according to claim 3, wherein a ratio (MD2/TD2) of the thermal shrinkage ratio (MD2) to the thermal shrinkage ratio (TD2) of the barrier laminate after heat treatment at 150° C. for 5 minutes is 0.30 or more and 3.00 or less.

5. The barrier laminate according to claim 1, wherein the sealant layer is a resin layer composed of polypropylene.

6. The barrier laminate according to claim 1, wherein when the first substrate is a barrier substrate, the first substrate is disposed such that the evaporated film faces the sealant layer and the polypropylene resin layer faces the side opposite the sealant layer, and when the second substrate is a barrier substrate, the second substrate is disposed such that the evaporated film faces the first substrate and the polypropylene resin layer faces the sealant layer.

7. The barrier laminate according to claim 1, wherein the first substrate is a polypropylene resin substrate, and the second substrate is a barrier substrate.

8. The barrier laminate according to claim 1, wherein the barrier substrate further includes a surface coating layer between the polypropylene resin layer and the evaporated film, and the surface coating layer contains a resin material with a polar group.

9. The barrier laminate according to claim 1, wherein the barrier substrate further includes a surface resin layer between the polypropylene resin layer and the evaporated film, and the surface resin layer contains a resin material with a melting point of 180° C. or more.

10. The barrier laminate according to claim 9, wherein the polypropylene resin layer and the surface resin layer in the barrier substrate are a coextruded stretched resin film.

11. The barrier laminate according to claim 1, further including a barrier coating layer on the evaporated film.

12. The barrier laminate according to claim 1, including a first adhesive layer between the first substrate and the second substrate, and a second adhesive layer between the second substrate and the sealant layer.

13. A packaging container comprising a barrier laminate, wherein the barrier laminate comprises:

a first substrate;

a second substrate; and a sealant layer in this order in a thickness direction, one of the first substrate and the second substrate is a barrier substrate including a polypropylene resin layer and an evaporated film, and the other of the first substrate and the second substrate is a polypropylene resin substrate, the barrier substrate includes a surface resin layer between the polypropylene resin layer and the evaporated film, the barrier substrate includes an adhesive resin layer between the polypropylene resin layer and the surface resin layer, the polypropylene resin layer is a layer subjected to a stretching process, the evaporated film is composed of an inorganic oxide, the polypropylene resin substrate is a substrate subjected to a stretching process, and the barrier laminate after heat treatment at 120° C. for 15 minutes has a thermal shrinkage ratio (MD1) of 2.00% or less in an MD direction and a thermal shrinkage ratio (TD1) of 2.00% or less in a TD direction.

14. The packaging container according to claim 13, which is a boiled or retort pouch.

15. A lid material comprising a barrier laminate, wherein the barrier laminate comprises:

a first substrate;

a second substrate; and a sealant layer in this order in a thickness direction, one of the first substrate and the second substrate is a barrier substrate including a polypropylene resin layer and an evaporated film, and the other of the first substrate and the second substrate is a polypropylene resin substrate, the barrier substrate includes a surface resin layer between the polypropylene resin layer and the evaporated film, the barrier substrate includes an adhesive resin layer between the polypropylene resin layer and the surface resin layer, the polypropylene resin layer is a layer subjected to a stretching process, the evaporated film is composed of an inorganic oxide, the polypropylene resin substrate is a substrate subjected to a stretching process, and the barrier laminate after heat treatment at 120° C. for 15 minutes has a thermal shrinkage ratio (MD1) of 2.00% or less in an MD direction and a thermal shrinkage ratio (TD1) of 2.00% or less in a TD direction.

16. A packaging container comprising:

a container main body with a storage portion; and the lid material bonded to the container main body to seal the storage portion, wherein the lid material comprises a barrier laminate, the barrier laminate comprises:

a first substrate;

a second substrate; and a sealant layer in this order in a thickness direction, one of the first substrate and the second substrate is a barrier substrate including a polypropylene resin layer and an evaporated film, and the other of the first substrate and the second substrate is a polypropylene resin substrate, the barrier substrate includes a surface resin layer between the polypropylene resin layer and the evaporated film, the barrier substrate includes an adhesive resin layer between the polypropylene resin layer and the surface resin layer, the polypropylene resin layer is a layer subjected to a stretching process, the evaporated film is composed of an inorganic oxide, the polypropylene resin substrate is a substrate subjected to a stretching process, and the barrier laminate after heat treatment at 120° C. for 15 minutes has a thermal shrinkage ratio (MD1) of 2.00% or less in an MD direction and a thermal shrinkage ratio (TD1) of 2.00% or less in a TD direction.

* * * * *